(12) United States Patent
Lennon

(10) Patent No.: US 7,287,018 B2
(45) Date of Patent: Oct. 23, 2007

(54) BROWSING ELECTRONICALLY-ACCESSIBLE RESOURCES

(75) Inventor: Alison Joan Lennon, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,220

(22) Filed: Jan. 28, 2000

(65) Prior Publication Data

US 2003/0208473 A1   Nov. 6, 2003

(30) Foreign Application Priority Data

Jan. 29, 1999 (AU) .................................. PP8374
Jan. 29, 1999 (AU) .................................. PP8375
Jan. 29, 1999 (AU) .................................. PP8376
Jan. 29, 1999 (AU) .................................. PP8377
Dec. 13, 1999 (AU) .................................. PQ4612

(51) Int. Cl.
*G06F 17/30* (2006.01)

(52) U.S. Cl. .................... 707/2; 707/101; 715/513; 715/514; 715/515

(58) Field of Classification Search ............. 707/500, 707/513, 514, 537, 2, 101; 715/513–515
See application file for complete search history.

(56) References Cited

U.S. PATENT DOCUMENTS 5,708,806 A    1/1998  DeRose et al.
5,959,627 A *  9/1999  Duwaer et al. ............. 345/797
6,073,148 A *  6/2000  Rowe et al. ................ 715/542

FOREIGN PATENT DOCUMENTS

EP    0 660 249 A1    6/1995

OTHER PUBLICATIONS

Rauch, et al., "Enabling the Book Metaphor for the World Wide Web: Disseminating On-line Information as Dynamic Web Documents," IEEE Transactions on Professional Communication, vol. 40, No. 2, pp. 111-128, Jun. 1997.
Oomoto, et al., "OVID: Design and Implementation of a Video-Object Database System," IEEE Transactions on Knowledge and Data Engineering, vol. 5, No. 4, pp. 629-643, Aug. 1993.

* cited by examiner

*Primary Examiner*—Hung Q Pham
(74) *Attorney, Agent, or Firm*—Fitzpatrick, Cella, Harper & Scinto

(57) ABSTRACT

A method of browsing electronically-accessible resources using descriptions of the resources. These descriptions have descriptor components, which have attributes representative of at least two axes of access to the resources. These descriptions also have links to the corresponding resources. The method first reads the descriptions and displays a number of items (1608). Each one of these items are associated with a corresponding descriptor component of the read description that has an attribute. The method allows the browsing (1602,1603) of the descriptions and their corresponding electronically-accessible resources via the links using the displayed items.

29 Claims, 23 Drawing Sheets

Description node

Descriptor node

Containment relationship

Reference Spatial, temporal or conceptual relationship)

Navigational link (e.g., to spatio-temporal extents in the resource)

Description D2

Description D1

Description D3 contining descriptions
D1 and D2 as sub-trees

BROWSING ELECTRONICALLY-ACCESSIBLE RESOURCES

COPYRIGHT NOTICE

This patent document contains material subject to copyright protection. The copyright owner has no objection to the reproduction of this patent document or any related materials in the files of the Patent Office, but otherwise reserves all copyright whatsoever.

FIELD OF INVENTION

The present invention relates to a method and apparatus for selecting a description or part of a description of a resource. The invention also relates to an apparatus and a computer program product for implementing the method.

BACKGROUND

As network connectivity has continued its explosive growth and digital storage has become smaller, faster, and less expensive, the quantity of electronically-accessible resources has increased enormously. So much so that the discovery and location of the available resources has become a critical problem. These electronically-accessible resources can be digital content (e.g., digital images, video and audio) which may be available over the network, web-based resources (e.g., HTML/XML documents) and electronic devices (e.g., printers, displays, etc.) In addition, there are electronically-accessible catalogues of other resources, which may not be electronically accessible (e.g., books, analog film media, etc.). What is needed is a consistent method of describing resources so that location of resources, electronically-accessible or otherwise, can be more readily achieved.

The problems of consistent resource description are twofold. First, there is the problem of acceptance of a standard (consistent) method of resource description. The second problem is related to the generation of descriptions. Often the cost of this process is significant.

The ready adoption of HTML browsers for the purposes for browsing and locating textual information indicates that humans like to browse for information. Currently, however no form of generic browsing of non-textual electronically-accessible resources exists. For example, browsing of a library of text documents is typically enabled using an HTML browser by providing a table of contents and then linking the relevant HTML (textual) documents to anchors in an HTML document. Currently, there is no general way of browsing through a library containing, for example, digital video resources. For such browsing to be enabled it is necessary to have a consistent way of describing resources in much the same way that HTML provides a consistent way of representing textual information.

If a consistent method of describing resources can be achieved then consistent methods of selecting resource descriptions from formulated queries can be contemplated.

Furthermore, it is also possible to develop methods and build devices that facilitate resource discovery, understanding and presentation. Resources can be composite items involving other resources and can include schedules for presentation, delivery and/or consumption. Video presentations can therefore be viewed as just another electronically-accessible resource and as such can be described in a similar way to items of digital content (like images, video and audio). The description of the video presentation effectively provides an efficient encoding for the presentation.

SUMMARY OF THE INVENTION

It is an object of the present invention to ameliorate one or more disadvantages of the prior art.

According to one aspect of the invention, there is provided a method of browsing electronically-accessible resources using descriptions of said resources, wherein said descriptions of said resources have descriptor components, said descriptor components having attributes representative of at least two axes of access to the resources and wherein said descriptions have links to corresponding said electronically-accessible resources, said method comprising the steps of: reading said descriptions; displaying items, wherein each item is associated with a corresponding said descriptor component of a said read description that has at least one said attribute; and browsing said descriptions of the resources and their corresponding electronically-accessible resources via said links using said displayed items.

According to another aspect of the invention, there is provided a method of searching electronically-accessible resources using descriptions of said resources, wherein said descriptions of said resources have descriptor components, said descriptor components having attributes representative of at least two axes of access to the resources and wherein said descriptions have links to corresponding said electronically accessible resources, said method comprising the steps of: reading said descriptions; displaying items, wherein each item is associated with a corresponding said descriptor component of a said read description that has at least one said attribute; specifying a query in terms of index descriptors; searching said descriptions of the resources using said query; and locating said corresponding electronically-accessible resources using said links associated with said displayed items.

According to still another aspect of the invention, there is provided a method of locating electronically-accessible resources using descriptions of said resources, wherein the descriptions of said resources have descriptor components, each said descriptor component comprises the association of a feature of a said resource with a representative value for that feature, and one or more of said descriptor components including a table of contents attribute and one or more of said descriptor components including an index attribute, and wherein said descriptions have links to corresponding said electronically-accessible resources, said method comprising the steps of: reading said descriptions; displaying a table of contents containing table of contents items, wherein each table of contents item is associated with a corresponding said descriptor component that has a table of contents attribute; selecting one said displayed table of contents item; displaying an index containing index items, wherein each said displayed index item is associated with a corresponding said descriptor component that has an index attribute and that is associated with the said selected table of contents item; selecting one or more index items in the displayed index; specifying a said representative value or values for the one or more said selected index items; searching said descriptions of the resources for said one or more selected index items and their corresponding said specified representative value or values; and locating one or more said descriptions of the resources corresponding to said one or more selected index items and their corresponding said specified representative value or values.

According to still another aspect of the invention, there is provided a method of annotating an electronically-accessible resource using a description of said resource, wherein the description of said resource has descriptor components, each said descriptor component comprises the association of a feature of said resource with a representative value for that feature, and one or more of said descriptor components including a table of contents attribute and one or more of said descriptor components including an index attribute, said method comprising the steps of: reading said descriptions; displaying a table of contents containing table of contents items, wherein each table of contents item is associated with a corresponding said descriptor component that has a table of contents attribute; selecting one said displayed table of contents item for the annotation; displaying an index containing index items, wherein each said displayed index item is associated with a corresponding said descriptor component that has an index attribute and that is associated with the said selected table of contents item; selecting one said displayed index item; associating said selected displayed index item with said selected table of contents item; choosing a said representative value for the selected index item; and associating said chosen representative value with said feature which corresponds to said selected index item, wherein said chosen representative value and its corresponding feature provide an annotation of the resource.

According to still another aspect of the invention, there is provided apparatus for browsing electronically-accessible resources using descriptions of said resources, wherein said descriptions of said resources have descriptor components, said descriptor components having attributes representative of at least two axes of access to the resources and wherein said descriptions have links to corresponding said electronically-accessible resources, said apparatus comprising: means for reading said descriptions; means for displaying items, wherein each item is associated with a corresponding said descriptor component of a said read description that has at least one said attribute; and means for browsing said descriptions of the resources and their corresponding electronically-accessible resources via said links using said displayed items.

According to still another aspect of the invention, there is provided apparatus for searching electronically-accessible resources using descriptions of said resources, wherein said descriptions of said resources have descriptor components, said descriptor components having attributes representative of at least two axes of access to the resources and wherein said descriptions have links to corresponding said electronically-accessible resources, said apparatus comprising: means for reading said descriptions; means for displaying items, wherein each item is associated with a corresponding said descriptor component of a said read description that has at least one said attribute; means for specifying a query in terms of index descriptors; means for searching said descriptions of the resources using said query; and means for locating said corresponding electronically-accessible resources using said links associated with said displayed items.

According to still another aspect of the invention, there is provided apparatus for locating electronically-accessible resources using descriptions of said resources, wherein the descriptions of said resources have descriptor components, each said descriptor component comprises the association of a feature of said resource with a representative value for that feature, and one or more of said descriptor components including a table of contents attribute and one or more of said descriptor components including an index attribute, and wherein said descriptions have links to corresponding said electronically-accessible resources, said apparatus comprising: means for reading said descriptions; means for displaying a table of contents containing table of contents items, wherein each table of contents item is associated with a corresponding said descriptor component that has a table of contents attribute; means for selecting one said displayed table of contents item; means for displaying an index containing index items, wherein each said displayed index item is associated with a corresponding said descriptor component that has an index attribute and that is associated with the said selected table of contents item; means for selecting one or more index items in the displayed index; means for specifying a said representative value or values for the one or more said selected index items; means for searching said descriptions of the resources for said one or more selected index items and their corresponding said specified representative value or values; and means for locating one or more said descriptions of the resources corresponding to said one or more selected index items and their corresponding said specified representative value or values.

According to still another aspect of the invention, there is provided apparatus for annotating an electronically-accessible resource using a description of said resource, wherein the description of said resource has descriptor components, each said descriptor component comprises the association of a feature of said resource with a representative value for that feature, and one or more of said descriptor components including a table of contents attribute and one or more of said descriptor components including an index attribute, said apparatus comprising: means for reading said descriptions; means for displaying a table of contents containing table of contents items, wherein each table of contents item is associated with a corresponding said descriptor component that has a table of contents attribute; means for selecting one said displayed table of contents item for the annotation; means for displaying an index containing index items, wherein each said displayed index item is associated with a corresponding said descriptor component that has an index attribute and that is associated with the said selected table of contents item; means for selecting one said displayed index item means for associating said selected displayed index item with said selected table of contents item; means for choosing a said representative value for the selected index item; and means for associating said chosen representative value with said feature which corresponds to said selected index item, wherein said chosen representative value and its corresponding feature provide an annotation of the resource.

According to still another aspect of the invention, there is provided a computer readable medium comprising a computer program for browsing electronically-accessible resources using descriptions of said resources, wherein said descriptions of said resources have descriptor components, said descriptor components having attributes representative of at least two axes of access to the resources and wherein said descriptions have links to corresponding said electronically-accessible resources, said computer program comprising: code for reading said descriptions; code for displaying items, wherein each item is associated with a corresponding said descriptor component of a said read description that has at least one said attribute; and code for browsing said descriptions of the resources and their corresponding electronically-accessible resources via said links using said displayed items.

According to still another aspect of the invention, there is provided a computer readable medium comprising a computer program for searching electronically-accessible resources using descriptions of said resources, wherein said descriptions of said resources have descriptor components, said descriptor components having attributes representative of at least two axes of access to the resources and wherein said descriptions have links to corresponding said electronically-accessible resources, said computer program comprising code for reading said descriptions; code for displaying items, wherein each item is associated with a corresponding said descriptor component of a said read description that has at least one said attribute; code for specifying a query in terms of index descriptors; code for searching said descriptions of the resources using said query; and code for locating said corresponding electronically-accessible resources using said links associated with said displayed items.

According to still another aspect of the invention, there is provided a computer readable medium comprising a computer program for locating electronically-accessible resources using descriptions of said resources, wherein the descriptions of said resources have descriptor components, each said descriptor component comprises the association of a feature of a said resource with a representative value for that feature, and one or more of said descriptor components including a table of contents attribute and one or more of said descriptor components including an index attribute, and wherein said descriptions have links to corresponding said electronically-accessible resources, said computer program comprising: code for reading said descriptions; code for displaying a table of contents containing table of contents items, wherein each table of contents item is associated with a corresponding said descriptor component that has a table of contents attribute; code for selecting one said displayed table of contents item; code for displaying an index containing index items, wherein each said displayed index item is associated with a corresponding said descriptor component that has an index attribute and that is associated with the said selected table of contents item; code for selecting one or more index items in the displayed index; code for specifying a said representative value or values for the one or more said selected index items; code for searching said descriptions of the resources for said one or more selected index items and their corresponding said specified representative value or values; and code for locating one or more said descriptions of the resources corresponding to said one or more selected index items and their corresponding said specified representative value or values.

According to still another aspect of the invention, there is provided a computer readable medium comprising a computer program for annotating an electronically-accessible resource using a description of said resource, wherein the description of said resource has descriptor components, each said descriptor component comprises the association of a feature of said resource with a representative value for that feature, and one or more of said descriptor components including a table of contents attribute and one or more of said descriptor components including an index attribute, said computer program comprising: code for reading said descriptions; code for displaying a table of contents containing table of contents items, wherein each table of contents item is associated with a corresponding said descriptor component that has a table of contents attribute; code for selecting one said displayed table of contents item for the annotation; code for displaying an index containing index items, wherein each said displayed index item is associated with a corresponding said descriptor component that has an index attribute and that is associated with the said selected table of contents item; code for selecting one said displayed index item; code for associating said selected displayed index item with said selected table of contents item; code for choosing a said representative value for the selected index item; and code for associating said chosen representative value with said feature which corresponds to said selected index item, wherein said chosen representative value and its corresponding feature provide an annotation of the resource.

According to still another aspect of the invention, there is provided a method of selecting one or more descriptions or one or more descriptor components from a set of descriptions, wherein said descriptions comprise one or more said descriptor components, and each said description of said set of descriptions is associated with a corresponding electronically accessible resource, said method comprising the steps of: specifying a desired selection of descriptor components; generating a selection rule based on said specified descriptor components, wherein said selection rule having a predetermined pattern and action component, wherein the said predetermined pattern represents a specified pattern of descriptor components and the said action specifies the action to be performed when a said descriptor component in the descriptions of the set of descriptions matches the predetermined pattern; reading said descriptions of the resources; locating patterns of descriptor components in descriptions of said set of descriptions in order to select descriptor components or descriptions in said set of descriptions having said descriptor components which match the predetermined pattern; and performing said specified action.

According to still another aspect of the invention, there is provided apparatus for selecting one or more descriptions or one or more descriptor components from a set of descriptions, wherein said descriptions comprise one or more said descriptor components, and each said description of said set of descriptions is associated with a corresponding electronically accessible resource, said apparatus comprising: means for specifying a desired selection of descriptor components; means for generating a selection rule based on said specified descriptor components, wherein said selection rule having a predetermined pattern and action component, wherein the said predetermined pattern represents a specified pattern of descriptor components and the said action specifies the action to be performed when a said descriptor component in the descriptions of the set of descriptions matches the predetermined pattern; means for reading said descriptions of the resources;

means for locating patterns of descriptor components in descriptions of said set of descriptions in order to select descriptor components or descriptions in said set of descriptions having said descriptor components which match the predetermined pattern; and means for performing said specified action.

According to still another aspect of the invention, there is provided a computer readable medium comprising a computer program for selecting one or more descriptions or one or more descriptor components from a set of descriptions, wherein said descriptions comprise one or more said descriptor components, and each said description of said set of descriptions is associated with a corresponding electronically accessible resource, said computer program comprising: code for specifying a desired selection of descriptor components; code for generating a selection rule based on said specified descriptor components, wherein said selection rule having a predetermined pattern and action component, wherein the said predetermined pattern represents a specified pattern of descriptor components and the said action specifies the action to be performed when a said descriptor component in the descriptions of the set of descriptions matches the predetermined pattern; code for reading said descriptions of the resources; code for locating patterns of descriptor components in descriptions of said set of descriptions in order to select descriptor components or descriptions in said set of descriptions having said descriptor components which match the predetermined pattern; and code for performing said specified action.

According to still another aspect of the invention, there is provided a method of generating on an output device a presentation based on a predetermined selection of resources, said method comprising the steps of: reading a description scheme for said presentation, wherein the description scheme for said presentation uses a declarative description definition language which contains definitions for descriptor components of the description scheme; generating a description of the said presentation using said description scheme and said predetermined selection of said resources; and generating on said output device the said presentation based on the said description of the said presentation and the predetermined selected resources.

According to still another aspect of the invention, there is provided a method of generating on an output device a presentation based on a predetermined selection of resources, said method comprising the steps of: reading a description scheme for said presentation, wherein said description scheme contains definitions for descriptor components of the description scheme, and each said descriptor component comprises the association of a presentation attribute with a representative value for that attribute; generating a description of the said presentation using said description scheme and said predetermined selection of resources; and generating on said output device the said presentation based on the said generated description of the said presentation, the predetermined selected resources, and a set of presentation rules, which rules specify characteristics of the style of said generated presentation, wherein said set of presentation rules are associated with said description scheme.

According to still another aspect of the invention, there is provided apparatus for generating on an output device a presentation based on a predetermined selection of resources, said apparatus comprising: means for reading a description scheme for said presentation, wherein the description scheme for said presentation uses a declarative description definition language which contains definitions for descriptor components of the description scheme; means for generating a description of the said presentation using said description scheme and said predetermined selection of said resources; and means for generating on said output device the said presentation based on the said description of the said presentation and the predetermined selected resources.

According to still another aspect of the invention, there is provided apparatus for generating on an output device a presentation based on a predetermined selection of resources, said apparatus comprising: means for reading a description scheme for said presentation, wherein said description scheme contains definitions for descriptor components of the description scheme, and each said descriptor component comprises the association of a presentation attribute with a representative value for that attribute; means for generating a description of the said presentation using said description scheme and said predetermined selection of resources; and means for generating on said output device the said presentation based on the said generated description of the said presentation, the predetermined selected resources, and a set of presentation rules, which rules specify characteristics of the style of said generated presentation, wherein said set of presentation rules are associated with said description scheme.

According to still another aspect of the invention, there is provided a computer readable medium comprising a computer program for generating on an output device a presentation based on a predetermined selection of resources, said computer program comprising: code for reading a description scheme for said presentation, wherein the description scheme for said presentation uses a declarative description definition language which contains definitions for descriptor components of the description scheme; code for generating a description of the said presentation using said description scheme and said predetermined selection of said resources; and code for generating on said output device the said presentation based on the said description of the said presentation and the predetermined selected resources.

According to still another aspect of the invention, there is provided a computer readable medium comprising a computer program for generating on an output device a presentation based on a predetermined selection of resources, said computer program comprising: code for reading a description scheme for said presentation, wherein said description scheme contains definitions for descriptor components of the description scheme, and each said descriptor component comprises the association of a presentation attribute with a representative value for that attribute; code for generating a description of the said presentation using said description scheme and said predetermined selection of resources; and code for generating on said output device the said presentation based on the said generated description of the said presentation, the predetermined selected resources, and a set of presentation rules, which rules specify characteristics of the style of said generated presentation, wherein said set of presentation rules are associated with said description scheme.

BRIEF DESCRIPTION OF THE DRAWINGS

Embodiments of the invention are described with reference to the accompanying drawings, in which.

Where reference is made in any one or more of the accompanying drawings to steps and/or features, which have the same reference numerals, those steps and/or features—have for the purposes of this description the same function(s) or operation(s), unless the contrary intention appears.

BRIEF DESCRIPTION OF THE APPENDICES

Figure 1A:
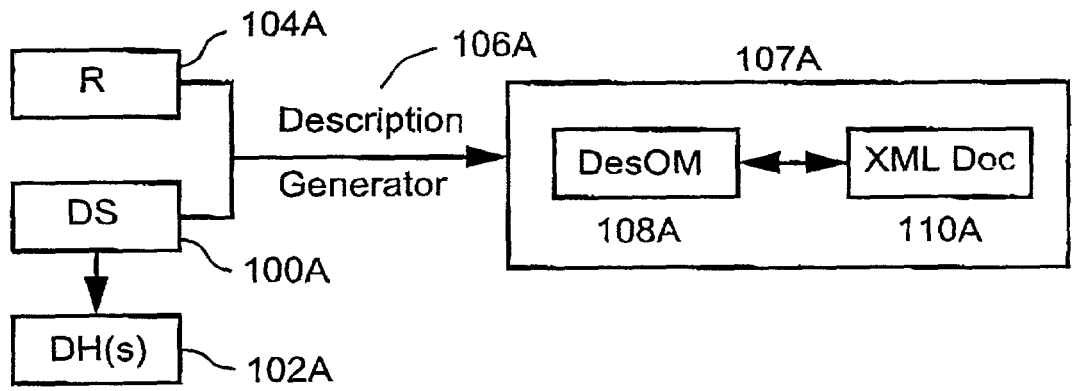
FIG. 1A shows a flow diagram of a method of generating a description of a resource in accordance with an embodiment.

Embodiments of the invention are also described with reference to the appendices, in which:

Appendix A shows core DDF element definitions;

Appendix B shows an example description scheme for an Australian Football League Game;

Appendix C shows an example description generated from the description scheme in Appendix B;

Appendix D shows a digital video resource description scheme;

Appendix E shows an example description generated from the video description scheme in Appendix D;

Appendix F shows presentation rules for the video description scheme in Appendix D;

Appendix G shows a digital video library description scheme;

Appendix H shows an example description generated from the digital video library description scheme in Appendix G;

Appendix I shows video presentation description scheme;

Appendix J shows an example description generated from the video presentation description scheme in Appendix I; and Appendix K shows DOM element nodes.

DETAILED DESCRIPTION

| TABLE OF CONTENTS | |
|---|---|
| 1. | INTRODUCTION |
| 1.1 | Terminology |
| 1.1.1 | Content |
| 1.1.2 | Resource |
| 1.1.3 | Feature |
| 1.1.4 | Descriptor |
| 1.1.5 | Description |
| 1.16 | Description Scheme |
| 1.2 | Descriptor Relationships |
| 1.3 | Overview Of Embodiments Of Methods |
| 2. | DYNAMIC DESCRIPTION FRAMEWORK |
| 2.1 | Overview |
| 2.2 | Object Model |
| 2.2.1 | Overview |
| 2.2.2 | Descriptor Class |
| 2.2.3 | Atomic Descriptor Value Class |
| 2.2.4 | Descriptor Handler Class |
| 2.2.5 | Description Class |
| 2.3 | API for Processing of Descriptions |
| 2.4 | Scrialisation Syntax |
| 2.4.1 | Expression of Descriptor Relationships |
| 2.4.1.1 | Generalisation/Specialisation Relationships |
| 2.4.1.1.1 | Content Model Inheritance |
| 2.4.1.1.2 | Attribute Inheritance |
| 2.4.1.1.3 | Implementation Details |
| 2.4.1.2 | Equivalence Relationships |
| 2.4.1.3 | Association Relationships |
| 2.4.1.4 | Spatial, Temporal and Conceptual Relationships |
| 2.4.1.5 | Navigational Relationships |
| 2.4.2 | Expression of Specific Data Types |
| 2.5 | Implementation Issues |
| 3. | SERIALISATION SYNTAX SPECIFICATION |
| 3.1.1 | Element Definitions |
| 3.12 | Core DDF Element Definitions |
| 3.1,2.1 | Descriptor Definition |
| 3.1.3 | Descriptors Representing Spatial, Temporal and Conceptual Relationships |
| 3.1.4 | Elements Representing Navigational Relationships |
| 4. | DESOM API SPECIFICATION |
| 4.1.1 | Interface Descriptor |
| 4.1.2 | Interface DescriptorHandler |
| 4.1.3 | Interface AtomioDescriptorValue |
| 5. | EXAMPLE OF A DESCRIPTION SCHEME |
| 6. | METHODS OF APPLYING PROCEDURES |
| 6.1 | Method of Generating Descriptions of Electronically-Accessible Resources |
| 6.2 | Methods of Applying Procedures to a Description |
| 6.3 | Examples of Methods of Generating Descriptions and Applying Procedures to Descriptions |
| 7. | RULE-BASED PROCESSING USING FOR DESOM |
| 8. | METHOD OF EXTENDING DESCRIPTIONS OF RESOURCES |
| 9. | METHOD OF PRESENTING DESCRIPTIONS OF RESOURCES |

-continued

TABLE OF CONTENTS

| | |
|---|---|
| 10. | METHOD OF SELECTING RESOURCE DESCRIPTIONS |
| 11. | METHOD OF TRANSLATING DESCRIPTIONS OF RESOURCES |
| 12. | FIRST EMBODIMENT OF APPARATUS |
| 13. | SECOND EMBODIMENT OF APPARATUS - DIGITAL VIDEO BROWSER SYSTEM |
| 14. | THIRD AND FOURTH EMBODIMENT OF APPARATUS - REMOTE DIGITAL VIDEO BROWSER DEVICES |
| 15. | FIFTH EMBODIMENT OF APPARATUS - MEDIA BROWSER SYSTEM |

1. Introduction

For a better understanding of the embodiments, an introduction (Section 1) including a brief review of terminology (Section 1.1) is first undertaken, then there is provided a discussion of relationships between components of descriptions (Section 1.2), the DDF (Section 2), the serialisation syntax specification (Section 3), and the DesOM API specification (Section 4) used in the embodiments. A more detailed description of the embodiments is then given in Sections 6 to 15.

Some portions of the detailed descriptions which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilising terms such as "processing", "computing", "generating", "creating", "operating" "communicating", "rendering", "providing", and "linking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialised apparatus to perform the required method steps. The structure of a conventional general purpose computer will appear from the description below.

In addition, the present invention also relates to a computer program product comprising a computer readable medium including a computer program for implementing the preferred methods. The computer readable medium is taken herein to include any transmission medium for transmitting the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and implementations thereof may be used to implement the teachings of the invention as described herein.

1.1 Terminology 1.1.1 Content

Content is defined to be information, regardless of the storage, coding, display, transmission, medium, or technology. Examples of content include digital and analog video (such as an MPEG-4 stream or a video tape), film, music, a book printed on paper, and a web page.

1.1.2 Resource

A resource is a particular unit of the content being described. Examples of a resource include an MPEG-1 video stream, a JPEG-2000 image, and a WAVE audio file.

1.1.3 Feature

A feature is a distinctive part or characteristic of the resource which stands for something to somebody in some respect or capacity. A feature can be derived directly (ie., extracted) from the content (eg., dominant colour of an image) or can be a relevant characteristic of the content. Examples of features include the name of the person who recorded the image, the colour of an image, the style of a video, the title of a movie, the author of a book, the composer of a piece of music, pitch of an audio segment, and the actors in a movie.

1.1.4 Descriptor

A descriptor associates a representation value to a feature, where the representation value can have an atomic or compound type. The representation value can have an atomic or compound type An atomic type is defined as one of a basic set of predetermined data types (eg., integer, string, date, etc.). A compound type is defined to be a collection of one or more descriptors. The descriptor comprises a feature—representation value pair, where the representation value is associated with the feature. Example descriptors having atomic types include:

Feature=Author; Representation Value (string)="John Smith";

Feature=DateCreated; Representation Value (date) ="1998-08-08".

An example descriptor having a compound type is;

Feature=Colour; Representation Value=ColourHistogramDescriptor.

1.1.5 Description

A description is a descriptor having a compound type pertaining to a single resource.

1.1.6 Description Scheme

A description scheme is a set of descriptor definitions and their relationships (associations, equivalence, specialisations, and generalisations). The descriptor relationships can be used to directly express the structure of the content or to create combinations of descriptors which form a richer expression of a higher-level concept. A description Scheme includes within its scope a comprehensive set of description schemes.

1.2 Descriptor Relationships

In order to express the information required for a description scheme, the DDF preferably provides a minimum set of descriptor relationships. This minimum set includes:

Generalisation/specialisation relationships,
Association relationships,
Equivalence relationships,
Spatial, temporal and conceptual relationships,
Navigational relationships.

The generalisation/specialisation relationships specify that a particular descriptor is a more specific or more general form of another descriptor and hence can be viewed by a processing application as such. For example, a cat is a type of animal, and hence a search engine searching for occurrences of animal descriptors should also select descriptions which contain "cat" descriptors.

Association relationships are defined here to include descriptor containment and sequence and cardinality of occurrence. These relationships provide contextual information for a given descriptor and are necessary in order to provide a context in which a particular descriptor can be interpreted by an application. For example, a "Shot" descriptor which is contained within a "VideoScene" descriptor in a video description scheme would be interpreted differently from a "Shot" descriptor in another context in a sound effects description scheme.

An equivalence relationship is a form of a classification relationship where the relation is not necessarily of a generalisation/specialisation nature. Equivalence relationships are desirable between languages (ie., inter-language) and within a language (ie., intra-language). Typically equivalences will require the definition of synonyms (where two descriptors are equivalent) and quasi-synonyms (where two descriptors are equivalent to some specified extent). Also there is a need to define equivalence relationships between non-textual values (eg., mean R, G and B values in an image) and a textual representative value (eg., red, green, etc.), and vice-versa.

Spatial, temporal and conceptual relationships between descriptors in a description may also be used. These relationships support the description of neighbouring objects in an image, sequential segments in a video scene, and similar concepts in a description.

Navigation relationships between descriptors are also desirable. Usage of descriptions will often involve navigation between a component of the description and an associated spatio-temporal extent in the resource (such as a key frame in a video resource).

Considered together these relationships can to some extent provide a level of semantic interoperability between different description schemes. Further levels of semantic interoperability could also be achieved at the application level.

1.3 Overview of Embodiments of Methods

The methods described herein are specific examples of a generalised form of a method for generating and processing descriptions of resources utilising a Dynamic Description Framework (DDF). This framework provides an object model, a platform- and language-neutral application programming interface (API) and a serialisation syntax for use in the description of resources, in particular audiovisual resources. The preferred DDF incorporates the benefits of declarative description of content with procedural methods for the creation and processing of descriptions and components of descriptions.

FIG. 1A shows an overview of a method of generating a description of an electronically-accessible resource. In this method, a description scheme (DS) 100A is read by a description generator 106A which in turn generates a representation 108A of a description 107A of the resource in memory. This representation 108A is an instance of the Description Object Model (DesOM) of the DDF. The representation 108A of the description 107A can be serialised as an XML document 110A for the purposes of storage and transport. Preferably, both the description scheme 100A and the serialised description 110A are textual and are both readable by machines and humans. It is further preferable that the description scheme 100A is provided with associated procedural code, called DescriptorHandler(s), so as to provide operations/processes which can unambiguously provide or generate descriptive information or other actions on the resource 104A. For example, the method in one operating mode is able to automatically generate a description 107A of the resource 104A. In this operating mode, the processes of the DescriptorHandler(s) operate on the resource 104A to generate a description 107A of that particular resource 104A. These description schemes 100A and descriptions 107A are defined in terms of the abovementioned DDF.

Figure 1B:
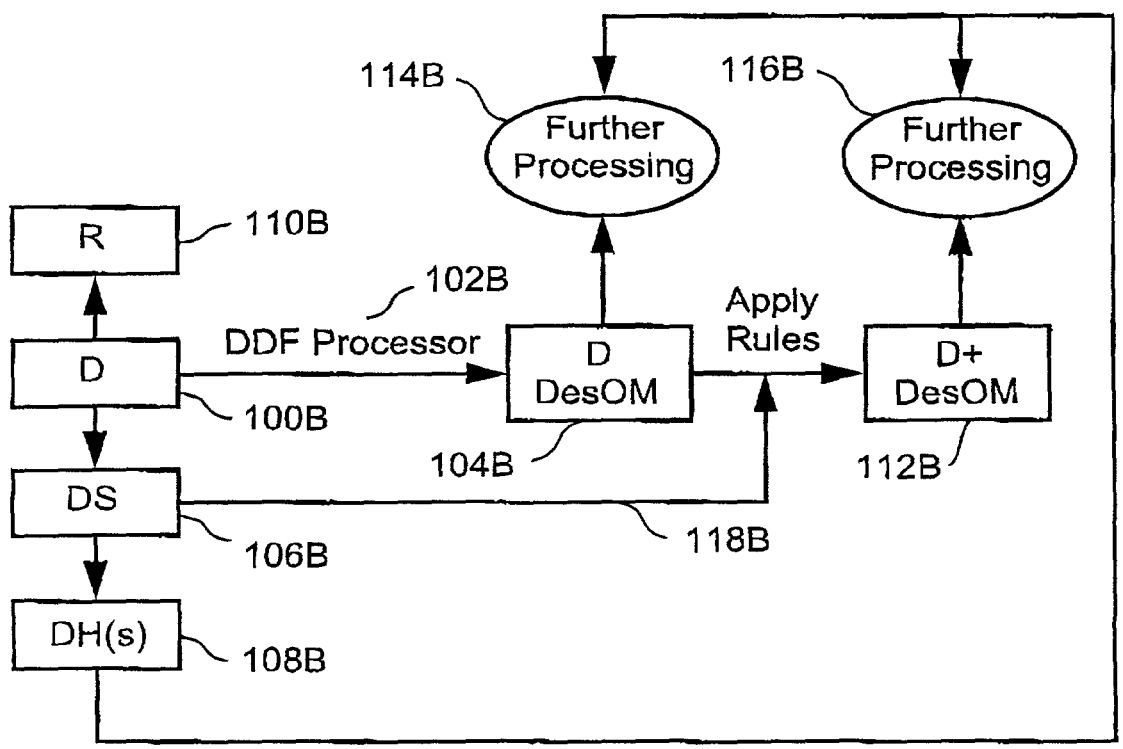
FIG. 1B shows a flow diagram of a method of processing a description of a resource in accordance with another embodiment.

FIG. 1B shows an overview of the method of processing a description of a resource. In this method, a serialised description 100B is parsed by a processor 102B which in turn generates a representation 104B of the description in memory. The representation 104B is an instance of the DesOM of the DDF. Such a serialised description 100B may be generated in accordance with the method of FIG. 1A. Preferably, the processor 102B and description generator 106A (FIG. 1) are incorporated as one unit. The serialised description 100B refers to a description scheme 106B which may in turn refer to a number of DescriptionHandler(s) 108B. The serialised description 100B also refers to the resource 110B which the description describes. In this method, a set of rules may be applied to the DesOM representation of the description (D) 104B to generate a modified DesOM representation of the description 112B. [The term D+ has been used to indicate the modified DesOM representation of the description 112B in FIG. 1B.] The modified DesOM representation of the description 112B can be serialised as an XML document. This set of rules is defined by the Description Scheme 106B. The DescriptorHandler(s) 108B provide further processing of the DesOM representation of the description 114B or the modified DesOM representation of the description 116B. In one operating mode, the processing method is able to compute the similarity between resources 110B. In this mode, the DescriptorHandler provides a process for computing similarity between descriptions of resources. The processing method is further adapted to apply a set of rules 118B to the DesOM representation of the description 104B. The set of rules 118B provides one or more associated actions on the description 104B depending on the presence of predetermined components of the serialised description 100B. The resultant output of these actions is itself a representation of a description which conforms to the DesOM 112B. Further, a description scheme may be read into memory and a set of miles provided for performing one or more associated actions on the description scheme itself. These sets of rules are able to extend resource descriptions; translate resource descriptions; select one or more specific descriptions according to a query; visually present resource descriptions and many other actions.

Figure 1C:
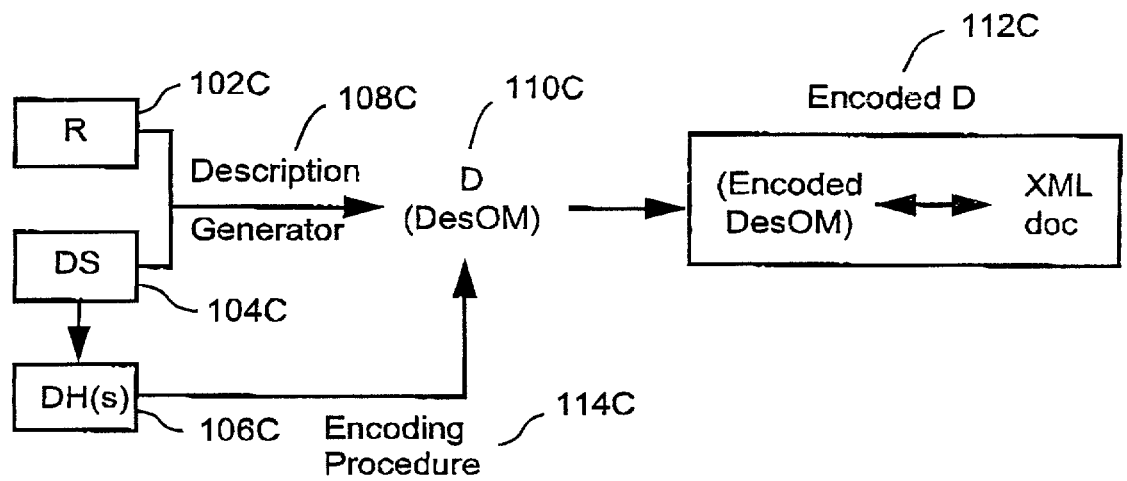
FIG. 1C shows a flow diagram of a method of encoding a description of a resource in accordance with another embodiment.

FIG. 1C shows an overview of the method of encoding a description of a resource. In this method, a description scheme (DS) 104C is read by a description generator 108C which in turn generates a representation 110C of a description of the resource in memory. This representation 110C is an instance of the DesOM of tho DDF. The description scheme 104C is provided with an associated procedural code, by means of a DescriptorHandlers (DH), so as to provide an encoding procedure 114C on the DesOM representation 110C. The encoding procedures encodes the DesOM representation 110C to provide an encoded DesOM 112C. The encoded DesOM representation 112C of the description can be serialised as an XML document for the purposes of storage and transport. The encoding procedure is preferably utilised for compression and/or encryption purposes.

Figure 1D:
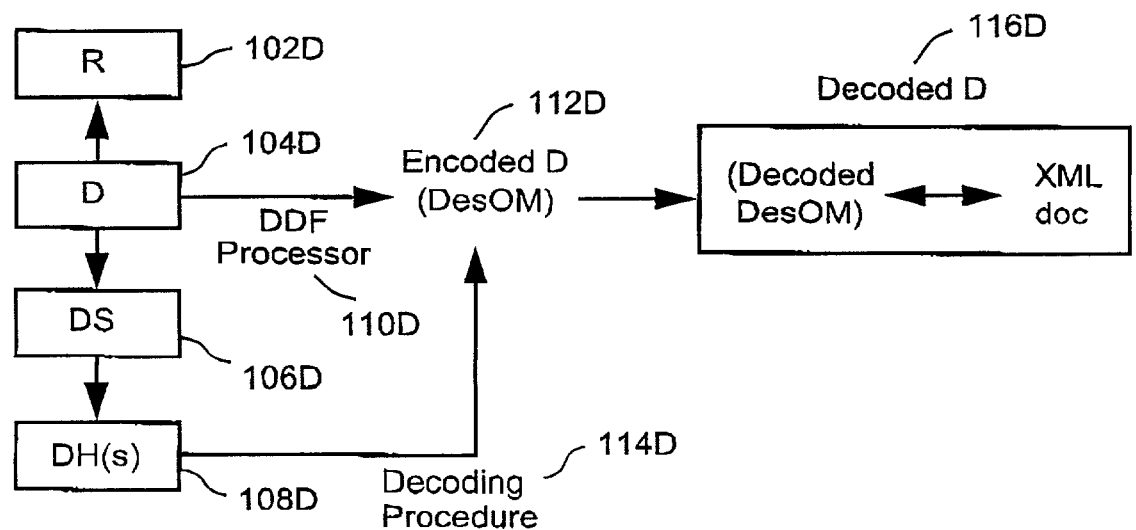
FIG. 1D shows a flow diagram of a method of decoding an encoded description of a resource in accordance with another embodiment.

FIG. 1D shows an overview of a method of decoding an encoded description of a resource. This method has as its input a serialised description 104D which has been encoded by the method of FIG. 1C. In this method, the serialised description 104D is parsed by a processor 110D which in turn generates an encoded representation 112D of the description in memory. The representation 112D is an instance of the encoded DesOM. The description scheme 106D provided with associated procedural code, called descriptor handlers, so as to provide the decoding operation 114D which can decode the encoded DesOM representation 112D so as to provide the decoded representation 116D of the description in memory. The representation 116D is an instance of the DesOM of the DDF.

2. Dynamic Description Framework 2.1 Overview

The preferred DDE attempts to incorporate the benefits of declarative description of content with procedural methods for the creation and processing of descriptors. It comprises an object model, an API for the processing of descriptions, and a serialisation syntax. The DDF can be used to adequately describe content using these components.

The object model provides the core semantics of the description and is based on the descriptor entity. This model has the advantage that the containment relationship is inherent in the model. This containment relationship is particularly important in the description of audiovisual resources for two reasons. First, the structure of many audiovisual resources has an inherent hierarchical structure (eg., a video clip contains shots which contain key frames, etc.). Second, the representation values for many descriptors can be complex datatypes that can be represented in a hierarchical fashion (eg., a histogram contains bins which contain frequencies). The object model of the preferred DDF is called the Description Object Model DesOM). It is discussed in Section 2.2.

The preferred DDF also uses an API for the processing of descriptions. This enables applications and tools to perform further processing (eg., transformations, presentations, etc.) on serialised descriptions. The preferred API, which is described further in Section 2.3, is based on the Document Object Model called the DOM, which has been standardised by the W3C for use with XML documents.

The DesOM API also enables the application of rule-based processing, which can be used to:

Extend a description by inferring the presence of additional descriptors based on the existence or absence of stored descriptors;

Influence/control the presentation of a description;

Select descriptions or components of descriptions;

Translate a stored description into another language on the basis of requirement;

Transform a description to use a new description scheme.

This rule-based processing is described in more detail in Sections 7 to 11.

The tree-based structure of the DesOM (and for that matter, the DOM) is an appropriate representation of hierarchically structured data such as the preferred data model.

The DDF preferably uses a serialisation syntax for the purposes of storage and transport of descriptions and description schemes. Serialised descriptions can be parsed into an instance of the DesOM. In addition, the serialisation syntax provides a means for expressing the descriptor relationships detailed in Section 1.2. The syntax of XML Document Type Definitions (DTDs) is used to express description schemes and XML documents to serialise individual descriptions. The expression syntax of both description schemes and individual descriptions is referred to as the serialisation syntax.

XML is used as the serialisation syntax because of its inherent ability to express the containment relationship and its increasing acceptance as a form for the transmission of structured electronic data. A description scheme can be represented using the grammar of an XML DTD in which the individual element definitions represent the definitions of the descriptors and their relationships in the description scheme. Individual descriptions can be serialised as XML documents that conform to the DTD containing the relevant description scheme. Section 2.4 describes how the preferred object model and the required descriptor relationships are expressed using the serialisation syntax.

The use of XML as the serialisation syntax enables the possibility of DDF conformant descriptions to be interpreted, in theory, at two levels. First, any serialised description is able to be interpreted at an XML syntactical level. At this level the description could be parsed into an object model such as the DOM and a search/filter engine with no knowledge of the DDF could interpret the description in terms of its textual content (ie, the semantics of the DDF's object model are not used for the description's interpretation). Alternatively, the description could be parsed at a more semantic level by using the DDF object model, the DesOM, rather than the DOM.

In practice, however, it is necessary to parse the description scheme expressed using the XML DTD syntax into an XML DTD where descriptor specialisation/generalisation relationships are validated and explicitly realised (see Section 2.4.1.1 for further details). This step is necessary because no level of subclassing or inheritance is provided for in Version 1.0 of XML. We refer to this step as DDF interpretation and the process performing the step is a DDF Interpreter. To differentiate between the DTD containing the DDF definition of a description scheme and the DTD to which the description (ie., XML Version 1.0 document)

conforms, we name the DDF DTD using an extension "ddf" rather than "dtd" as is typically used for an XML DTD.

A serialised description can then be parsed and represented using the DOM from its conformant DTD (ie., the DTD stored using the extension "dtd") by a standard XML Processor. This processor needs no knowledge of DDF and the content of the descriptions can be accessed at a textual level. [Textual access to the description could also be achieved by simply scanning the description (XML document) or using XML Processors that are not based on the DOM (eg., SAX)] Alternatively, a DDF Processor can parse the serialised description and represent it using the DesOM from the DTD containing the description scheme expressed using DDF (ie., the DTD stored using the extension "ddf"). The first step of the latter process is the one of DDF interpretation.

Figures 2A, 2B:
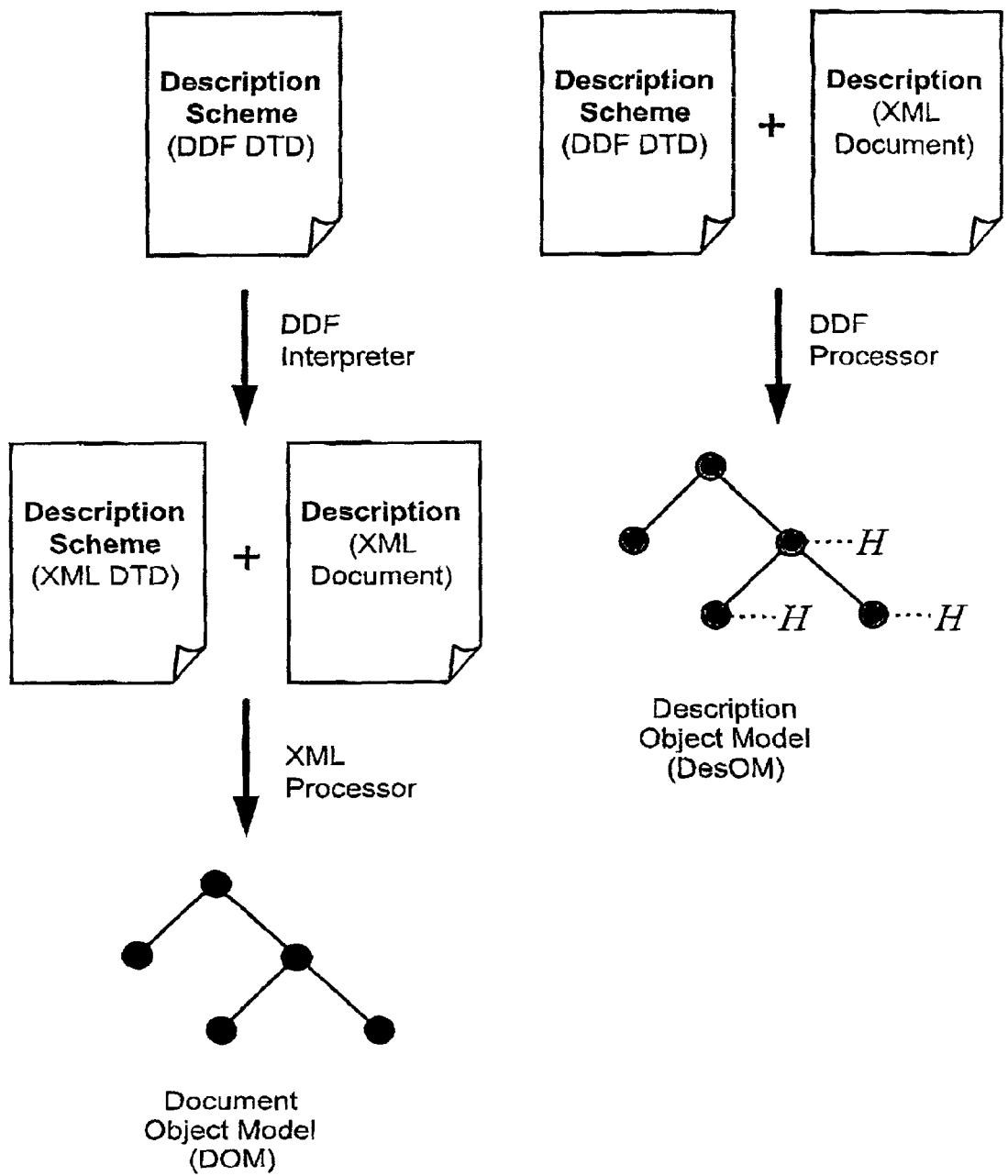
FIG. 2A shows a flow diagram of a prior art method of generating a document object model.
FIG. 2B show a flow diagram of a method of generating a Description Object Model in accordance with another embodiment.

This process of two level interpretation is depicted in FIGS. 2A and 2B, which show how different semantic levels of access can be obtained from a (DDF) description serialised using the XML syntax. The DesOm and DOM are similar in that both are tree-based structures. However, the DesOM differs from the DOM in that DesOM contains element nodes which have a richer interface than the corresponding element nodes in the DOM. In addition, the element nodes of the DesOM can have an associated DescriptorHandler (H) which provides procedures that are relevant to the element.

2.2 Object Model 2.2.1 Overview

The object model adopted for the preferred DDF is based on the definition of a core Descriptor object. As defined in Section 1.1.4, a descriptor can be viewed as an "feature-representative value" pair. The representative value can be of atomic type (eg., integer, string, date, etc.) or compound type, where a compound type is a collection of one or more descriptors. The object model is represented by the UML class diagram in FIG. 3. [Note that the use of capitals in Descriptor and Description implies the objects as defined in FIG. 3 rather than the general terms defined in Section 1.1.4.]

A Description object is defined as a specialisation of a Descriptor in which all the contained Descriptors pertain to a single resource. Description schemes will contain definitions of descriptors and descriptions which are specialisations of the core Descriptor and Description objects, respectively.

In the preferred object model descriptors can represent properties and relationships of their parent descriptors. For example, a Region Descriptor for a Region Adjacency Graph of an image could contain a Label Descriptor (containing a textual representative value) and a Neighbours Descriptor (containing a representative value comprising a list of references to other Region Descriptors). In this example, the Label Descriptor can be viewed as representing a property of a region and the Neighbours Descriptor as representing a spatial relationship involving the region. Descriptors representing relationships (eg., spatial, temporal, conceptual) typically have representative values that comprise one or more references to other descriptors in the description. In Section 2.4.1.4, a standard set of descriptors are proposed to express spatial, temporal and conceptual relationships.

2.2.2 Descriptor Class

Each Descriptor has an associated id, language code and dataType enumeration. The id attribute provides each Descriptor with a unique identity. This identity can be used to reference other Descriptor objects in a description The language code attribute specifies the language of any text in the Descriptor's representative value. The dataType enumeration provides the data type of the representative value if that value is atomic (ie., not composed of other descriptors; see Section 2.2.3). Each Descriptor object can also be associated with a Descriptor Handler which provides procedural methods associated with the Descriptor (see Section 2.2.4).

Implementations of the preferred DDF object model can implement to various extent the descriptor relationships detailed in Section 1.2. This approach means that different implementations can utilise the properties of the particular serialisation syntaxes adopted. Section 2.4.1 describes in detail how the descriptor relationships detailed in Section 1.5 are realised using an XML serialisation syntax.

2.2.3 Atomic Descriptor Value Class

A Descriptor's representative value can be atomic or compound (ie., composed of other Descriptor objects). If it is atomic, then the value is stored in an Atomic Descriptor Value object as a string object. The data type of this atomic value is interpreted using the dataType attribute of the parent Descriptor object. Therefore the extent to which data typing is provided depends on the dataType attribute for particular implementations of this data model. For example, refer to Section 2.4.2 for data typing implementation details using the preferred XML serialisation syntax.

The Atomic Descriptor Value could also be represented by a data attribute of the Descriptor class. The Atomic Descriptor Value is represented here as a class because of the one-to-one correspondence of this entity to a Text node in the DOM (and AtomicDescriptorValue node in the DesOM; see Section 4.1.3).

2.2.4 Descriptor Handler Class

Figure 3:
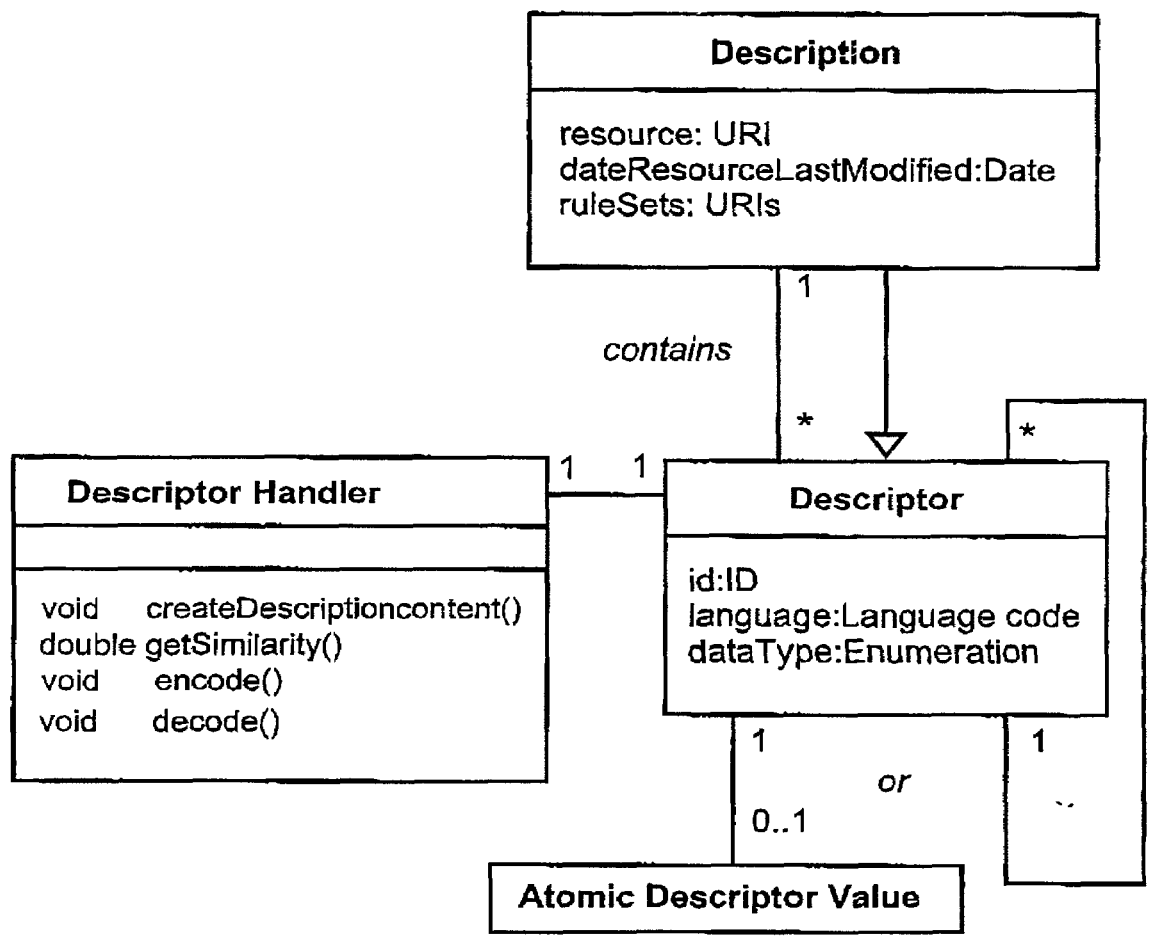
FIG. 3 shows a UML class diagram showing core elements of the Dynamic Description Framework(DDF) data model.

In the preferred DDF, a Descriptor Handler is a class which provides procedural methods that apply to the Descriptor. The methods of the Descriptor Handler preferably satisfy a specified interface. The Descriptor Handler classes can provide methods for the creation of a Descriptor's representative value (or content) and the computation of the similarity between two descriptors of the same type (ie., that use the same Descriptor definition and hence Descriptor Handler). There is no reason why this set of procedures could not be extended if required. FIG. 3 details some examples of the Descriptor Handler methods provided in the preferred implementation of the DDF.

The methods mentioned above are preferably implemented as static (class) methods that satisfy a specified interface (eg., see Section 4.1.2). The role of the Descriptor Handler is to provide unambiguous procedures for the generation and processing of Descriptors. The ability to pass parameters to Descriptor Handler methods is discussed in Section 3.1.2.1 with respect to the use of XML as a serialisation syntax.

Preferably, the programmatic interface for a Descriptor Handler is fixed. In other embodiments, the interface could be specified as an attribute of the Descriptor class or specified for the description scheme. These alternative embodiments enable the Descriptor Handler interface to be customised for particular description schemes.

Descriptor Handler methods can also be provided for the encoding and decoding of a Descriptor's representative value. Encoding methods could be provided in order to either compress (ie., reduce in size) the serialised description and therefore more efficiently store and transport the description, or alternatively to encrypt the Descriptor's representative value.

In the case of encoding for compression, the encoding method could vary depending on the type of data to be encoded. For example, a Descriptor with a textual representative value could use a text compression method (eg., LZW), whereas a Descriptor that represented a colour histogram structure of an image resource may encode the bin frequencies of the histogram using a form of entropy encoding (ie., most commonly occurring frequencies are represented by codewords requiring fewer bits). Encoding for encryption could be used to allow only privileged users access to the Descriptor. Standard encryption methods (eg., public key encryption) could be used.

2.2.5 Description Class

The Description has some additional attributes to those of the Descriptor. It has an associated resource which contains either the URI or ENTITY, of the item of content being described. It also contains a reference to the data when that resource was last modified and an attribute that contains the URIs or ENTITIES of sets of rules that can be applied to the Description. Rule-based processing of descriptions is discussed farther in Section 7.

Since a Description object is defined as a specialisation of the Descriptor object, Description objects can be treated as Descriptor objects in other descriptions (ie., the attributes of the Description are ignored). In an alternate data model, the Description object can contain both Descriptor and Description objects. With this data model Description objects can exist in another tree of Descriptors and refer to resources other than that of the root description.

Another alternative implementation could use a data model which did not include a Description object, since a Description is essentially the same as a Descriptor having a compound representative type. In this case the additional attributes of the Description (ie resource, dateResourceLastModified and ruleSets) would be treated as attributes of the Descriptor. With this data model the resource would only need to be specified at the top of the Descriptor tree where it was relevant.

2.3 API for Processing of Descriptions

Figure 4:
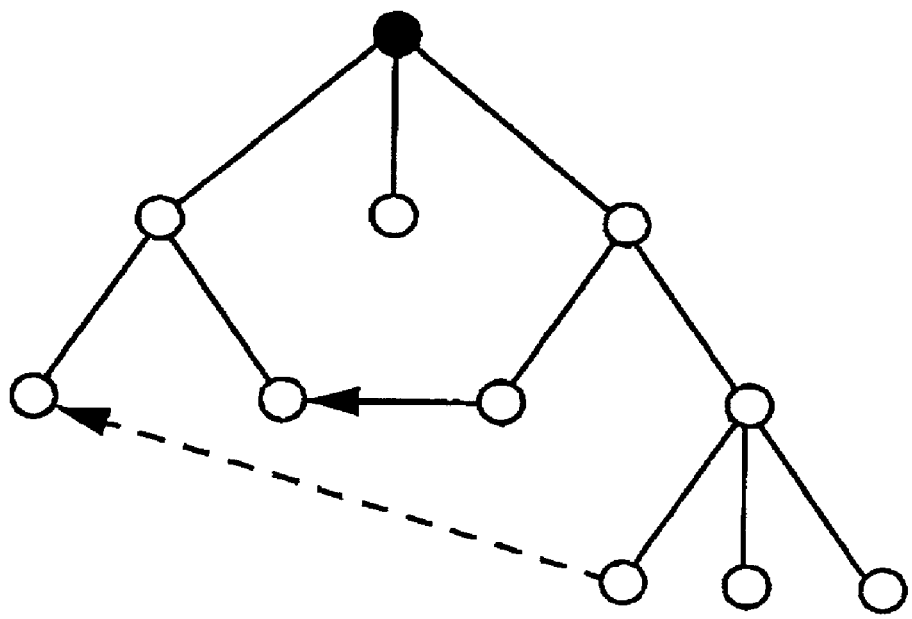
FIG. 4 shows a schematic drawing depicting the processing model of an exemplary description according to a DDF.
Figure 4:
Figure 4:
Figure 4:
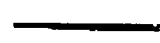
Figure 4:
Figure 4:
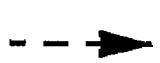

The inherent containment property of the core Descriptor object is represented by a tree-based processing model (ie., parent-children data model) where each node of the tree is either a Descriptor or Atomic Descriptor Value object. [Atomic Descriptor Value objects can only exist as leaf nodes of the tree.] The DesOM also contains references and navigational links between nodes in the tree. References are typically used to indicate relationships (eg., spatial, temporal and/or conceptual) between Descriptor objects. Navigational links are used to provide browsing properties for the description and enable linking between Descriptor objects in the description and spatio-temporal extents in the resource (eg., a particular frame in the video stream being described). A schematic depicting the description processing model is shown in FIG. 4.

Figure 5:
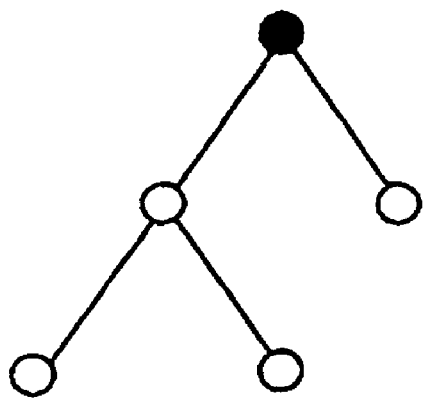
FIG. 5 shows a schematic drawing depicting the processing model of another exemplary description according to a DDF.
Figure 5:
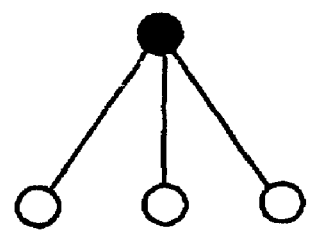
Figure 5:
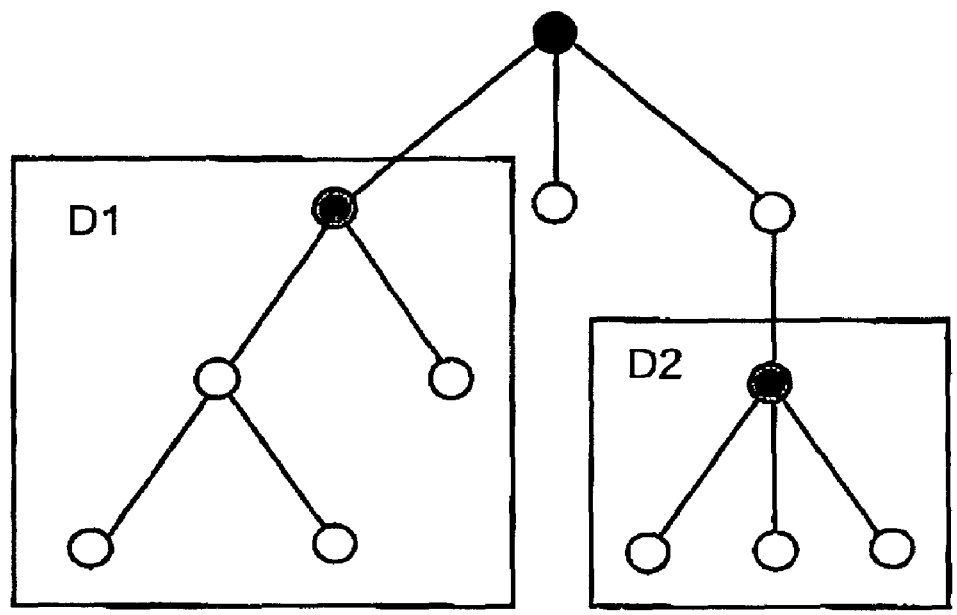

For a description to conform to the preferred DDF, the root of the DesOM must be a Description object. In other words, the root must specify the resource to which the description refers. Since a Description object is just a specialisation of the Descriptor object, any Description object can become a sub-tree of another Description object. In other words, a new Description object can be created from a set of related Description objects. This process is shown in FIG. 5.

The DesOM extends the DOM by providing the required generalisation/specialisation relationships for descriptors, data typing for, atomic representative values for descriptors, DescriptorHandlers (H) and reference and navigational links. The DOM provides a standard set of objects for representing XML documents, a standard model of how these objects can be combined, and a standard platform- and language-neutral interface for accessing and manipulating them. The DOM representation of an XML document is a tree structure where the content of an element is represented as child nodes of the element. The DOM specifies interfaces which can be used to manage XML documents. In other words, it can be implemented in any (or nearly all common) programming languages.

Similarly only interfaces are specified for the DesOM. These interfaces can be used to process XML documents that are DDF conformant. Just as an XML (DOM) Processor must implement a DOM interface, a DDF Processor must implement a DesOM interface (see FIG. 2). As mentioned in Section 2.1, a DDE Processor first performs an interpretation step in which the generalisation/specialisation relationships of descriptors is validated and processed in a Version 1.0 XML DTD form [Invalid subclassing in the description scheme expressed using the DDF and the syntax of XML DTDs should result in a description scheme parsing error.] The DDF Processor can then either parse the description into a DOM and transform that structure into a DesOM or parse the description directly into a DesOM.

Essentially the DesOM differs from the DOM in that element and text nodes are replaced by the richer interfaces of Descriptor and Atomic Descriptor Value nodes. Interfaces for these nodes are described in Section 4 and section 6.3. A basic DesOM implementation could provide just that interface, however a more expansive implementation might provide some level of interpretation of the reference and navigational relationships. For example, a set of spatial, temporal and conceptual relationships could be defined for the DDF (see Section 3.1.3) and these could be interpreted at the DesOM level.

Implementations of the DesOM could optionally execute Descriptor Handler methods to create, encode or process descriptors. For example, a DesOM implementation might implement a Descriptor Handler's method to create the content for a Descriptor if the content did not already exist.

The DesOM provides a basis for the further processing of descriptions. The tree-structure of the DesOM makes it amenable to rule-based processing where rules consist of a pattern and an associated action. Such processing could be performed by tools which implement the DesOM interface to process DDF descriptions. Rule-based processing is discussed further in Section 7 to 11.

2.4 Serialisation Syntax

The serialisation syntax preferably used for the storage and transport of descriptions and description schemes is XML Version 1.0. The XML standard was developed as a subset of Standard Generalised Markup Language (SGML). An XML document contains one or more elements, the boundaries of which are either delimited by start and end tags, or by an empty-element tag. Each element is identified by its name, sometimes also called its "generic identifier" (GI) and may have a set of attribute specifications. Each attribute specification has a name and a value. For further details on the XMML Version 1.0 standard, reference is made to the W3C website HTTP://www.w3.org/TR/1998/REC-xml-19980210.

Figure 6:
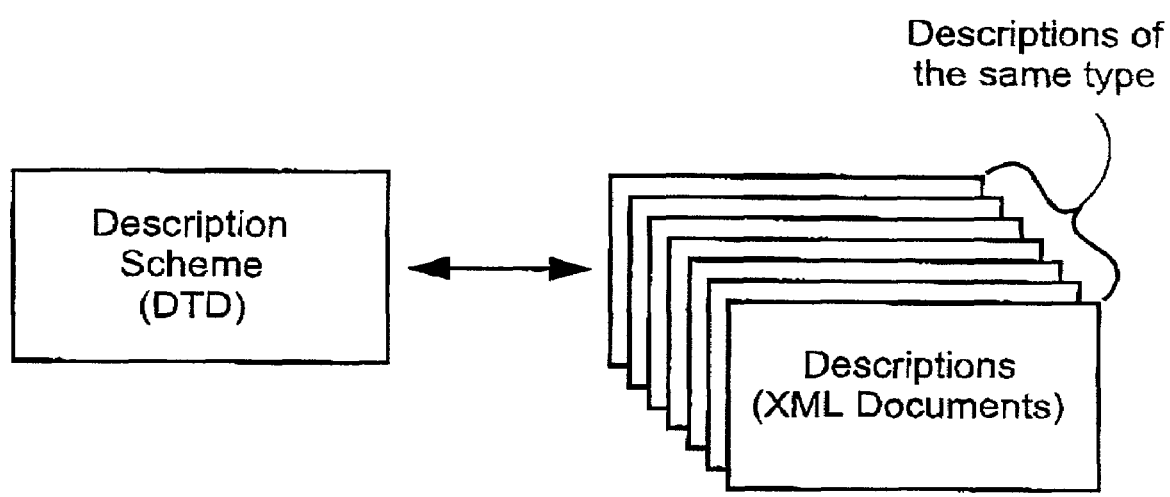
FIG. 6 shows a schematic drawing depicting the relationship between a description scheme (Document Type Definition) and descriptions(XML documents)

The preferred DDF uses a set of core elements which can be defined in an DDF Core DTD. A SGML-like DTD syntax is used to define element types and their associated attributes (as specified in the Version 1.0 XML standard). Each description can be represented by an XML document. This document (ie., the description) refers to the DTD (ie., the description scheme) to which the description conforms. In other words the description is of the type specified by the DTD (see FIG. 6)

The DDF Core DTD needs to provide definitions for the core elements required for the expression of the object model. The element definition that is central to the DDF is that of the Descriptor element. All descriptors can be defined as subclasses (specialisations) of this core element. For example, although a Description is defined to be a collection of descriptors pertaining to a single resource it is defined as a subclass of the Descriptor element. Other subclasses of the Descriptor element are used to,provide linking functionality between the descriptors and the resources, being described (see Section 3.1.4).

The data modelling requirements of the DDF are more extensive than those provided by the XML Specification version 1.0. Specifically the serialisation syntax of the DDF is able to:

Express the required descriptor relationships (see Section 2);
Provide data typing for the (atomic) representative value of a descriptor;

These requirements are addressed in Sections 2.4.1 and 2.4.2 with respect to using Version 1.0 of the XML standard as the serialisation syntax.

2.4.1 Expression of Descriptor Relationships

2.4.1.1 Generalisation/Specialisation Relationships

Version 1.0 of the XML specification does not provide for the specification of generalisation/specialisation relationships. In addition, subclass and inheritance in marked up documents is not well-defined. An element type is a subclass (specialisation) of another element type, the superclass, if it is substitutable wherever the superclass element occurs and is defined to be a subclass of the superclass. It is not essential for an element to be defined as a subclass of another element. The superclass can be viewed as a generalisation of the subclass. The notion of inheritance can be viewed as a code-saving mechanism which allows one element type to get (inherit) the properties of another element type "for free".

The preferred subclassing/inheritance guidelines for single subclassing/inheritance is described below in Sections 2.4.1.1.1 to 2.4.1.1.3. Multiple inheritance can be extended from the single subclassing/inheritance.

2.4.1.1.1 Content Model Inheritance

A subclass should faithfully implement a base class's interface. Therefore, if a base class has a content model of "ANY" then a subclass can have either an "ANY" content model or a more restricted content model. This is necessary for the subclass to be substitutable for the parent class. This is a somewhat different scenario from object oriented programming (OOP) where a subclass must accept any input that its super (parent) class can. The content model of an element should be viewed as "output" not "input". If each element is considered as an object having methods to retrieve its content, then a subclass must also be able to satisfy these methods. Each element type in a content model can be viewed as having a role and the roles of a subclass's content model must match up with those of its parent class.

A subclass cannot make more flexible or extend components of the content model of its parent class, however it can implement new child elements that will be ignored when that element is treated as its parent class.

For example, if AA, BB and CC are subclasses of A, B and C, respectively and A has a content model of (B, C) then the following are all valid content models of AA; (BB, CC), (B, C), (BB, C) and (B, CC). The content models (B, C, D), (BB, CC, D) and (D, B, C) are also valid content models for AA because they match "roles" for (B), (C) and (B, C). In addition element, AA can contain child element D which will not be visible if element AA is to be treated as an instance of element A. The content models (B) and (C) are invalid because of the "role" of (B, C) in the content model of A is not matched.

It would be possible to allow the content model for a subclass to be left unspecified in which event the subclass's content model would default to be that of the superclass. Preferably, unspecified content models should not be allowed as they do not represent a valid construct using XML/SGML DTD syntax.

2.4.1.1.2 Attribute Inheritance

The same subclass and inheritance notions apply to attributes, however attributes are more intrinsically amenable to concepts of subclassing than content because they are "random access" in some sense as are methods in OOP. A subclass can declare new attributes which are essentially ignored when the subclass is treated as it parent class. However, a subclass cannot extend, or make more flexible, attributes of the parent class.

The attribute defaults are only considered when assessing whether an attribute definition has or has not extended that of its parent class. Consequently a subclass and its specified superclass should have the same attribute type, and only the attribute default can be further restricted in the subclass. Valid restrictions of attribute default definition are as in Table 1. In addition, if the superclass has a default declaration of "#FIXED" and the value of the default can be interpreted as an element name then preferably the value of the default can be further restricted to a be a subclass of that element name.

TABLE 1

Permitted restrictions of the attribute default declaration in a subclass.

| Superclass Attribute Default Declaration | Subclass Attribute Default Declaration | | | |
| --- | --- | --- | --- | --- |
|  | #IMPLIED | #REQUIRED | "value" | #FIXED "value" |
| #IMPLIED | ✓ | ✓ | ✓ | ✓ |
| #REQUIRED |  | ✓ | ✓ | ✓ |
| "value" |  |  | ✓ | ✓ |
| #FIXED "value" |  |  |  | ✓ |

2.4.1.1.3 Implementation Details

In order to implement this subclassing/inheritance model using Version 1.0 of the XML Specification and the DOM, the superclass (or superElement) for an element is specified as an attribute in the element's defined attribute list. It is believed that this is not ideal and that subclassing information should be part of the element's definition. For example, the keyword "TYPEOF" has been suggested as a means of representing subclassing information (ie., <!ELEMENT Cat TYPEOF Animal>).

The subclassing/inheritance implied by the use of the superElement attribute needs to be interpreted and validated against the provided guidelines for subclassing/inheritance.

Failure to conform to these guidelines should result in a description scheme parsing error. Also, in order for a serialised DDF description to be a valid XML document, the description needs to conform to a valid XML DTD. Therefore the DDF description scheme that is expressed using the syntax of XML DTDs needs to be parsed to create an XML DTD in which all the inheritance aspects of the subclassing relationships are processed. This involves:

- Making explicit content models which depend on subclassing (this may involve extending content models so that they represent valid XML DTD content models in the absence of subclassing semantics);
- The addition of inherited attribute definitions to subclassed Descriptor definitions.

2.4.1.2 Equivalence Relationships

The location of described resources can be achieved by the method by formulating requests directly based on a description scheme or by more unstructured queries in which the contents of a description scheme are unknown. Typically the former approach will result in a more satisfactory result because the query is specifically formulated for the form of the descriptions. However, in some cases a query might be formulated without a (complete) knowledge of a description scheme (and hence use different terms than those used in the description scheme) or in a language other than that used by particular descriptions.

As highlighted in Section 1.2 there are three types of equivalences:

- Intra-language equivalences (ie., synonyms or quasi-synonyms);
- Inter-language equivalences (ie., translations);
- Inferred equivalences between textual and non-textual representative values.

Known intra-language equivalences could be incorporated into a descriptor's definition using an alias or sameAs attribute for elements. However, applications and tools that provide a level of intra-language equivalence interpretation exist and therefore it was considered unnecessary to provide this functionality. Separate search/query/filter engines can ultimately provide some level of intra-language equivalence interpretation.

It is desirable to provide a means for inter-language equivalence as queries will not always be formulated in the same language as the description. Although some degree of redundancy can be tolerated in a description scheme (ie., descriptors in different languages could be defined), it is not generally acceptable to express a description in multiple languages. The method can translate a parsed description into the language of the query by processing a set of rules that is defined for the description scheme. This set of rules effectively replaces the descriptors in the DesOM with equivalent descriptors in the same language as the query. This method provides a controlled mapping between descriptors in different languages rather than allowing a mapping to be estimated by a translation ability in the search/query/filter engine.

Equivalences between non-textual and textual descriptors can be provided in a similar manner. For example, if the colour of an object in an image is stored as a (R, G, B) value then a rule could instantiate another descriptor in the DesOM that maps the particular (R, G, B) values to particular colours expressed as a text string (eg., red, green, blue, orange, etc.).

The rules are stored as a rule set that can be specified as part of the description. The extra or translated descriptors are not serialised and are only generated when they are needed. In other words, they only exist in the DesOM and not in the XML document that represents the description. Rule sets are a way of providing a richer, more flexible, description at the time of the description being processed without increasing the overhead of storing redundant information.

2.4.1.3 Association Relationships

Association relationships specify the context in which a defined Descriptor can occur. The context includes relationships such as containment (eg., Descriptor A must occur within a Descriptor B), sequence (eg., Descriptors A, B, and C must occur in that order), and cardinality (eg., Descriptor B can occur only once in an instance of Descriptor A).

To a large extent these association relationships can be specified in an XML DTD using an element's content model. A content model is a simple grammar governing the allowed types of child elements (ie., containment) and the order in which they are allowed to appear. Group connectors [and (comma), or (vertical bar)] are used to specify the order in which child elements can appear within the element. Occurrence indicators [one or more (+), zero or more (*), or zero or one (?)] are used to specify the cardinality or occurrence of the child elements in the element's content. Element content models are described in Section 3.2.1 of 7]. The XML content model 1.0 does not allow a specific non-zero cardinality to be defined (eg., an image can contain 0 to 20 objects) and consequently this association property is not provided in the preferred DDF implementation.

2.4.1.4 Spatial, Temporal and Conceptual Relationships

Many descriptors will need to be able to model spatial, temporal and conceptual relationships often in addition to association relationships. For example, a Region Adjacency Graph which describes an image, comprises a graph object that contains a set of regions. In addition to being part of the graph object, each region also has a set of neighbouring regions (ie., spatial relationships). These relationships can be described using references to the relevant descriptors in the description.

In the method, these relationships are represented as Descriptors having atomic Descriptor values with IDREF or IDREFS data types. A set of core relationship descriptors is defined in the DDF Core DTD to enable DesOM implementations to realise a greater extent of semantic interpretation. Examples of the types of descriptor definition to are included are provided in Section 3.1.3.

2.4.1.5 Navigational Relationships

Many applications may require that descriptors can be explicitly linked to spatially and/or temporally localised extents in a resource. Although the resource is typically that being described, this is not always the case. The links should enable navigation from descriptors to indicated locations in a resource (eg., from a descriptor to a spatially and temporally localised extent in a digital video stream).

The means for expressing these links has been derived from an existing approach to this problem, namely the HyTime standard, which uses location address elements, or locators. This method requires that the resource must be declared as an external entity in the description. Link elements are then declared to create contextual (having a single linkend) and independent (having more than one linkend) links between locations in the description and extents in the declared entity. Locators provide a means for addressing extents in the resource being described The Locator and Extent elements defined in the DDF Core DTD are much simpler than those specified in the HyTime standard as the latter provided more than was required for the DDF requirement of linking. Also, because it is difficult to envisage all the possible different forms of locators required for the different media types it was believed that description scheme designers should not be limited in the scope of their design of required locators.

2.4.2 Expression of Specific Data Types

The content model for an element can specify the order and cardinality of allowed child elements (see Section 2.4.1.3), that the element has EMPTY or no content, that the element has parsed character data (ie., #PCDATA), or some mixture of parsed character data and child elements (ie., ANY). [The allowed content models of elements are detailed in Section 3.2.1 of XML 1.0 WC3 recommendation]. If the content of an element is used to store the representation value of a feature (eg., "DateCreated"), then the content model of the relevant Descriptor would need to be "#PCDATA" (or "ANY") and the content would be represented as a character string. Although this might be acceptable for a textual interpretation of the description, this form of representation does not permit more advanced queries where, for example, descriptions may be required to be selected if the "DateCreated" feature has a representation value that is later than some provided date. In other words, it is necessary to know how to parse the character content of the Descriptor (ie., the Atomic Descriptor Value).

The serialisation syntax of the DDF provides data typing of an element's content by using a dataType attribute for the element. Although it would not be explicit for a Version 1.0 XML (DOM) Processor, a DDF Processor can use the data type attribute to interpret an element's content appropriately. Datatyping of element content has been considered as part of the XML working group discussions and hence it would be preferable if the DDF could remain consistent with the XML standard.

In addition to the basic data types (eg., integer, floating-point value, string, date, time, etc.), the dataType attribute should allow types such as ID, IDREF and ENTITY in order to enable Atomic Descriptor Values to represent references to other Descriptors and links to entities external to the description. The XML concept of ENTITIES is preferred to using a URI data type in that the ENTITY type allows a URI to be linked to a type of the entity (eg., JPEG image, Java class, etc.).

2.5 Implementation Issues

An implemented DDE Processor could use publicly available software (eg. IBM's XML parser; to parse descriptions into a DOM structure and the the method transforms this structure into a DesOM structure. The Java language is preferably used to implement Descriptor Handler classes because of its cross-platform properties.

Actual implementations of a DDF Processor would not need to create a DOM as an intermediate step and could parse the XML document directly into a DesOM structure using the DDF description scheme. Such a processor would need to first interpret the subclassing information in the DDF description scheme (see FIG. 2A).

A DDF Processor implementation could also take advantage of other core relationship descriptors (see Section 2.4.1.4) to provide a richer semantic interpretation of descriptions. Implementations could also interpret the linking elements when providing a graphical representation of descriptions and incorporate rule-engines to process rules which might be applied to the DesOM.

3. Serialisation Syntax Specification 3.1.1 Element Definitions

The preferred DDF includes the definition of a set of core elements using the XML/SGML DTD syntax. This set, is preferably stored in a core, or set of core, DTDs. Appendix A contains an example of such a DTD, Core.ddf. Note that we use the extension "ddf" to differentiate this document from an XML DTD which would typically have the extension "dtd". A DDF set of definitions needs to have its subclassing/inheritance properties (eg., attribute inheritance from super elements) processed before a description can be interpreted with respect to set of DDF definitions. The set of core elements can be used as a basis for the definition of application DTDs or description schemes. The element definitions in the Core.ddf effectively provide a set of "foundation" elements from which description schemes can be based.

This specification of the core element definitions for the proposed DDF is based on Version 1.0 of the XML Specification. Elements that are included in the proposed Core.ddf are named according to the naming conventions used for Java classes (ie., all words in the name are capitalized and concatenated).

3.1.2 Core DDF Element Definitions 3.1.2.1 Descriptor Definition

The Descriptor element is the basic element which provides the data modelling properties detailed in Section 2.2. Any element definition requiring any of these properties should be represented as a subclass of this element. The element is the markup equivalent of the object class of an object-oriented programming language.

The content model for the Descriptor element needs to allow for either parsed character data (atomic representation value) or one or more Descriptor elements (compound representative value). The content model of the Descriptor element is defined to be "ANY" so as to allow the necessary content and be a valid XML DTD syntactical construct. However in order to control content models more tightly, it is also possible to define two subclasses of the Descriptor, the Atomic Desciptor and the Compound Descriptor. The content models of these subclasses could then have the more restricted content models of #PCDATA and (Descriptor+), respectively.

In specialisations of the basic Compound Descriptor element, the "Descriptor+" would need to be interpreted by the DDF Interpreter as one or more Descriptor or subclasses of Descriptor elements. Specialisations of the Descriptor element that use this content model by default may have their content model extended to "ANY" during the DDF interpretation process (see Section 2.4.1.1.3) in order to form a valid XML DTD for a description scheme.

```
<!ENTITY % DataTypes "(Int|Float|Double|String|Date|Time|ID|IDREF|
IDREFS|ENTITY|ENTITIES)">
<!ELEMENT Descriptor (ANY)>
<!ATTLIST Descriptor
    id              ID           #IMPLIED
    xml:lang        CDATA        "en"
    dataType        %DataTypes;  "String"
    superElement    NMTOKEN      #IMPLIED
    handler         ENTITY       #IMPLIED
>
```

Attribute id

The value of this attribute provides a natural way to refer to a particular element (eg., in references). It must be unique for the document, Attribute xml:lang The attribute xml:lang is included in Version 1.0 of the XML Specification. It specifies the natural language or formal language in which the content (of the element) is written. The default language used by the Descriptor element is English. If a description scheme was defined in French, for example, then one approach would be to define a FrenchDescriptor in which the value of xml:lang was FIXED to "fr", and then derive all application descriptors from the FrenchDescriptor element Attribute dataType Preferably, the definitions of many descriptors require some control over the data type of an element's character data content.

The allowed data types for character data content are specified by the (XML) interval parameter entity, DataTypes (see above). The dataType attribute is only utilised if the content model for the Descriptor contains #PCDATA and the provided content for the Descriptor contained character data. In other words, if the content of a Descriptor is specified to contain child elements (ie., a compound representative value) then the dataType attribute is not used. In an alternative implementation, the allowable data types could include a "Compound" type which would make the use of a compound descriptor more explicit in its definition.

Character data content of a Descriptor is represented by a DDF Processor using a AtomicDescriptorValue node (see Section 4 1.3 for the interface specification) rather than a Text node as used by a DOM Processor.

The default value of the attribute dataType is "String". This means that the dataType attribute does not need to be included in a Descriptor element's definition if the content of the element is to be treated as a string. Preferably, the DDF Processor dates and times are based on the profile of ISO 8601. The types, ENTITY/ENTITIES/ID/IDREF should be parsed as defined for the XML Version 1 standard.

Although the data type of the Descriptor element's character data content cannot be directly used by XML version 1.0 and DOM version 1.0 specifications, it might in some way assist textual access to the description. Also placing the data type of the character data content in an attribute is consistent with many current proposals for data typing in XML.

Some Descriptors will require their representative value to be limited to a list of possible values (ie., an enumeration). In these cases, it is preferable to construct Descriptor elements (having an EMPTY content model) for each of the enumerated values and then specify the enumeration in the content model for the parent Descriptor. An alternate approach is to include an enumeration data type and use a #PCDATA content model.

Attribute superElement

The value of this attribute is an element name which is the parent (or super) element of the Descriptor element. The parent element's definition must be available. Subclassing is implemented as described in Section 2.4.1.1.

The information in this attribute is used by the DDF interpretation process (see FIG. 2) to validate the defined subclassing and to process the inheritance of attributes. When accessed at the DOM level, this attribute provides only descriptive information about the immediate generalisation of the element. When processed at a DesOM level the subclassing relationship(s) for the element are represented as a node list or inheritance tree (see Section 4.1.1).

Attribute handler

The value of this attribute specifies an external entity for a Descriptor Handler to be used to provide methods for the Descriptor element. The Descriptor Handler is a class which contains methods that conform to a specified Descriptor Handler interface (see Section 4.1.2).

The Descriptor Handler is specified using an ENTITY which can be defined in the description scheme (preferably before the elements of the scheme are defined). The ENTITY declaration can use a NOTATION to declare the type of the external entity and a helper application required to process the ENTITY. In the example below, a NOTATION is declared for a JavaClass type and this type is linked to the "Java" helper application (ie., Java virtual machine). An individual Java class in then declared using an ENTITY declaration which uses the JavaClass NOTATION.

```
<!NOTATION JavaClass SYSTEM "Java">
<!ENTITY MyDesoHandler SYSTEM
    "MyDescHandler.class" NDATA JavaClass>
```

Preferably, it is assumed that the methods provided by the Descriptor Handler do not require any parameters that are not available from the DesOM (eg., resource from a Description element). If methods of a Descriptor Handler require parameters to be set from individual descriptions, then attributes of a specialisation of the Descriptor element can be used to hold the parameter values. A Descriptor Handler could then have a method to set the parameters from the attribute values in the DesOM.

3.1.2.2 Description Definition

A Description element is defined as a subclass of the Descriptor element. It represents the root node of an instance of the DesOM and should be the root element of a serialised description (ie., an XML document).

The content model for the element is defined as one or more Descriptors. This is a restriction of the content model of the Descriptor element. As with the Descriptor element, definitions of specialisations of this element need to be interpreted by the DDF Interpreter as one or more Descriptor or Descriptor subclass elements.

```
<!ELEMENT Description (Descriptor+)>
<!ATTLIST Description
superElement            NMTOKEN     #FIXED "Descriptor"
resource                ENTITY      #REQUIRED
dateResourceLastModified CDATA      #IMPLIED
ruleSets                ENTITIES    #IMPLIED
>
```

Attribute superElement

Although the attribute superElement is inherited from the Descriptor element's definition, it is redefined here to declare that the Description element is a subclass of the Descriptor element. The default superElement is declared as #FIXED so that instances of the Description element cannot redefine the superElement value. Note, that a specialisation of the Description element can further restrict this default attribute value by specifying an element name that is a subclass of the Descriptor element (see 2.4.1.1.2).

Attribute resource

This value of this attribute should contain an entity which references the resource being described by this description. The resource must have been declared as an entity in the description before the Description can be declared. The resource type can be obtained by using a NOTATION, defined in either the description scheme or in the Core.ddf, to describe the type of entity:

eg., <!NOTATION MPEG-2 SYSTEM "MPEG-2Player">.

The NOTATION can then be used by an external ENTITY declaration in the DOCTYPE declaration of the description:

eg., <!ENTITY MyVideo SYSTEM "MyVideo.mpg" NDATA MPEG-2>.

Note, that this method of referencing the resource being described not only identifies it as an MPEG-2 resource but also provides the name of a processor (helper application) for the resource type.

Attribute dateResourceLastModified

The value of this attribute is a string representation of the date that the resource was last modified. At any stage a process can check to see if this date has changed (by string comparison), and update the description if necessary.

Attribute ruleSets

The value of this attribute contains one or more external ENTITIES. Each ENTITY refers to an XML document that contains a set of rules that can be applied to the description (see Section 7).

3.1.3 Descriptors Representing Spatial, Temporal and Conceptual Relationships

A set of Descriptor elements have been included to provide spatial, temporal and conceptual relationships between descriptors. These elements are preferably a part of the core DDF elements rather than specified in individual application description schemes in order to improve the semantic interpretation of description. These relationship Descriptor elements can have either atomic or compound representation values. The element set below is included more by way of example rather than attempting to demonstrate a complete list of the types of relationships that need to be modelled.

```
<!ELEMENT ParallelSequence (Descriptor+)>
<!ATTLIST ParallelSequence superElement    NMTOKEN     #FIXED "Descriptor"
>
<!ELEMENT SerialSequence (Descriptor+)>
<!ATTLIST SerialSequence superElement    NMTOKEN     #FIXED "Descriptor"
>
<!ELEMENT Neighbours (#PCDATA)>
<!ATTLIST Neighbours superElement    NMTOKEN     #FIXED "Descriptor"
dataType        %DataTypes; "FIXED "IDREFS"
>
<!ELEMENT Before (#PCDATA)>
<!ATTLIST Before superElement    NMTOKEN     #FIXED "Descriptor"
dataType        %DataTypes; #FIXED "IDREFS"
>
```

-continued

```
<!ELEMENT After (#PCDATA)>
<!ATTLIST After superElement    NMTOKEN     #FIXED "Descriptor"
dataType        %DataTypes; #FIXED "IDREFS"
>
<!ELEMENT InFrontOf (#PCDATA)>
<!ATTLIST InFrontOf superElement    NMTOKEN     #FIXED "Descriptor"
dataType        %DataTypes; #FIXED "IDREFS"
>
<!ELEMENT Behind (#PCDATA)>
<!ATTLIST Behind superElement    NMTOKEN     #FIXED "Descriptor"
dataType        %DataTypes; #FIXED "IDREFS"
>
```

3.1.4 Elements Representing Navigational Relationships

The preferred DDE also includes some core elements that enable the linking of descriptions to spatio-temporal extents of the content being described. A spatio-temporal extent is defined to be a section of the content that is spatially and/or temporally localised. For example, a spatio-temporal extent of a digital video signal might be represented as a rectangular region that extends for a number of frames. A contextual link, CLink, is defined to represent the common cross-reference or navigational link. A CLink connects the location in the description where the link occurs to another location. In other words, a CLink has a single linkend attribute. An independent link, or ILink, is also defined for applications that require links connecting more than two locations or stored separately from the link's location in the description. These elements are defined as subclasses of the basic Descriptor element so that they are interpreted by the DDF and represented as nodes in the DesOM. Since these elements do not require any of the data modelling properties described in Section 2.2, there may be a case for allowing elements, such as the set defined below, to not be based on the Descriptor element but still interpreted by a DDF processor.

The definitions of these linking elements are included in Core.ddf. Note it might be preferable to include the definition of the core spatio-temporal linking elements in a separate (ddf) DTD.

```
<!ELEMENT CLink (#PCDATA)>
<!ATTLIST CLink superElement    NMTOKEN     #FIXED "Descriptor"
dataType        %DataTypes; #FIXED "IDREF"
>
<ELEMENT ILink (#PCDATA)>
<!ATTLIST Ilink superElement    NMTOKEN     #FIXED "Descriptor"
dataType        %DataTypes; #FIXED "IDREFS"
>
```

The core Locator element simply provides an address for the location of one or more Extent elements within a particular resource. The value of the resource attribute identifies the resource using an ENTITY that has been previously declared in the description. This requires that the Core.ddf also includes a sufficiently rich set of NOTATIONS that include the types of resources that are going to be referenced by entities (eg., JPEG, TIFF, MPEG-1, MPEG-2, etc.). An instance of a Locator must contain one or more instances of an Extent. It is desirable to specify the resource even if it is the same resource specified for the description.

Several subclasses of Extent elements are defined in the Core.ddf. The definitions of these elements are included below. These element definitions provide an example of the types of Locator and Extent elements that could be required.

```
<!ELEMENT Locator (Extent+)>
<!ATTLIST Locator
superElement    NMTOKEN     #FIXED "Descriptor"
resource        ENTITY      #REQUIRED
>
<!ELEMENT Extent (Descriptor+)>
<!ATTLIST Extent superElement    NMTOKEN     #FIXED "Descriptor"
>
<!ELEMENT ImageExtent (Descriptor+)>
<!ATTLIST ImageExtent superElement    NMTOKEN     #FIXED "Extent"
>
<!ELEMENT RectImageExtent
(RectImageExtentX0, RectImageExtentY0,
RectImageExtentHeight, RectImageExtentWidth)>
<!ATTLIST RectImageExtent superElement    NMTOKEN     #FIXED "ImageExtent"
>
<!ELEMENT RectImageExtentX0 (#PCDATA)>
<!ATTLIST RectImageExtentX0 superElement    NMTOKEN     #FIXED "Descriptor"
dataType        %DataTypes; #FIXED "Int"
>
<!ELEMENT RectImageExtentY0 (#PCDATA)>
<!ATTLIST RectImageExtentY0 superElement    NMTOKEN     #FIXED "Descriptor"
dataType        %DataTypes; #FIXED "Int"
>
<!ELEMENT RectImageExtentHeight (#PCDATA)>
<!ATTLIST RectImageExtentHeight superElement    NMTOKEN     #FIXED "Descriptor"
dataType        %DataTypes; #FIXED "Int"
>
<!ELEMENT RectImageExtentWidth (#PCDATA)>
<!ATTLIST RectImageExtentWidth superElement    NMTOKEN     #FIXED "Descriptor"
dataType        %DataTypes; #FIXED "Int"
>
<!ELEMENT VideoExtent
(VideoExtentStart, VideoExtentEnd, ImageExtent?)>
<!ATTLIST VideoExtent superElement    NMTOKEN     #FIXED "Extent"
>
<!ELEMENT VideoExtentStart (#PCDATA)>
<!ATTLIST VideoExtentStart superElement    NMTOKEN     #FIXED "Descriptor"
dataType        %DataTypes; #FIXED "Int"
>
<!ELEMENT VideoExtentEnd (#PCDATA)>
<!ATTLIST VideoExtentEnd superElement    NMTOKEN     #FIXED "Descriptor"
dataType        %DataTypes; #FIXED "Int"
>
```

4. DesOM API Specification

The DesOM interface extends the existing DOM Object Model (DOM) interface specification. The DOM is a platform and language-neutral interface that will allow programs and scripts to dynamically access and update the content, structure and style of XML and HTML documents. It provides a standard set of objects for representing HTML and XML documents, a standard model of how these objects can be combined, and a standard interface for accessing and manipulating them. Vendor can support the DOM as an interface to their proprietary data structures and APIs, and content authors can write to the standard DOM interfaces rather than product-specific APIs, thus increasing interoperability on the Web.

The DOM interface does not stipulate how its associated methods are to be implemented. For, example, the method getElementsByTagName( ) (Appendix K) must satisfy the DOM interface, but can be implemented in any manner as a developer so choses. The implementation of the methods associated with DesOM and DOM interfaces are not essential to the invention and will not be described further.

The DOM Level 1 Specification is now publicly available; it has been reviewed by W3C Members and other interested parties and has been endorsed by the Director as aW3C Recommendation. For further details on the DOM version 1.0 standard reference is made to the W3C website HTTP://www.www.w3.org/TR/1998/REC-DOM-level-1-199810001.

As mentioned, the DesOM requires extensions to the DOM, These extensions are in the form of additional interface specifications. These specifications are detailed in this Section using the Object Management Group (OMG) Interface Definition Language (IDL). The specified interface represents a minimal interface for the DesOM.

4.1.1 Interface Descriptor

The Descriptor node object in the DesOM is a subclass of the DOM Element node object (see Appendix K). Like the Element node object, the Descriptor node object represents both the Descriptor element, as well as any contained elements.

IDL Definition

```
interface Descriptor : Element {
    void             setHandler(in DescriptorHandler handler);
    DescriptorHandler getHandler( );
    NodeIterator     getSuperElements( );
};
```

Method setHandler( )

Set the DescriptorHandler for this Descriptor node object. This handler can be instantiated on the basis of the handler ENTITY that is specified as the value of the handler attribute for the Descriptor element.

| Parameters | |
|---|---|
| handler | The DescriptorHandler to be assigned to this Descriptor node. |
| Returns | void |
| Exceptions | This method throws no exceptions. |

Method getHandler( )
Returns the DescriptorHandler for this Descriptor node object.

| | |
|---|---|
| Parameters | None |
| Returns | DescriptorHandler for the Descriptor node object. |
| Exceptions | This method throws no exceptions. |

Method getSuperElements( )
Returns a list of Descriptor generalisations or superElements for the Descriptor node object.

| | |
|---|---|
| Parameters | None |
| Returns | NodeIterator |
| Exceptions | This method throws no exceptions. |

4.1.2 Interface DescriptorHandler

The DescriptorHandler object provides methods for a class of Descriptor nodes. A DescriptorHandler can provide methods for more than one type of Descriptor. For example, a collection of Descriptors might use the same similarity metric.

Preferably, the interface for the DescriptorHandler is fixed. In other embodiments this interface can be specified either for a Descriptor or description scheme.

The methods of a DescriptorHandler are generally implemented as class (static) methods.

IDL Definition

```
interface DescriptorHandler {
boolean    canCreateDescriptorContent( );
void       createDescriptorContent(Descriptor descriptor, Entity resource);
void       removeDescriptorContent(Descriptor descriptor);
double     getSimilarity(Descriptor descriptor1, Descriptor descriptor2);
};
```

Method canCreateDescriptorContent( )
Returns true if the DescriptorHandler contains an implemented method that can create the content for a descriptor.

| | |
|---|---|
| Returns | True if a method has been implemented else returns false. |

Method createDescriptorContent( )
Generates the content (ie., child nodes) of the specified Descriptor node object using the specified resource.

| Parameters | |
|---|---|
| descriptor | The Descriptor node object for which the content (ie., child nodes) is to be created from the resource. |
| resource | The resource, represented as an entity. from which the content is to be derived. |
| Returns | void |

-continued

| Parameters | |
|---|---|
| Exceptions | This method throws a ResourceNotFoundException if the resource could not be found, or a IllegalResourceException if the resource is not compatible with the method. |

Method removeDescriptorContent( )
Removes the content (ie., child nodes) of the specifies Descriptor node. This method might be invoked to reduce the complexity of a description for storage and would typically only be invoked if the DescriptorHandler was capable of re-creating the specified descriptor's content.

| Parameters | |
|---|---|
| descriptor | The Descriptor node object for which the content (ie., child nodes) is to be removed. |
| Returns | void |

Method getSimilarity( )
Returns a similarity metric in the range of [0, 1.0] which provides a measure of the similarity between the two specified Descriptor node objects.

| Parameters | |
|---|---|
| descriptor1 | The first of the two Descriptor node objects to be compared. |
| descriptor2 | The second of the two Descriptor node objects to be compared. |
| Returns | double |
| Exceptions | This method throws an UnmatchedDescriptorException if the two Descriptor node objects are of incompatible types. |

4.1.3 Interface AtomicDescriptorValue

The AtomicDescriptorNode object is a subclass of the Text (node) object that is specified as part of the DOM [The Text object contains the non-markup content of an Element]. It provides additional methods to the Text object which interpret the string data content of the Text object as other data types (ie., it is effectively a typed text node). The data types available are as specified for the dataType attribute of the Descriptor element (see Section 3.1.2.1). It is assumed in this specification that the XML data types (ie., IDs, IDREFs, ENTITY, ENTITIES) would be interpreted from the string value of the AtomicDescriptorValue node.

Dates and times are represented using the date an time formats specified by the profile of ISO 8601. Implementations of the AtomicDescriptorValue object can provide further methods that provide extra date functions (eg., getDataAsDateYear( ), getDataAsDateMonth( ), etc.).

IDL Definition

```
interface AtomicDescriptorValue : Text {
int             getDataAsInt( );
float           getDataAsFloat( );
```

```
        double    getDataAsDouble( );
        Date      getDataAsDate( );
        Time      getDataAsTime( );
    };
```

Method getDataAsInt( )
   Returns the value of the Text node as an integer.

| Parameters | None |
|---|---|
| Returns | Integer |
| Exceptions | This method throws a DDFDataFormatException if the character string could not be parsed as an integer. |

Method getDataAsFloat( )
   Returns the value of the Text node as a float value.

| Parameters | None |
|---|---|
| Returns | Float |
| Exceptions | This method throws a DDFDataFormatException if the character sizing could not be parsed as a float value. |

Method getDataAsDouble( )
   Returns the value of the Text node as a double value

| Parameters | None |
|---|---|
| Returns | Double |
| Exceptions | This method throws a DDFDataFormatException if the character string could not be parsed as a double value. |

Method getDataAsDate( )
   Returns the value of the Text node as an ISO 8601 date.

| Parameters | None |
|---|---|
| Returns | ISO 8601 date |
| Exceptions | This method throws a DDFDataFormatException if the character string could not be parsed as an ISO 8601 date. |

Method getDataAsTime( )
   Returns the value of the Text node as an ISO 8601 time.

| Parameters | None |
|---|---|
| Returns | ISO 8601 time |
| Exceptions | This method throws a DDFDataFormatException if the character string could not be parsed as an ISO 8601 time. |

5. Example of a Description Scheme

An example of a description scheme expressed in DDP is contained in Appendix B. The description scheme aims to provide a description for digital video footage of an Australian Football League (AFL) game. This description scheme makes use of some core element definitions that are contained in Appendix A. The Core.ddf is declared as an internal parameter entity B1 and then included in the description scheme using the % operator (see B2). The indicated lines B1 and B2 of the description scheme result in all the element definitions included in Appendix A being available to the example description scheme.

In the definition of the descriptor AFLGameDescription B3 a descriptor handler B4 is specified. In this example, the descriptor handler is implemented as a Java class (AFLGameGen.class in the example contained in Appendix B) having a predetermined procedural method which automatically generates the (description) content for the AFLGameDescription descriptor by analysing the digital video signal containing the footage of the game being described.

It should be noted that although the AFLGameDescription element is defined as a specialisation of a Description element, a Description element is just a specialisation of a Descriptor element, and so the AFLGameDescription can also be treated as a Descriptor.

An example description generated from the description scheme contained in Appendix B is shown in Appendix C. This example description would typically have been initially generated by the descriptor handler for the AFLGameDescription descriptor, however manual creation is also possible if an annotator so desires. The procedural method to generate the content for the descriptor AFLGameDescription would typically analyse the digital video resource signal containing the footage of the game to be described, identify the start and end of the four quarters of play, and within each quarter track and, if possible, identify individual tracked players. The tracking could be achieved using motion analysis of the digital video resource with player identification being achieved by attempting to recognise a player's number from his/her jersey. It is not an object of this invention to specify a method for generating the content of the description.

Clearly it is unlikely that all the information required for the description, as specified by the description scheme, could be automatically generated from an analysis of the digital video resource signal. Where information is not available (eg., date and location of the game), the content generation method can either generate empty descriptors or simply omit the descriptors from the description. At a later date an annotator can add this information manually if it is required. Similarly, it might be too difficult for an automatic analysis to classify the action of each tracked player. For example, it might be difficult to automatically analyse whether the player was involved in a mark, a kick or a tackle. This information could also be provided at a later date. In fact, an annotator could use a Digital Video Browser System, as described in Section 13, to browse the digital video resource and annotate as required. On completion of annotation the Digital Video Browser System could also be used to select to play all those sections of the digital video resource in which a particular player was involved, or all those sections in which a mark occurred. In other words, the Digital Video Browser System could be used to complete any annotation tasks and browse the described digital video resource.

Another example of a method to create the content for a descriptor, is one where the resource to be described has already been described using another description scheme. For example, a digital video camera might generate a description (using, for example, a Video Capture Description Scheme) for a digital video resource as it is being captured. The automatically generated description might contain information such as exposure, focus, eye-gaze location, shot boundaries, etc. It might be desirable to maintain some, if not all, of the information automatically recorded using the source description scheme, however it might be preferable to describe the digital video resource using another more generally accepted description scheme, in his case the destination description scheme. In this case the descriptor handler(s) in the destination description scheme could provide a mapping of descriptors from the source to destination descriptions. This mapping would typically be provided in the content creation method of descriptor handler for the Description element of the destination description scheme. This transformation from one description scheme to another could also be achieved by applying rules to the DesOM (see Section 7).

Figure 7A:
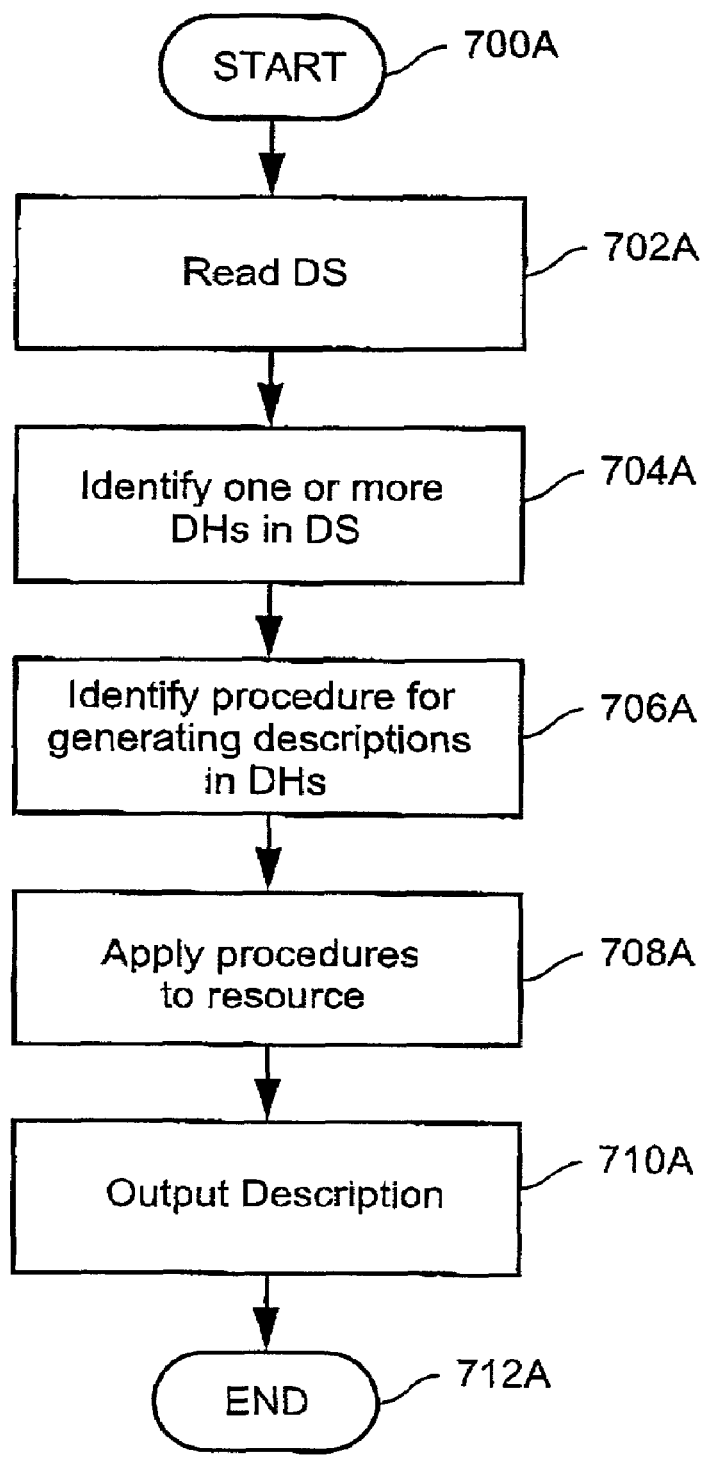
FIG. 7A is a flow diagram of a method of generating a description of a resource in accordance another embodiment.

6. Methods of Applying Procedures 6.1 Method of Generating Descriptions of Electronically-Accessible Resources Turning now to FIG. 7A, there is a shown a method of generating descriptions of an electronically accessible resource. The method commences at step 700A and continues at step 702A where a description scheme is read by a processor (i.e. the description generator). In the next step 704A, a processor identifies the one or more DescriptorHandlers in the description scheme and afterwards the method continues to step 706A. In step 706A, the processor identifies the procedures corresponding to the previously identified DescriptorHandlers. These procedures are in the form of procedural code contained in the DescriptorHandlers. In the next step 708A the procedures are applied to the resource. The procedure generates a representative value which is associated with an attribute (i.e. feature) of the resource. The method then outputs at step 710A the results of the application of the procedures. The method terminates at step 712A. Preferably, these procedures result in the automatic generation of a description of the resource in the form of a DesOM which may be subsequently seralised as a XML document. However other procedures or processes may be envisaged. Further this resultant description is preferably interpretable by both humans and machines.

6.2 Methods of Applying Procedures to a Description

Figure 7B:
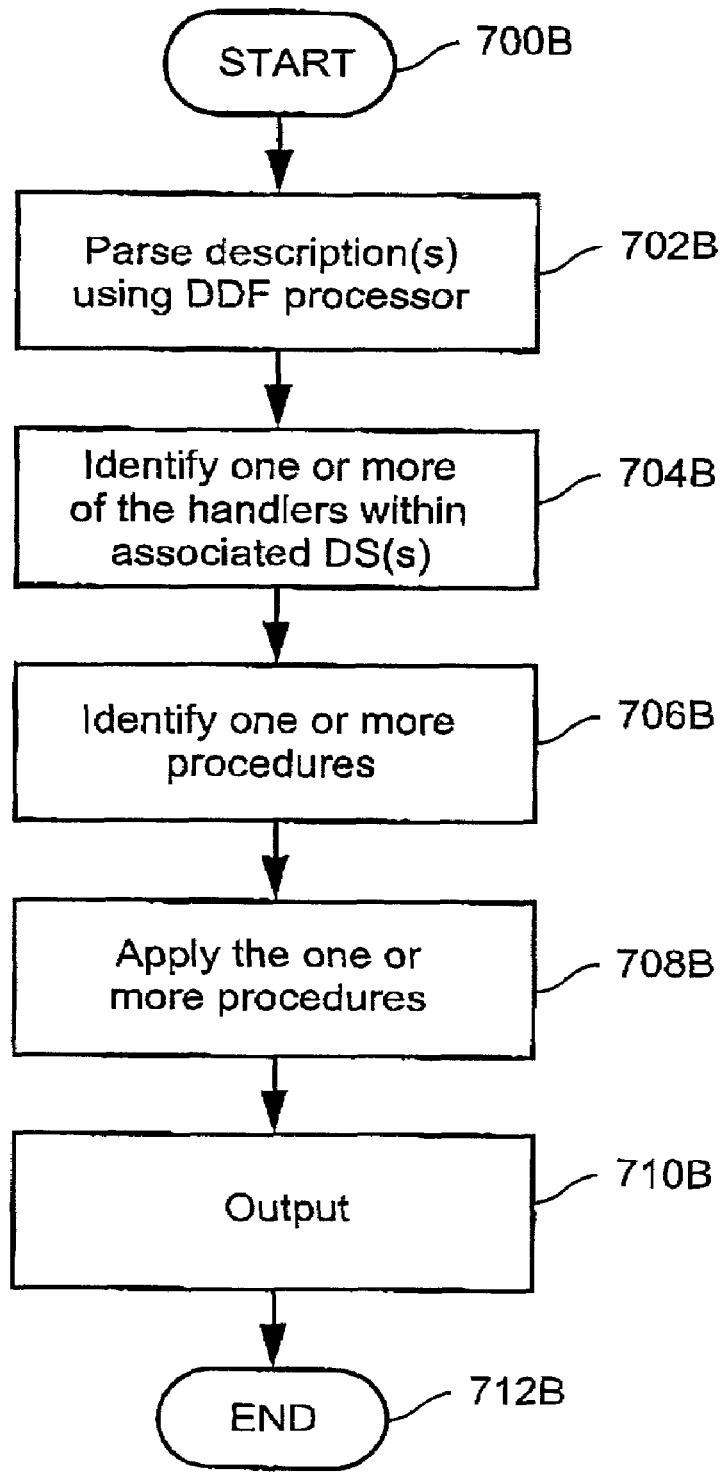
FIG. 7B is a flow diagram of a method of processing a description of a resource in accordance another embodiment.

Turning now to FIG. 7B, there is shown a flow diagram of a method of applying procedures to description(s) of resource(s). The method commences at step 700B and continues at step 702B where a description is parsed by a DDF processor. In the next step 704D, the DDF processor identifies within the associated description scheme one or more DescriptorHandlers. In the next step 706B of the method, the DFF processor identifies the one or more procedures associated with the previously identified DescriptorHandlers. These procedures are in the form of procedural code contained in the DescriptorHandlers. In the next step 708B the procedures are applied to the DesOM corresponding to the description. The method then outputs at step 710B the results of the application of the procedures. The method terminates at step 712B. The method envisages many different types of procedures that can used in the method. In one embodiment, the method computes the similarity between two descriptors of the same type. In this embodiment, the descriptions are parsed by the DDF processor and a common descriptor definition is identified by the processor. The DDF processor then identifies within the description scheme containing the common descriptor definition an associated DescriptorHandler which contains procedural code for computing similarity between two descriptors. The method then applies the procedural code to the DesOMs associated with the descriptions and determines the similarity of the descriptors and hence the similarity of the two resources. The method then outputs the results of the similarity computation This embodiment has particular application in searching/querying descriptions of resources. In another embodiment, the procedural code of the method can encode and/or decode one or more descriptor components of the description of a resource. This embodiment has particular application for efficient and/or secure transport or storage of descriptor components of descriptions of resources.

6.3 Examples of Methods of Generating Descriptions and Applying Procedures to Descriptions The method of generating descriptions and applying procedures standardises the way descriptors and description schemes are defined. These descriptors and description schemes can be used to describe various types of multimedia information. Using the descriptors and description schemes, descriptions that allow fast and efficient searching can be created and associated with multimedia content. The preferred embodiment provides for automatic extraction of descriptors. However, in general, this is only possible for low-level features. Features that represent higher level of abstraction usually have to be set manually or, at least, semi-automatically.

The method also provides a standard mechanism for associating descriptors with procedural code that generate them, which can greatly facilitate the deployment of the description schemes. For instance, such association will allow the development of very general applications such as a multimedia database server, that make use of the procedural code to generate descriptors for new descriptions or for comparing descriptions. Apart from procedures for generating descriptors, procedures for validating descriptors, computing the similarity between two descriptors of the same type as well as encoding and decoding descriptors can be made available to applications through a standard interface.

For example, the following exemplary applications are possible utilising such procedural code. One can whistle a melody to find a song, play a few notes on a keyboard and get in return a list of musical pieces, draw a few lines on a screen and get in return a set of images containing similar graphics, logos, ideograms, define objects, including colour patches or textures and get in return examples, using an excerpt of Pavarotti's voice, and getting a list of Pavaotti's record, etc.

The above scenarios involve the user providing some example content with his/her query. Standardisation of description schemes (in addition to a language for the exposure of DSS) would facilitate querying over multiple remote multimedia databases.

There a number of problems relating to the standardisation of descriptors and description schemes. For example, there is a problem with even the relatively simple colour histogram descriptor. Even if two description providers use the same colour histogram descriptor, they might use it in a different manner such as using different quantisation. This will mean that histogram bin i may mean different things to different description providers. When one uses the histogram of an image as an example to search multiple image databases, one either has to compare and/or convert between different histograms. Both of these alternatives are difficult to achieve and error prone. It is also not practical to have every database server to re-compute the histogram of its images in the same way the example histogram was generated.

The inventors propose two possible approaches for standardisation of description schemes:

1. Standardise completely, to the last detail, the colour space, the colour quantisation (bins) for colour histograms, and consequently the matrix of cross-bin similarities.
2. Use the image itself as the example. Then, each database uses its own extraction method to compute the histogram of the received query image and then compare the histogram with the rest of its database.

The first option is not very practical, as people will never agree with every detail of the histogram's specification. Option 2 is more practical and cleaner, for histogram and most of other image queries. Option 2 means that each database can use their own particular parameters for descriptors and also their own methods of computing similarity between descriptions.

Only a low-level descriptor—the colour histogram—that could be generated from the content was considered as an example in these approaches. In practice, the query might also contain textual description or keywords that the user input which can be mapped to some high-level descriptors such as the photographer's name, the caption of the image, etc.

As described previously, a base Descriptor class from which all descriptors and descriptions are to be based is defined and a description is treated as a compound descriptor. The base Descriptor class includes an attribute that allows the URI of a handler that implements the descriptor's procedures to be stored. It provides a standard mechanism for associating descriptors with procedural code. The handler is called a descriptor handler. A standard API (application program interface) for the descriptor handler is based on a DescriptorHandler class. The DescriptorHandler provides methods for generating the content (or value) of the descriptor, createDescriptorContent( ), and computing similarity between two descriptors of the same type, getSimilarity( ), (see section 4).

An alternative embodiment of the DesOM interface is now described below. The detailed definitions of the DesOm interface of the DescriptorHandler class can be found in Code Definitions A. In short, the DesOM interface of the DescriptorHandler class specifies the following methods:

---

ParameterList getParameterList(in string methodName)
   for getting a list of parameters that are relevant to the specified method.
String getParameter(in string parameterName)
   for getting the parameter value.
Void setParameter(in string parameterName, in string parameterValue)
   for setting the value of a parameter.
Descriptor createDescriptorcontent(URI resource)
   for creating the descriptor for the resource.
Double getSimiliarity(in Descriptor descriptor1Object, in Descriptor descriptor2Object)
   for computing the similarity between two descriptors of the same type.
Boolean validate(in Descriptor descriptorObject)
   for validating the content of the descriptor.
ByteArray encode(in Descriptor descriptorObject)
   for encoding the descriptor for transmission or archive.
Descriptor decode(in ByteArray encodedString)
   for decoding an encoded descriptor.

---

In addition, the Descriptor class provides the following methods:

---

Descriptor parseDescriptorString(in string XMLString)
   for parsing an XML formatted string into a descriptor object. (Note that, in this case, the parsing only check for well-formedness).
String getXML( )
   for returning the XML serialisation of the descriptor including its start and end tags.

---

Different descriptor handlers can be implemented (usually by different developers) for any descriptor with different trade-offs among performance, functionality and complexity. However, all descriptor handlers of a descriptor must comply with the definition of the descriptor. That is, the descriptor handlers can only generate descriptor value that conforms to the definition of the descriptor. At the same time, the descriptor handler can assume that any input descriptor will conform to the definition of the descriptor.

A descriptor designer may assign a default descriptor handler to a descriptor. However, a user of the descriptor is free to choose another handler or none at all.

Not all descriptors are required to have a descriptor handler. Indeed, many descriptors of higher level of abstraction are expected to be handler-less. Nevertheless, even low-level descriptors may not have a handler. For instance, while a handler may exist for a histogram descriptor, we don't expect a handler would be required for a descriptor that holds the creation date of a document.

Even if a descriptor has a descriptor handler, a description is not required to use or reference the handler. In addition, different instances of the same descriptor class may refer to different descriptor handlers. For instance, due to the different characteristics of different classes of images, for each class of image a different handler with a more efficient segmentation algorithm is used for creating its region descriptors. Moreover, applications are not restricted or required to use the descriptor handler referred to by a descriptor instance.

At the same time, not all descriptor handlers (which are subclasses of the DescriptorHandler class) will override the default implementation of all the methods of the base DescriptionHandler class, that is, provide support for all methods of the base class. For instance, a validation method may be implemented to check that an ISBN has the right format; however, no method is implemented to generate the ISBN. Another example is that while a descriptor handler may support the getSimilarity( ) method of a certain descriptor for an non-electronically accessible resource, it would not support the corresponding createDescriptorContent( ) method.

Having the description (or the default handlers in the description schemes) pointing to the relevant descriptor handlers and a standard interface for the descriptor handler make it possible to build very general applications. For instance, the database server application in the above mentioned option 2 does not need to have a predefined set of procedures linked in. Indeed, as is explained below, all the description providers in the above option 2 can use the same database server application despite the different set of optional descriptors and the different descriptor parameters they used.

Code Definitions A

```
IDL definitions of the DescriptorHandler interface:
//File: DesdHdlr.idI
//Descriptor Handler IDL
#ifndef __DescHdlr_idl__
#define __DescHdlr_idl__
#pragma prefix "canon.com"
#include <Descriptor.idl>
#include <URI.idl>
module DescriptorHandler {
interface DescriptorHandler;
typedef sequence<octet>ByteArray;
typedef sequence<string>ParameterList;
typedef sequence<string>MetricList;
enum ExceptionType {INVALID_METHOD_NAME,
     METHOD_NOT_SUPPORTED,
     INVALID_PARAMETER_NAME,
     INVALID_PARAMETER_VALUE,
     XML_NOT_WELLFORMED,
     NO_ACCESS_PRIVILEGE,
     RESOURCE_UNAVAILABLE,
     RESOURCE_NOT_FOUND,
     FORMAT_NOT_SUPPORTED,
     READ_ERROR,
     WRITE_ERROR,
     INVALID_DESCRIPTOR_CLASS,
     INVALID_DESCRIPTOR_ATTRIBUTE,
     INVALID_DESCRIPTOR_CONTENT,
     INVALID_METRIC,
     INVALID_ENCODED_STRING,
     OUT_OF_MEMORY,
     UNKNOWN_EXCEPTION};
//Exceptions
exception DescriptorHandlerException {
ExceptionType error;
wstring description;
};
interface DescriptorHandler
{
//Get the list of parameters used by the descriptor.
ParameterList gctParameterList( )
raises (DescriptorHandlerException);
//Get/set the specified parameters.
string getParameter(in string parameterName)
raises (DescriptorHandlerException);
void setParameter(in string parameterName, in string parameterValue)
raises (DescriptorHandlerException);
//The method creates the content of the descriptor using
//the specified resource based on the current value of the
//parameter attributes.
If not supported, a METHOD_NOT_SUPPORTED
//exception is raised.
Descriptor createDescriptorContent(in URI resource)
raises (DescriptorHandlerException);
//The methods compute the similarity between the two
//descriptors passed in. The similarity measure computed
//is returned. If not supported, a METHOD_NOT_SUPPORTED
//exception is raised.
double getSimilarity(in Descriptor descriptor1,
in Descriptor descriptor2)
raises (DescriptorHandlerException);
//Get the list of metrics supported for computing similarity.
//The first in the list is the default metric used.
MetricList getSimilarityMetrics( )
raises (DescriptorHandlerException);
//Set the metric to be used for computing similarity.
string setSimilarityMetric(in string metricName)
raises (DescriptorHandlerException);
//Validate the content of the descriptor. If the content
//is valid, return true; otherwise, return false. The
//default implementation always return true.
boolean validate(in Descriptor descriptor)
raises (DescriptorHandlerException);
//Encode (compress) the descriptor for transmission or
//for archiving, if not supported, a METHOD_NOT_SUPPORTED
//exception is raised.
ByteArray encode(in Descriptor descriptor)
raises (DescriptorHandlerException);
```

-continued

Code Definitions A

```
//Decode (decompress) the encoded descriptor. If not
//supported, a METHOD_NOT_SUPPORTED exception is raised.
Descriptor decode(in ByteArray encodedStr)
raises (DescriptorHandlerException);
  };
};
#endif
//__DescHdlr_id1__
```

The data (value) of a descriptor (or feature) usually depends on some parameters. For instance, the data of the colour histogram will depend on the colour space used and the quantisation. These parameters, in general, are also used by the corresponding descriptor handler if one exists. Methods are provided in the DecriptorHandler interface for obtaining a list of relevant parameters and setting the value of the parameters. Note that the settings of the parameters control the characteristics of a descriptor instance but are not related to the actual content the descriptor instance described.

In the light of the fact that the DDF is XML based, the parameters are specified as XML attributes and data (value) describing the resource (content) should be part of the content model. For instance, an instance of the colour histogram descriptor may look like:

```
<!-- rgbHistogram: each bin (marked by the <frequency> tags pair) stores
the number of pixels whose value is between (r, g, b) and (r+binSize-1,
g+binSize-1, b+binSize-1) inclusive. -->
<rgbHistogram binSize="32">
  <frequency r="0" g="0" b="0">14009</frequency>
  <frequency r="32" g="32" b="32">21015</frequency>
    . . .
  <frequency r="224" g="224" b="224">12434</frequency>
</rgbHistogram>
```

The bin size, which is a parameter of the histogram, and the starting rgb value of each bin, which are parameters of the (frequency) bin, are specified as XML attributes. In contrast, the bin frequency, which describes the number of occurrence of a range of rgb value in the content, appears as value of the content model. Nevertheless, the principle of using XML attributes for descriptor parameters can only be treated as a guideline for good descriptor design and cannot be verified by a DDF processor.

As is evident from the interface defined for the DescriptorHandler class, a descriptor handler may be used in the automatic creation of low-level descriptions, generate example descriptors for searching database, computing similarity between descriptors of the same class, validating descriptor content, and encoding and decoding descriptor content.

Figure 8:
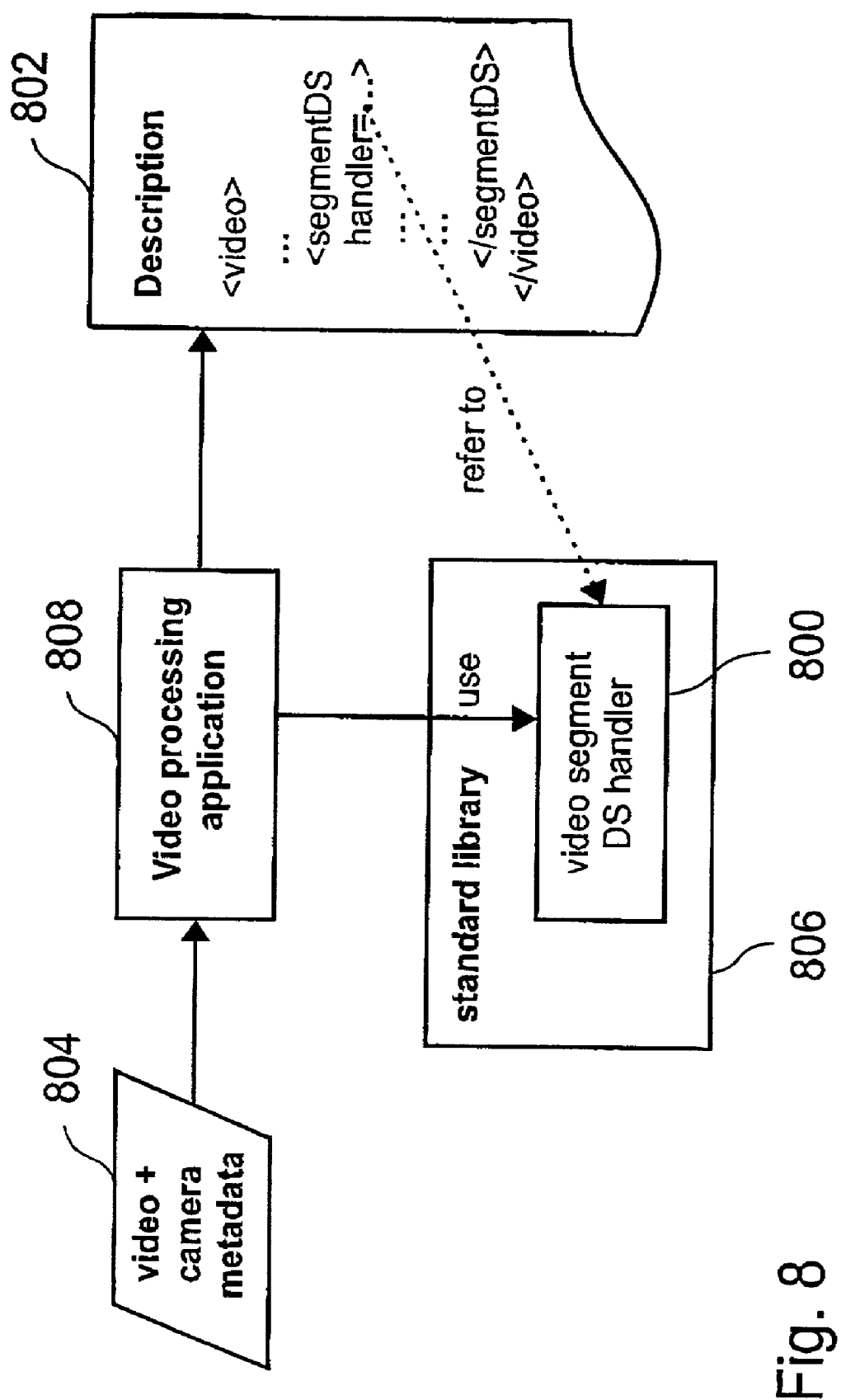
FIG. 8 shows an example of the use of a descriptor handler in generating video segment description using camera metadata that is saved to the video.

Many low-level descriptors can be and, indeed, are expected to be extracted from the content automatically. It is even expected that some low-level descriptors can be created real time as the content is being captured. For instance, during the recording of a video or in subsequent processing, a descriptor handler for some generic video segment description scheme can use the metadata provided by the video camera to segment the video temporally into clips (segments) and generate a description describing the structure of the video. Note that descriptor handlers of a non-standardised description scheme could also be used. For example, FIG. 8 shows a video processing application 808 generating a video segment description 802 utilising video and camera meta data 804. The video processing application 808 uses a video segment descriptor handler 800 from a standard library 806 in generating the description 802. As can be seen, the description 802 refers to the descriptor handler 800.

When generating the description, the processing application calls the following methods of the descriptor handler:

the getParameters( ) method to get the list of relevant parameters, the setParameterValue( ) method to set the parameters required, and the createDescriptorContent( ) method to generate the descriptor.

If required, the application may call the getXML( ) method of the descriptor to get the XML serialisation of the descriptor node. It is expected that other structural components of the video that are difficult to extract automatically and higher level descriptors that describe the semantics of the structural components would be added to the description later with the aid of interactive tools.

The descriptor handler approach also allows developers to develop different extraction algorithms for generating descriptions for (low-level) features, and market or distribute them as some sort of "plug-ins".

Individual database servers can use the same set of descriptor handlers referred to by the descriptions it stored to generate similar or compatible descriptors for any example object specified in the query. A database server can then use the descriptor handlers' getSimilarity( ) method to compare the descriptors of the example object with those of the stored descriptions, For instance, in the above option 2, the client can send an example image with its query to multiple remote image databases. Each database will then generate a histogram descriptor of the image using the descriptor handler referred to by the descriptions of its images and the same parameter settings used by the descriptions of its images.

Figure 9:
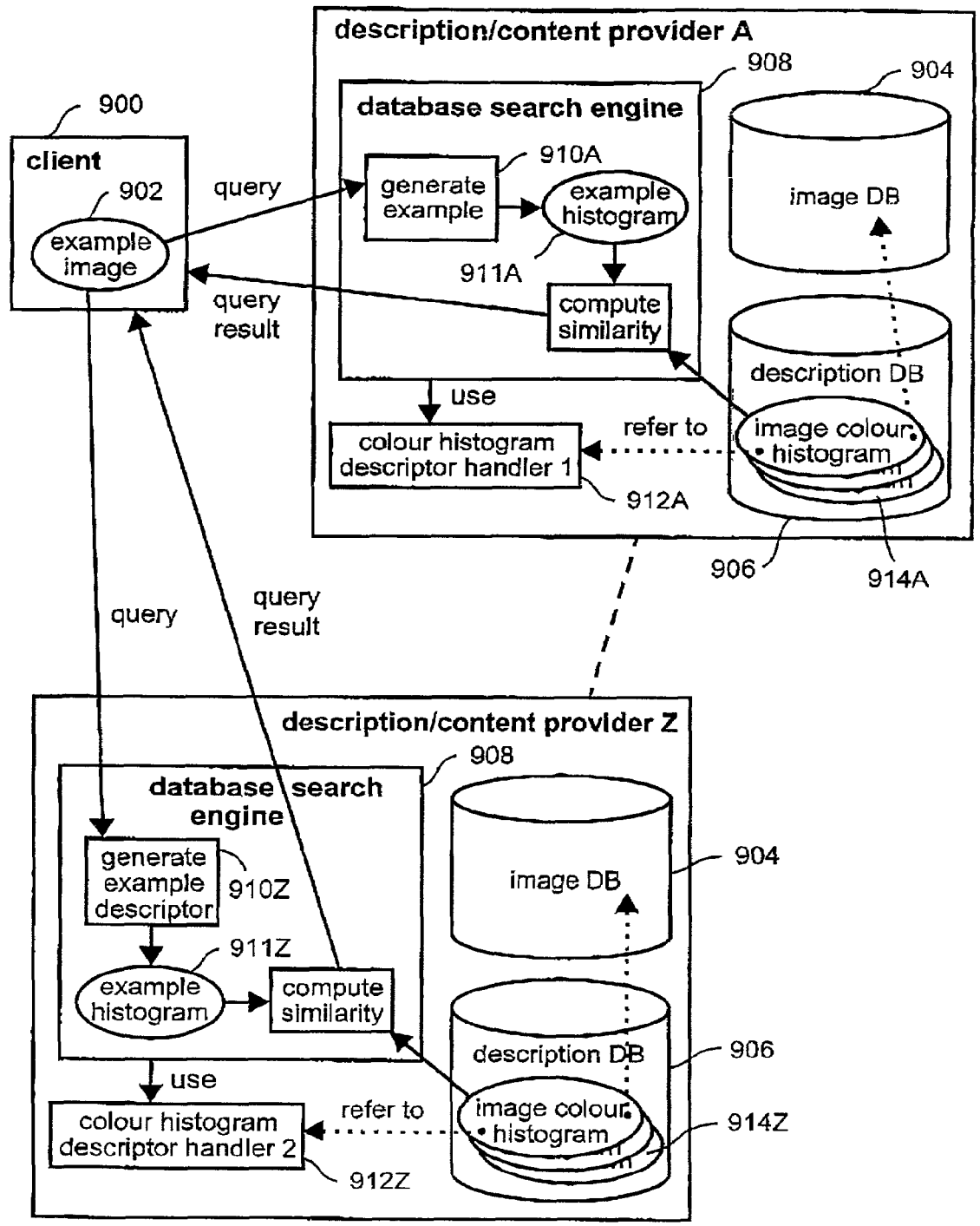
FIG. 9 shows an example of the use of descriptor handlers to support a query-by-example over remote image databases.

For example, FIG. 9 shows how descriptor handlers can be used to support query-by-example searches over multiple remote image databases. A client 900 sends an example image 902 with its query to description/content providers A to Z. Each description/content provider A to Z comprises a image database 904 for storing images, a description database 906 for storing colour histograms of the stored images, and a database search engine 908. The description/content provider A, upon receipt of the query, generates 910A a corresponding histogram descriptor 911A utilising the colour histogram handler 912A referred to by the image colour histograms 914A stored in its description database 906. The description/content providers B to Z generate corresponding histogram descriptors 911B, . . . ,911Z in a similar manner. Namely, each provider generates a histogram descriptor of the example image using the descriptor handler referred to by the descriptions of its images and the same parameter settings used by its descriptions. The provider A then computes the similarity of the example histogram 911A with the image colour histograms 914A stored in its description database 906. The providers B to Z compute the similarity of the example histograms 911B, . . . 911Z with the corresponding image colour histograms 914B, . . . , 914Z in a similar manner. Those images and/or descriptions having a similar colour histogram are then retrieved from the databases 904, 906 and are transmitted by the providers A, . . . ,Z as query results to the client 900. In this way, each provider may use different procedures for generating colour histograms, but at the same time provide consistent query results. The descriptor handler approach also allows a single database to use histograms with different parameters for the different classes of images it stores.

Descriptor handlers also provide a flexible mechanism for computing similarities between two descriptors of the same class. The simple interface of the getSimilarity( ) method hides the complexity in computing the similarity between two descriptors. It allows the use of an appropriate algorithm and similarity metric for each class of descriptor and takes into account the different parameters the descriptors used (such as the different bin sizes used by two rgb histograms).

The descriptor handler also provides a way of validating descriptor content. It is possible in the serialisation syntax of the DDF (or an equivalent description definition language) to support the declaration of constraints. However, such a declarative approach is only possible for simple constraints such as such as maximum value, minimum value, etc. Alternatively, the serialisation syntax can support the use of an object model such as DOM and script language such as ECMAScript for specifying complex constraints. However, procedural code is generally a more efficient way for validating complex constraints.

Descriptor handlers also allow a more flexible approach for encoding and decoding descriptions or particular descriptors in descriptions. Instead of using a single encoding/decoding algorithm for the entire description, more efficient encoding/decoding mechanisms can be developed for individual descriptors that make use of the characteristics of the individual descriptor. These mechanisms could be made available through the encode( )/decode( ) method of descriptor handlers. The encoding/decoding procedure of any standardised descriptor and description schemes can be made available as methods of some descriptor handler library.

Figure 10:
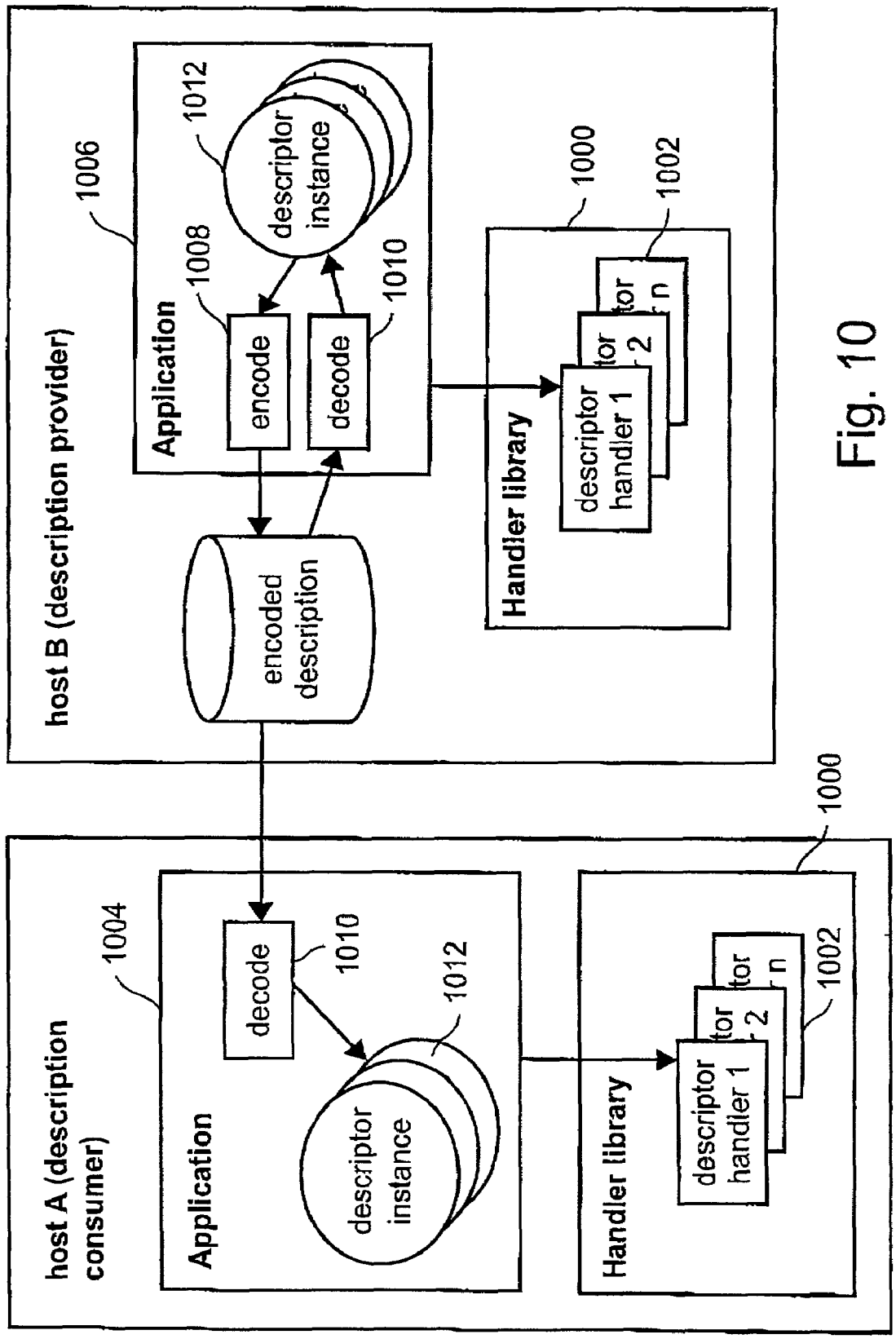
FIG. 10 shows an example of the use a descriptor handler for encoding/decoding.

FIG. 10 shows an example how descriptor handlers might be used for encoding/decoding standardised descriptors. The processing applications 1004, 1006 of the description consumer A and description provider B make use of methods of the descriptor handlers 1002 of a standard library 1000 to decode 1010 and encode 1008 (as well in the case of the provider) the descriptor instance 1012.

The basic methods of the descriptor handler can be divided into two types: one that requires the resource (the content to be described) to be accessible, and the other that doesn't. Only the createDescriptorContent( ) belongs to the first type and requires the content as well as some packages for processing the content to be available. The other methods such as GetSimilarity( ), validate( ), encode( ) and decode( ) only operate on descriptor instances and do not require the use of a special multimedia (handler) library.

In addition to it being inefficient to upload content to a remote site for description generation, security and privacy issues with regard to the content exist. Therefore, it is expected most descriptions will be generated locally on sites where the content is located. Even in the case depicted in section 3.2, each database server uses a local descriptor handler to generate descriptors for the query example. In the case where content is downloaded for description generation, the application will still be using a local descriptor handler. Hence, as far as description generation is concerned, any descriptor handler used would be a local one.

Java presents an ideal object-oriented language for implementing descriptor handlers because of its cross-platform properties, its growing support on a large variety of devices of various sizes and its close tie to the Web through which most descriptions are expected to be delivered. Some concern has been expressed over the issues that Java applications are not as efficient as other compiled code and that most existing features extraction algorithms are not implemented in Java. The advent of Just-In-Time (JIT) compiler has greatly improved the performance of Java applications and applets. In addition, descriptions are likely to be generated using local descriptor handlers. That is, the createDescriptorContent( ) method is typically invoked locally. Hence, it is free to use any locally installed multimedia library including non-Java library through the Java Native Interface. As for the other methods of the descriptor handlers, they deal with descriptions and not content. They are usually not as processing-intensive as the createDescriptorContent( ) method. Standard Java packages are usually sufficient for their purposes. Hence, they can have a pure Java implementation which remote sites can download for execution. Signed applets can be used to lift the severe constraints that are typically imposed on standard applets. For instance, an appropriately signed descriptor handler may be allowed to write to and read from a specific local directory.

Figure 11A:
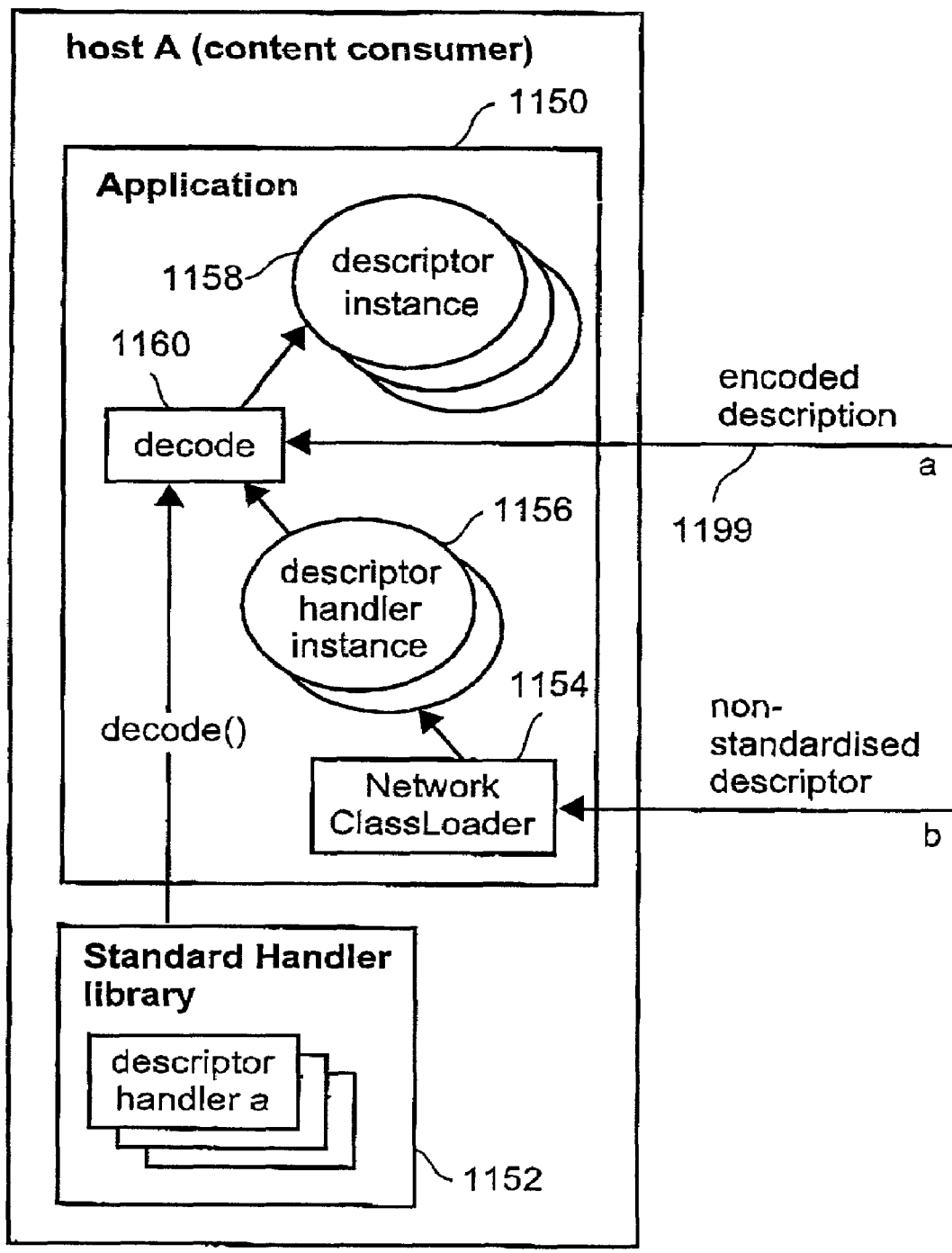
FIG. 11 shows an example of descriptor handlers implemented as Java classes.
Figure 11B:
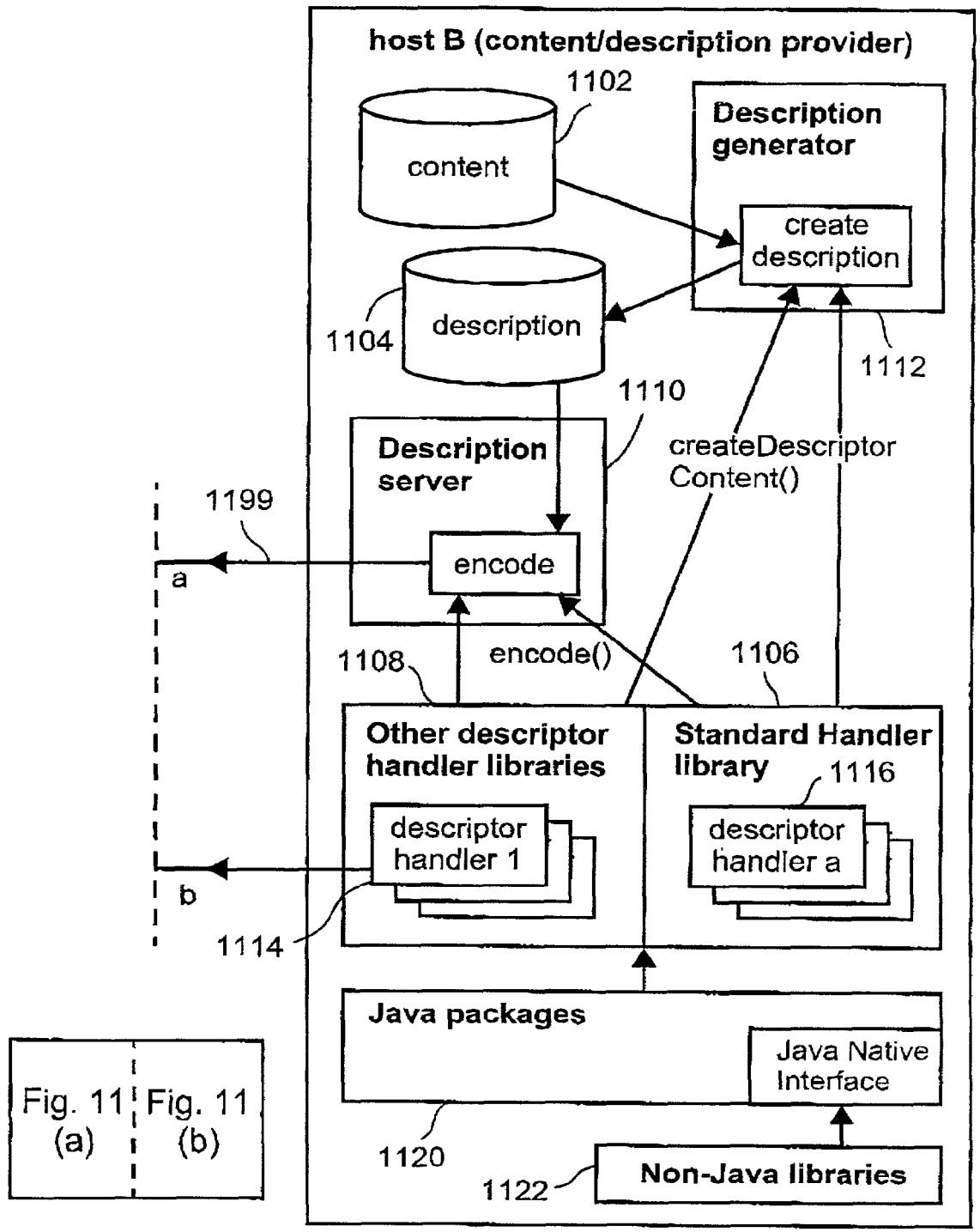

FIG. 11 shows an example of descriptor handlers implemented as Java applets. The content/description provider B comprises a content database 1102, a description database 1104, a description generator 1112 and a description server 1110. Descriptor handlers 1116 of standardised descriptors are included in a standard library 1106 while those of non-standardised descriptors 1114 are be available in other descriptor handler libraries 1108. The descriptor handlers of both libraries 1108 and 1116 are implemented in Java. The descriptions stored on the description database 1104 can be generated by invoking the standard and/or non-standard createDescriptorContent( ) methods from the other descriptor handler libraries 1108 (non-standard) and/or standard library 1106. The description server 1110 retrieves requested descriptions from the description database 1104 and transmits them to the client A Before transmitting the descriptions, the description server 1110 may invoke encoding methods from the standard and/or non-standard libraries 1106, 1108.

The content consumer A comprises a processing application 1150 and a standard library 1152. The processing application 1150 receives the encoded description and is decoded by invoking a decoding method from the standard library 1152. The decoded description forms a descriptor instance. Non-standard descriptor handler applets 1114 could be downloaded from the provider A, if required, and all their methods could be executed on the client machine A. In particular, a non-standard decoding descriptor handler can be downloaded 1154 to form a descriptor handler instance 1156. The processing application 1150 then invokes the non-standard decoding descriptor handler 1156 to decode 1160 the encoded description 1199 to produce the descriptor instance 1158.

The content/description provider B can use a Java Native Interface 1120 as part of the Java packages and non-Java libraries 1122 of descriptor handlers. For instance the createDescriptorContent( ) may be implemented in Non-Java code and thus can only be invoked locally on the server machine B through the Java Native Interface 1120.

In summary, descriptor handlers could be implemented as applets. Descriptor handlers of the standardised descriptors can be provided as part of a standard library (together with the definitions of the standardised descriptors and description schemes). However, users are free to use any valid descriptor handlers. Descriptor handlers for non-standardised descriptors would be available separately in other libraries. It is proposed that descriptor handler applets are properly signed and all methods of the DescriptorHandler interface except possibly createDescriptorContent( ) are expected to be downloadable to remote site for execution. The createDescriptionContent( ) method may require that special libraries or native libraries would cause exception when not invoked locally.

7. Rule-Based Processing Using the DesOM

The internal memory structure of a description (ie., the DesOM) provides a convenient structure on which to perform further processing of a description (or indeed the relevant description scheme). This further processing can be achieved by locating patterns of nodes in the DesOM and performing specified actions in response to the located patterns. Each pattern-action association can be represented by a rule and a set of related rules can be collected into a rule set.

Rules can be used to used to automatically create further descriptors based on existing descriptors (see Section 8. Method of Extending Descriptions of Resources), to provide presentation properties for descriptions and description schemes (see Section 9. Method of Presenting Descriptions of Resources), and to represent queries (see Section 10. Method of Selecting Resource Descriptions). Rules can also be used to translate a description to the language of the query (see Section 11. Method of Translating a Description of a Resource). The Digital Video Browser System described in Section 13 uses a method for formulating rules common for each of these fictions. This method is described below.

Each rule consists of a pattern (of nodes in the DesOM) and an associated one or more actions. For each of the different functions (inference, equivalence, presentation and selection), a different set of actions is often applicable. However each of these functions can be enabled using a common rule grammar which will be described in this section. The rule grammar can be defined in an XML DTD. The rules for the different functions can simply use the common rule grammar (this is the case for the Digital Video Browser System), or alternatively the allowable actions can be controlled by defining different DTDs for each of the different functions (eg., an InferenceRules.dtd, a PresentationRules.dtd, etc.).

Rules can be represented as, or in a manner similar to, Extensible Style Language (XSL) rules. In the Digital Video Browser System (see Section 13), we have used the following basic rule grammar.

Rules.dtd

```
<!ELEMENT Rule (Action+)>
<!ATTLIST Rule
    target      (Element | ElementDefn)     "Element"
    pattern     CDATA                       #REQUIRED
>
<!ELEMENT Action (    AddAttribute | RemoveAttribute
                    | AddElement | RemoveElement
                    | AddAttributeDef | RemoveAttributeDef
                    | Select)>
<!ELEMENT AddAttribute (EMPTY)>
<!ATTLIST AddAttribute
    attName     CDATA                       #REQUIRED
    attValue    CDATA                       #REQUIRED
>
```

-continued

```
<!ELEMENT RemoveAttribute (EMPTY)>
<!ATTLIST RemoveAttribute
        attName         CDATA               #REQUIRED
>
<!ELEMENT AddElement(#PCDATA)>
<!ATTLIST AddElement
        position (SiblingBefore | SiblingAfter | AsFirstChild | AsLastChild)
                                            #REQUIRED
>
<!ELEMENT RemoveElement (EMPTY)>
<!ELEMENT AddAttributeDef (EMPTY)>
<!ATTLIST AddAttributeDef
        attName         CDATA               #REQUIRED
        attType         CDATA               #REQUIRED
        attDefault      CDATA               #REQUIRED
>
<!ELEMENT RemoveAttributeDef (EMPTY)>
<!ATTLIST RemoveAttributeDef
        attName         CDATA               #REQUIRED
>
<!ELEMENT Select (EMPTY)>
<!ATTLIST Select
        attName         CDATA               "selected"
        attValue        CDATA               "YES"
        selectAncestors (YES | NO)          "YES"
>
```

Each Rule element has a target attribute that has a default value of "Element" and a character string pattern attribute. The target attribute refers to the target of the defined Rule. Typically inference, equivalence and search rules are targeted at elements because the action of the rule results in either a new descriptor in the description or the selection of a descriptor for a query. Presentation rules, however are typically targeted at element definitions as their associated actions specify how a particular descriptor type is to be presented in an application. A set of rules can be serialised in an XML document. This is typically the case with inference, equivalence and presentation rules, but may not be required for selection rules which may often be processed on a single rule basis.

The role of the pattern character data string is to identify the particular elements (or element definitions) to which the action is applied. This character string can identify more than one element and can include element ancestry and attribute qualifiers. Preferably, the pattern string is parsed according to the following Extended Backus-Naur Form (EBNF) notation.

```
Pattern           ::=ElementPatterns(ConnectorOpElementPatterns)*
ElementPatterns   ::=ElementPattern (AncestryOp ElementPattern)*
ConnectorOp       ::= '|'|'&'
AncestryOp        ::= '/'|'//'
```

Each pattern can consist of one or more alternative patterns (ie., '|' represents an alternative) or must satisfy more than one ElementPattern (ie., '&' connector operation). Element ancestry is represented within a pattern by using the parent operator '/'. Two patterns separated by a parent operator match an element if the right hand side matches the element and the left hand side matches the parent of the element. For example, the following Shot elements that have a Scene element as a parent and a VideoClipDescription element as a grandparent match the following Rule's pattern:

```
<Rule pattern = "VideoClipDescription/Scene/Shot">
    <Action> etc...</Action>
</Rule>
```

Two patterns separated by the ancestry operator '//' match an element if the right-hand side that matches the element has at least one ancestor that the left-hand side matches. So, for example, any Shot elements that have a VidioClipDescription as an ancestor element will match the following Rule's pattern:

```
<Rule pattern = "VideoClipDescription//Shot">
    <Action> etc...</Action>
</Rule>
```

```
ElementPattern        ::= ElementTypePattern ElementQualification
ElementTypePattern    ::= OneElementTypePattern |'*'
OneElementTypePattern ::= ElementTypeName
ElementQualification  ::= '['Qualifiers?']'
Qualifiers            ::= Qualifier (','Qualifier)*
Qualifier             ::= ChildQualifier
                         |AttributeQualifier
                         |PositionalQualifier
AttributeQualifier    ::= AttributePattern ('='AttributeValue)?
AttributePattern      ::= 'attribute' '('AttributeName')'
AttributeValue        ::= '"'[^"]*'"'|"'"[^']*"'"
PositionalQualifier   ::= Position '(' ')'
Position              ::= 'FirstOfType'|'NotFirstOfType'
                         |'FirstOfAny'|'NotFirstOfmany'
                         |'LastOfType'|'NotLastOfType'
                         |'LastOfAny'|'NotLastOfAny'
                         |'OnlyOfType'|'NotOnlyOfType'
                         |'OnlyOfAny'|'NotOnlyOfAny'
```

An element within the pattern hierarchy may have qualifiers applied to it, which further constrain which elements match the term. These qualifiers may constrain the element to have certain attributes or sub-elements or may constrain its position with respect to its siblings. The qualifiers are specified in square brackets following the ElementTypeName (which is it tag name defined in the DTD). A pattern matches only if all of the qualifiers are satisfied.

For example, any Shot elements that have a child element KeyFrame will match the following Rule's pattern:

```
<Rule pattern = "Shot[KeyFrame]">
    <Action> etc...</Action>
</Rule>
```

Attributes on the target element or any of its ancestor elements can also be used to determine whether a particular rule applies to an element. An attribute qualifier can constrain an element to have either a specific attribute with a specific value, or to have a specific attribute with any value. For example, the following pattern matches a Bin descriptor which has as its parent a Histogram descriptor which has an attribute noBins with a value of '100':

```
<Rule pattern = "Histogram[attribute(noBins)='100']/Bin">
    <Action> etc...</Action>
</Rule>
```

Positional qualifiers can also be used to firer constrain the pattern to match on the element's position or uniqueness amongst its siblings. For example, the following example matches Object descriptors which are the only Objects in a KeyFrame descriptor:

```
<Rule pattern = "KeyFrame/Object[OnlyOfType( )]">
    <Action> etc...</Action>
</Rule>
```

The above description of the matching method permits pattern matching only on elements (which are typically descriptors in the DesOM) or element definitions. Clearly there are many possible embodiments for defining the syntax of the node pattern matching without departing from the spirit and scope of the invention.

Each Rule can have one or more associated Action elements. In the Digital Video Browser System (see Section 13) the allowable Action elements for rules has been limited to the addition and removal of elements and attributes from elements (ie., descriptors) in descriptions and the addition and removal of attribute definitions from element definitions in a description scheme. The actions involving individual descriptions are generally used by inference, equivalence and selection rules (see Sections 8 and 10) and the actions involving description schemes are generally used by presentation rules (see Section 9).

The attributes of the Action elements, AddAttribute and RemoveAttribute, specify the attribute to be added or removed from a target element (ie., an element that has matched the specified pattern in the rule). The content of the AddElement action contains the element to be added to the DesOM as a relation of a target element. The position attribute of the AddElement element specifies where the new element should be added with respect to the target element. This position attribute can indicate that the new element is to be added as a sibling node before the target element (SiblingBefore), as a sibling node after the target element (SiblingAfter), as the first child of the target element (AsFirstChild), or as the last child of the target element (AsLastChild). Clearly, since the element to be added to the DesOM is represented as parsed character data (#PCDATA), an element hierarchy can also be added to the DesOM. The RemoveElement action will simply remove a target element. Any child elements of the target element will also be removed.

The AddAttributeDef and RemoveAttributeDef actions are only valid if the target for the rule is an element definition. These actions are typically used by presentation rules (see Section 9). The AddAttributeDef action uses the attName, attType and attDefault attributes to specify the required information for the attribute definition to be added to an element definition. The RemoveAttributeDef action will simply remove the attribute definition that is identified by the value of the attName attribute of the action. Attribute definitions can be replaced by including both an AddAttributeDef and a RemoveAttributeDef action in a particular rule.

The Select action is typically only used by selection rules and is described in detail Section 10. Rules can also be used to transform a description. These rules are used to generate a second description conforming with a second description scheme.

8. Method of Extending Descriptions of Resources

Given a description scheme, it is possible that further descriptors can be automatically created by inference or a known equivalence in a description based on the existence or otherwise of a particular set of descriptors. For example, if a descriptor for a digitally captured image representing light exposure levels indicated outdoor lighting levels, then an additional descriptor could be automatically created to classify the image as an "Outdoor Scene". Since the latter classification can be inferred from the recorded light exposure levels there is no advantage in storing the classification because it can always be re-generated while the inference rule exists. Rules can also be used to generate textual descriptors based on non-textual descriptors or vice versa. For example, the colour of an object might be stored in a description as a (R, G, B) value. A rule could be formulated which maps each (R, G, B) value to one of a possible number of colours represented in a text string (eg., red, green, purple, etc.). The additional descriptors generated by inference or equivalence rules can result in a richer description that can be exploited by applications (eg., search engines, filter agents, etc.).

A set of rules that is applicable for a given description scheme can be serialised (stored) in an XML document. In the Digital Video Browser System (see Section 13), a reference to such an XML document is stored in the value of the ruleSets attribute of the Description element for the description scheme (see Section 3.1.2.2 Description Definition). It is possible to associate more than one rule set with a description scheme. In the Digital Video Browser System (see Section 13), if more than one rule set is specified then it is assumed that both rule sets can be applied (ie., the individual rule sets do not contain unresolvable rules). In other words, the individual rule sets are simply combined and treated as a single rule set, in which the order of rules to be processed is provided by the order of the listing of the individual rule sets and the order of the individual rules within each given rule set. Inference and equivalence rule sets can also be stored with an application without departing from the essence of the invention, however in this event the value of the rules is limited to the particular application.

Preferably, the Action elements typically used are the addition and removal of attributes and elements from the DesOM. Replacement can be achieved by using a removal followed by an addition Action element.

A set of inference rules is preferably invoked whenever a description is first processed into the DesOM. The rules are iteratively processed until no further changes can be made to the DesOM as some rules may depend on the actions of other rules. The rule set may need to be (iteratively) reapplied whenever the description is updated (eg., a manual annotation in an application utilising the description). In the event that an application has permitted changes to be made to the description, then before serialising the altered description each change needs to be considered in light of the inference rules in order to ascertain whether the descriptor can be inferred from a knowledge of the other descriptors in the description. If a descriptor can be inferred then it is excluded from the serialised description.

The method preferably associates a set of inference and/or equivalence rules to a description scheme. This set of rules can be implemented according to the abovementioned description and results in a richer description structure without any additional storage or transport overhead which would result if the extra (inferred or equivalent) descriptors were included as part of the individual descriptions. Being able to represent this inferred or equivalent information as a set of rules that can be invoked when required represents a significant saving in storage and transport cost if a large digital library were to be described. In other words it can eliminate the storage and processing costs of redundant information.

An important aspect of the method is that unlike existing stylesheet languages such as XSL, the inference and equivalence rules do not form the basis of a construction of a new tree structure which is typically used for rendering. In the method the rules are applied to the memory structure that represents the description (ie, the DesOM) and result in changes to that structure. The role of the rules is to provide a richer description of the resource that can be exploited by applications (eg., search engines, filter agents, etc.). This richer description does not necessarily need to be serialised because the richer description can always be generated from the original description using the rules.

The embodiment for applying the inference and equivalence rules has a limited set of actions that can be performed on the selected elements (see Rules.dtd in Section 7. Rule-based Processing using the DesOM. This set of actions is sufficient for the Digital Video Browser System described in Section 13, however it is possible that a more extensive set of rules may be required for other applications.

Figure 12:
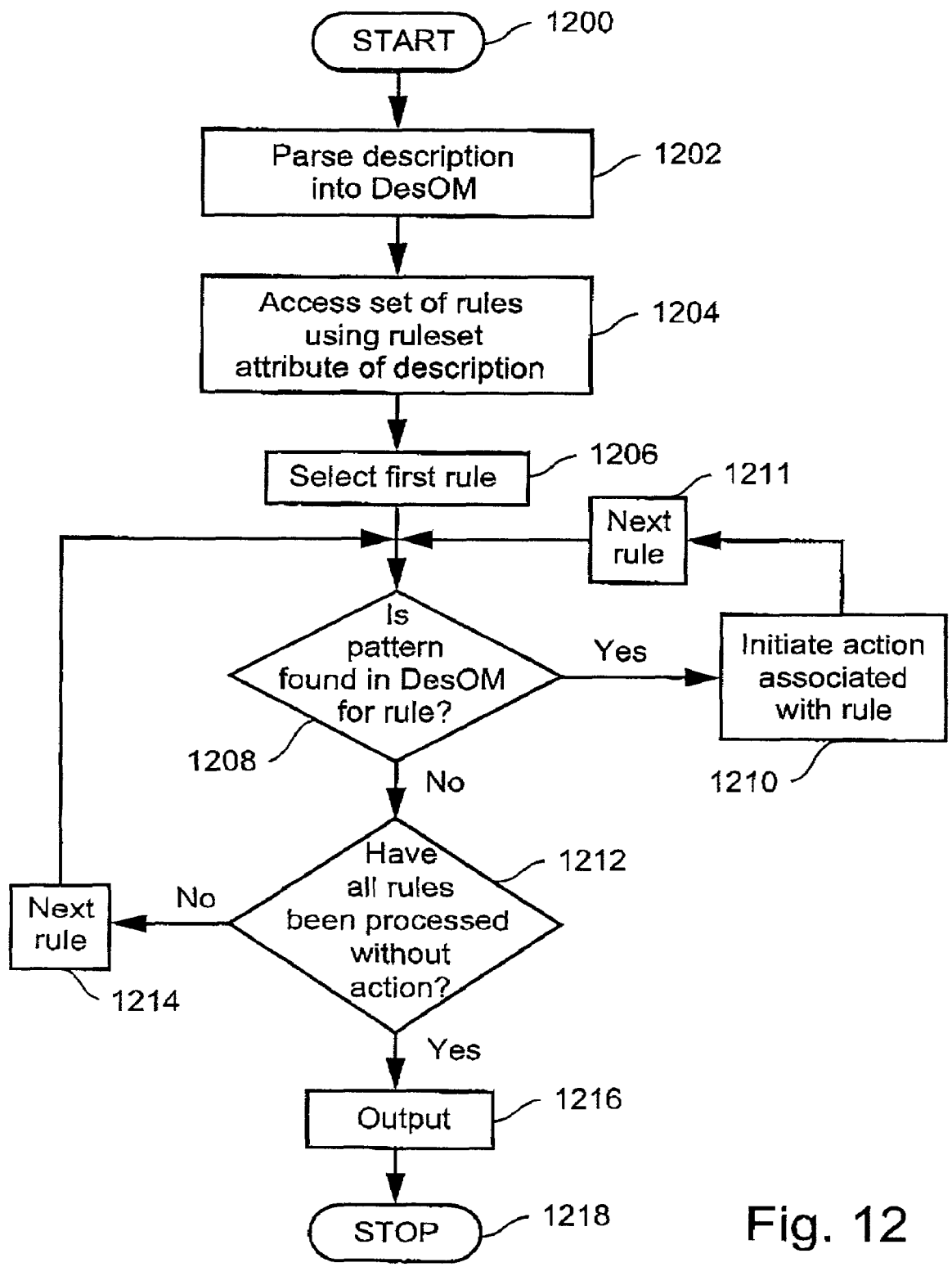
FIG. 12 is a flow diagram of a method of extending a description of a resource in accordance with another embodiment.

Turning now to FIG. 12, there is shown a flow diagram of a method of extending a description of a resource. In step 1200, the method commences and a host application such as a search engine invokes a DDF processor and selects a description in response to a user request for further processing. The description may be generated as previously described. In the next step 1202, the DDF processor parses the description into a DesOM. After step 1202 the method continues at step 1204, where an associated set of rules are accessed using the RuleSet attribute of the description scheme. These set of rules may be serialised in the form of an XML document. In the next step 1206, the first rule of the set is selected for processing.

The method then continues to decision block 2106, where a check is made whether a pattern associated with the selected rule can be found in the DesOM. The manner in which the pattern associated with the selected rule matches a pattern in the DesOM is described in more detail in 7. Rule-based processing using the DesOM. If the decision block 1208 returns true(yes), then the processing continues at the next step 810, where the inference or equivalence action associated with the rule is initiated on the DesOM. These actions preferably initiate addition and removal of attributes and elements from the DesOM thus modifying the DesOM. Afterwards, the method selects the next rule in step 1211 and the processing returns to decision block 1208. If the decision block 1208 returns false(no), the processing continues at decision block 1212, where a check is made whether all the selected rules have finally been processed without action. In this way, the rules are iteratively processed until no further changes can be made to the DesOM. This is advantageous in the situation where some rules are dependent on other rules. If, on the other hand, the decision block 1212 returns true(yes), the processing continues at step 1216 where the extended DesOM is output. The method then terminates at step 1218.

9. Method of Presenting Descriptions of Resources

A description could be used by many applications. Each application might exploit different properties of the description and its defining description scheme. Some of these applications will invariably need to represent description schemes and/or descriptors in a graphical or pictorial manner. For example, many descriptors could be graphically represented by icons and a user's interaction with either a description or description scheme could be mediated by icon selection.

Presentation properties for descriptors could be included as part of the description scheme however this can be non-ideal for two reasons. First, the role of the description scheme and description is to describe classes of resources and a particular resource, respectively, and it is preferable to keep both entities as concise and precise as possible. Presentation information would result in extra presentation information (eg., icons) being part of a description scheme (and perhaps descriptions) and would therefore increase the storage and transmission costs for each description scheme. Second, different applications might prefer to present descriptions and description schemes in different ways. In other words, the presentation properties of descriptions and description schemes can be application dependent.

It is advantageous, however, to have a set of presentation rules grouped in a rule set that can be serialised, transported with and used in conjunction with the description scheme so that other applications can, if they choose to, use a similar set of presentation rules. This would not be the case if the presentation rules were tightly linked with a particular application (ie., part of the application code base).

As with inference and equivalence rule sets, presentation rule sets can optionally be linked with a description scheme by specifying the XML document containing the presentation rule set as the value or part of the value of the ruleSets attribute in the Description element for the description scheme (see Section 3.1.2.2 Description Definition). Presentation rule sets can be included in the ruleSets attribute along with other rule sets that might be concerned with inference and equivalence rules. In the Digital Video Browser System, which is described in Section 13, the presentation rule sets are stored with the description scheme in the ruleSets attribute. Alternatively, they could be stored with the application rather than the description scheme. Presentation rule sets stored as part of the description scheme are processed like inference or equivalence rule sets. In other words, all the rules from the individual rule sets are combined into a single rule set. Resolution of rules is performed on the basis of rule order (as was described for inference rules in Section 8. Method of Extending Descriptions of Resources). If an alternative method of processing presentation rule set(s) is required then the presentation rule set(s) are best stored with the application so the application can control the processing.

Presentation properties can be attributed to the descriptor definitions in a description scheme or the descriptor elements of a description using application-specific presentation rules. Unlike, inference or equivalence rules, a presentation rule is typically applied to an element definition in a DTD. Its role is to provide presentation behaviour for the instances of the descriptors defined in the description scheme. In the Digital Video Browser System (see Section 13), presentation rules are only applied to descriptor definitions and not to descriptors within individual descriptions. However, it is conceivable that some applications might benefit from an ability to define presentation rules based on individual descriptors in descriptions. The rules in a presentation rule set can be formulated in a similar way to inference or equivalence rule sets.

Preferably, the Action elements of presentation rules typically involve the addition and removal of attribute definitions in element definitions (in the description scheme). Consequently the rules are targeted at element definitions rather than elements. Alternative embodiments could apply presentation rules to individual descriptions and therefore the target of these rules would be elements rather than element definitions.

Presentation riles arc used in the Digital Video Browser System described in Section 13 for the following functions:

- To classify descriptors as being structural (hence belonging in a Table of Contents) or of an index nature (hence belonging to an Index);
- To assign icons to descriptors where the icons are assigned on a description scheme basis (ie., by the addition of attribute definitions having default values to descriptor definitions), and;
- To add "Selected" attributes to all selectable descriptor definitions so that selection rules can interact with the presentation of the descriptions (eg., so the application can differentiate visually between selected and non-selected descriptors).

The method involves associating a set of rules with a description scheme that can influence the presentation properties of descriptors in descriptions which are conformant with a particular description scheme. It is an advantage to have those presentation rules grouped in a rule set that is either linked to a description scheme so that applications can utilise the defined set of presentation properties if required. Alternatively an application can select to use its own set of presentation rules.

Figure 13:
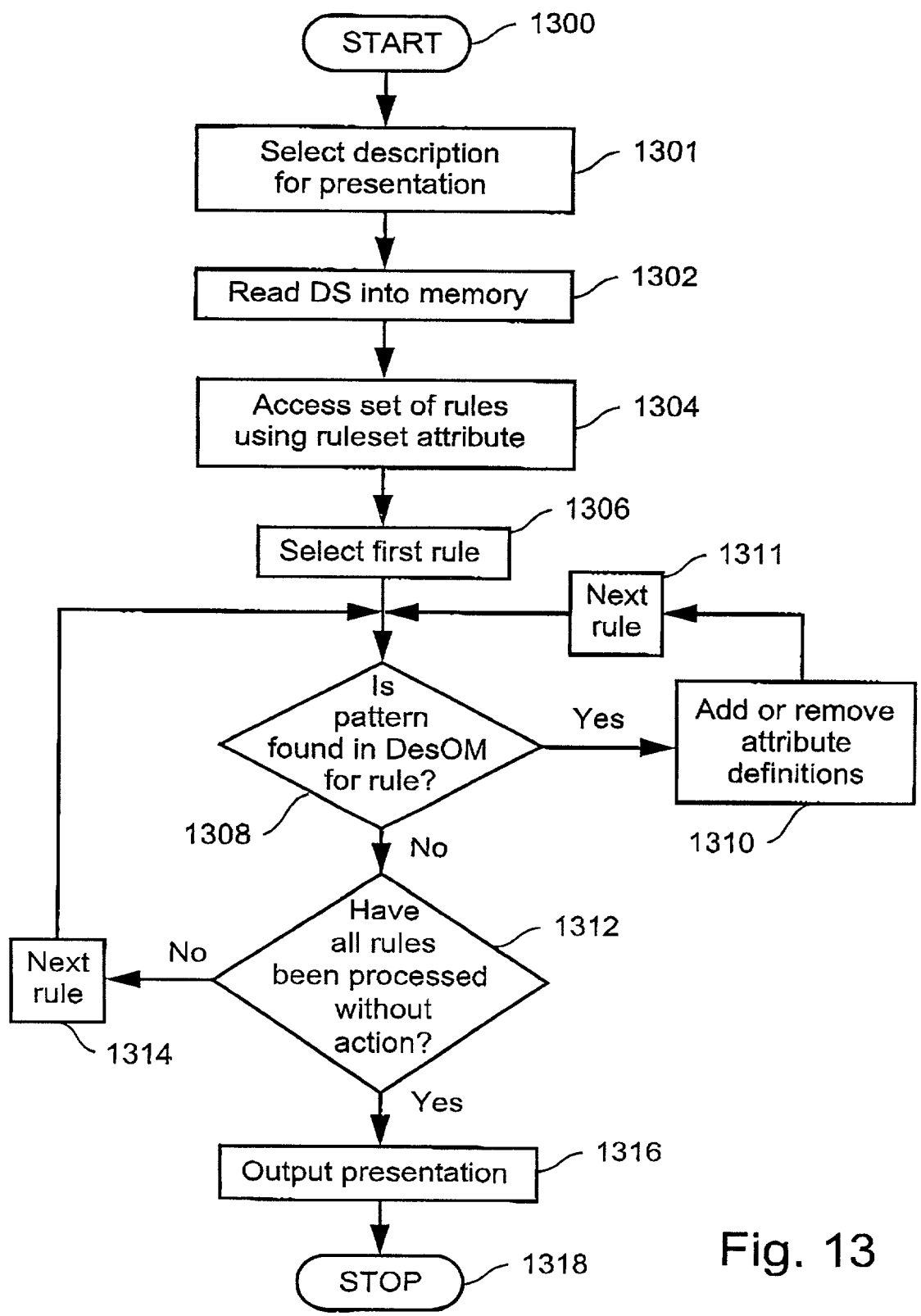
FIG. 13 is a flow diagram of a method of using rules to add or remove attributes of a Description Scheme that are used to control the presentation of a description of a resource in accordance with another embodiment.

Turning now to FIG. 13, there is shown a flow diagram of a method of visually presenting a description of a resource. In step 1300, the method commences and a host application such as a search engine invokes a DDF processor. In the next step 1301, a description is selected for presentation. This selection can occur by way of user input or by way of another application. The method then continues at step 1302, where the associated defining description scheme is read into memory. The description scheme in memory comprises an array of element definitions where each element definition has an array of attribute definitions. Alternatively, the DDF processor can parse the description into a DesOM. After step 1302 the method continues at step 1304, where the presentation set of rules are accessed using the RuleSet Attribute of the description. In the next step 1306, the first presentation rule of the set is selected for processing.

The method then continues to decision block 1308, where a check is made whether a pattern associated with the selected rule can be found in the DesOM. A pattern matching process similar to that described in 7. Rule-based processing using the DesOM would be suitable. If the decision block 1308 returns true(yes), then the processing continues at the next step 1310, where the attribute definition(s) associated with the rule is removed or added to the array in memory. Afterwards, the method selects the next rule in step 1311 and the processing returns to decision block 1308. If the decision block 1308 returns false(no), the processing continues at decision block 1312, where a check is made whether all the selected rules have finally been processed without action. In this way, the rules are iteratively processed until no further changes can be made to the array in memory. This is advantageous in the situation where some rules are dependent on other rules. If, on the other hand, the decision block 1312 returns true(yes), the processing continues at step 1316 wherein a modified description is created using said modified description scheme as a template. This modified description is then output to an output device. For example, the modified description and it's associated resources, such as digital video resources or DVDs, can be rendered on a display or a printing device.

10. Method of Selecting Resource Descriptions

Selection rules can be used to formulate queries directed at collections of descriptions (eg., digital libraries). A query can be viewed as a request to select those descriptions or components of descriptions (ie., descriptors) that match a specified pattern. Like inference and equivalence rules, selection rules are typically directed at elements rather than element definitions. Unlike inference, equivalence and presentation rules, however, selection rules may be generated on a one-off basis and not collected in rule sets that are serialised in an XML document. For example, a query is usually formulated with help from the user, then processed, and the results presented to the user for their evaluation.

Selection rules often depend on presentation rules in that the selection action must be able to be interpreted by the application and presented to the user. For example, a selection action could simply set a (presentation) attribute for descriptors that match the specified pattern.

Selection rules are typically associated with the application. In the Digital Video Browser System (see section 13), selection rules use the same grammar as all other rules (see Section 7. Rule-based Processing using the DesOM). However, typically the only Action that is invoked by a selection rule is the Select action. Consequently it would be possible to define a more specific grammar for selection rules (eg., SelectionRules.dtd having just a Select action being allowed).

The Select action of a selection rule has three attributes which specify how the selection action is implemented. The value of the attribute attName refers to the attribute name used for a descriptor that is able to represent the action of being selected. This attribute would typically have been generated using a presentation rule. If the element matched by the pattern does not contain such an attribute, then the selection process will search for ancestors of the matched element in the DesOM (ie., up the description tree) until it locates an element with the specified attribute name. In the above DTD this attribute name is provided with a default value of "selected". The value of the second attribute attValue refers to the value that the "selected" attribute should be assigned in order to indicate selection. The DTD also provides a default value of "YES". The third attribute specifies whether all selectable ancestors should also be selected. So, for example, if a user selects a Shot descriptor because of a matched descriptor contained in the Shot descriptor, then the user should also select the ancestors of the Shot descriptor (ie, the Scene descriptor and the VideoClipDescription descriptor).

In this way, the Select element provides information to the application on which elements have matched the specified pattern in the selection rule. Clearly the application needs to be aware of the attribute used to provide this information, hence the interaction between presentation and selection rules. In the Digital Video Browser System (see Section 13), selection rules are used to implement searches in a Digital Video Library.

The method involves that of representing queries by selection rules which attempt to find matches to a rule's specified element pattern. The "select" action that is executed on a successful pattern match typically modifies attributes established by presentation rules, so that the selection process can interact with the application.

Figure 14:
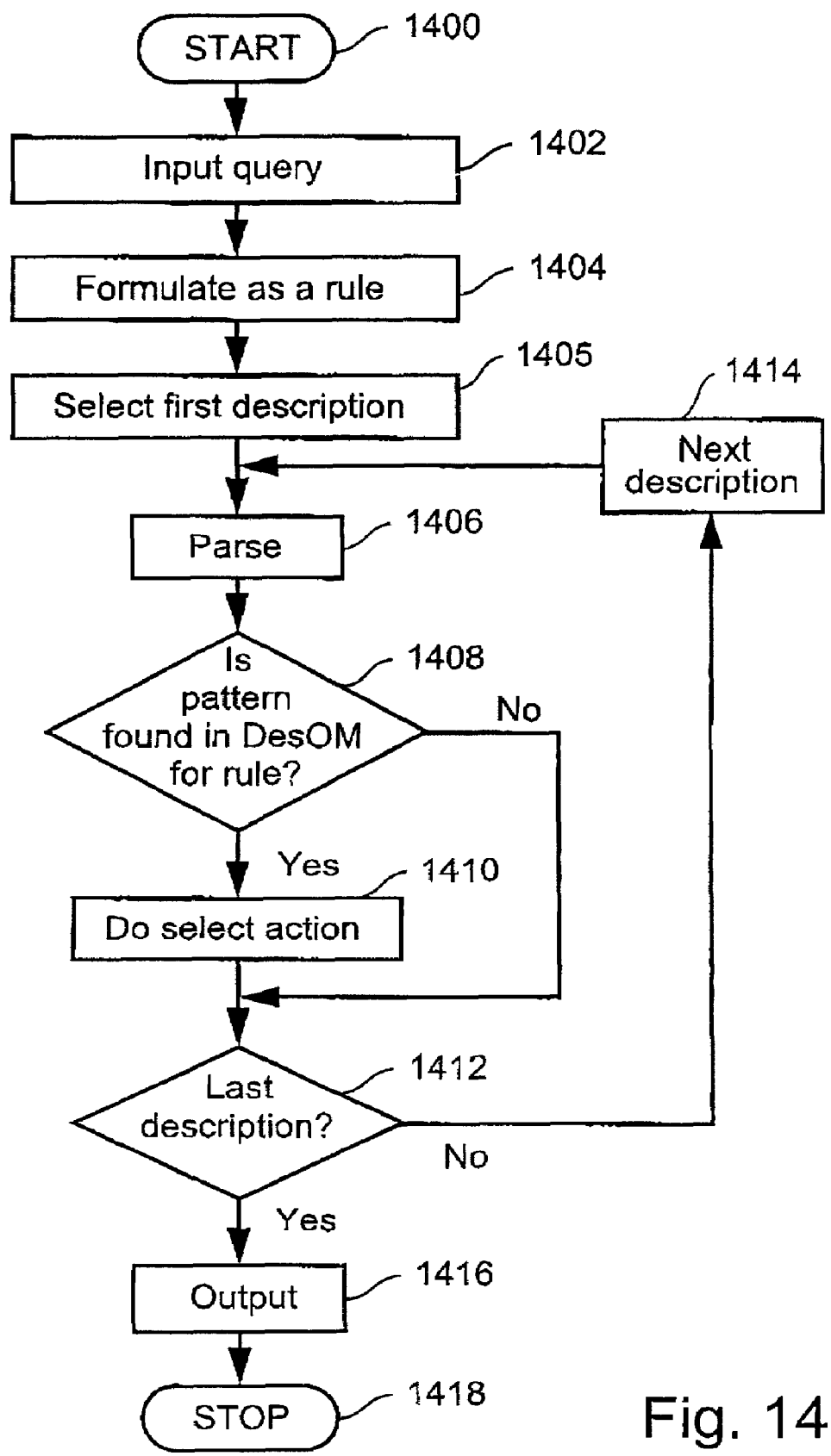
FIG. 14 is a flow diagram of a method of selecting one or more descriptions or part of one or more descriptions of a resource in accordance with another embodiment.

Turning now to FIG. 14, there is shown a flow diagram of a method of selecting one or more descriptions or part of one or more descriptions of a resource. In step 1400, the method commences and a host application such as a search engine invokes a DDF processor. In the next step 1402, a user inputs a query which is formulated as a rule in step 1404. The search engine then selects in step 1405 a first description for evaluation.

The method then continues at step 1406, where the DDF processor parses the description into a DesOM.

The method then continues to decision block 1408, where a check is made whether a pattern associated with the selected rule can be found in the DesOM. The manner in which the pattern associated with the selected rule matches a pattern in the DesOM is described in more detail in 7. Rule-based processing using the DesOM. If the decision block 1408 returns true yes), then the processing continues at the next step 1410, where the select action associated with the rule is initiated on the DesOM. The details of the select action is described above. Afterwards, the method then continues at decision block 1412 where a check is made whether the last description has been searched. If the decision block returns false(no) the processing continues at step 1414 where the next description is selected. Otherwise, the processing continues at step 1416, where the results of the searching process is output. The method then terminates at step 1418.

11. Method of Translating Descriptions of Resources

Often descriptions of resources will be in a language different from the request. Rather than store copies of the descriptions in each language, the method stores only one copy of the descriptions in one language. Preferably, the language is English. The method is then provided with a number of rule sets that enable the translation of the descriptions to the language of the request. For example, the description may have a "colour" attribute and a colour attribute value "red". If the request is received in French, then the method will translate the description to French. In the example given, "colour" and "red" will be translated to their French equivalent. This is a form of inter-language equivalence. This procedure is similar to the way Inference Rules are processed, but on a conditional basis. Inference rules are preferably not processed on a conditional basis as described here for translation rules.

Figure 15:
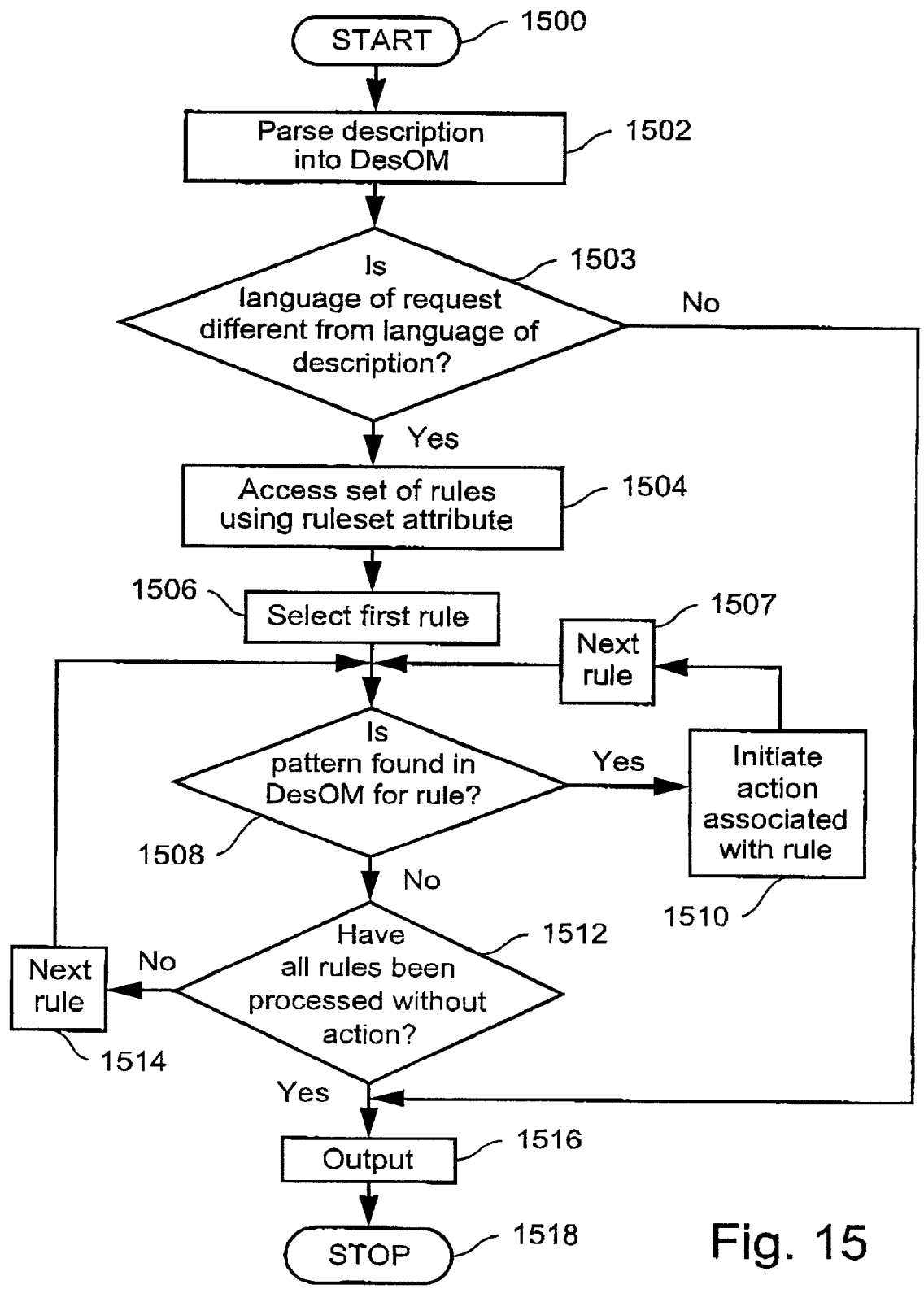
FIG. 15 is a flow diagram of a method of translating a description of a resource in accordance with another embodiment.

Turning now to FIG. 15, there is shown a flow diagram of a method of translating a description of a resource. In step 1500, the method commences and a host application such as a search engine invokes a DDF processor and selects a description in response to a user request for fiber processing. In the next step 1502, the DDF processor parses the description into a DesOM. After step 1502 the method continues at decision block 1503, where a check is made whether the language of the request is different from the language of the description. This check is accomplished by comparing the language attributes of both the request and the description.

If the decision block 1503 returns true(yes), the processing continues at step 1504, where an associated translation set of rules are accessed using the RuleSet Attribute of the description. These translation set of rules may be serialised in the form of an XML document. On the other hand, if the decision block returns false(no) then the processing continues at step 1516. After completion of step 1504, the method continues at step 1506, where the first rule of the set is selected for processing.

The method then continues to decision block 1506, where a check is made whether a pattern associated with the selected rule can be found in the DesOM. The manner in which the pattern associated with the selected rule matches a pattern in the DesOM is described in more detail in 7. Rule-based processing using the DesOM. If the decision block 1508 returns true(yes), then the processing continues at the next step 1510, where the translation action associated with the rule is initiated on the DesOM. These actions initiate the removal and addition of attributes and elements from the DesOM. The removal and addition action substitutes the language of the attributes and elements for another. Afterwards, the method selects the next rule in step 1507 and the processing returns to decision block 1508. If the decision block 1508 returns false(no), the processing continues at decision block 1512, where a check is made whether all the selected rules have finally been processed without action. If, on the other hand, the decision block 1512 returns true(yes), the processing continues at step 1516 where the extended DesOM is output. The method then terminates at step 1518. Alternatively it is also possible to include an action of a rule which invokes a DescriptorHandler method to translate the content of the selected Descriptor.

12. First Embodiment of Apparatus

Figure 19:
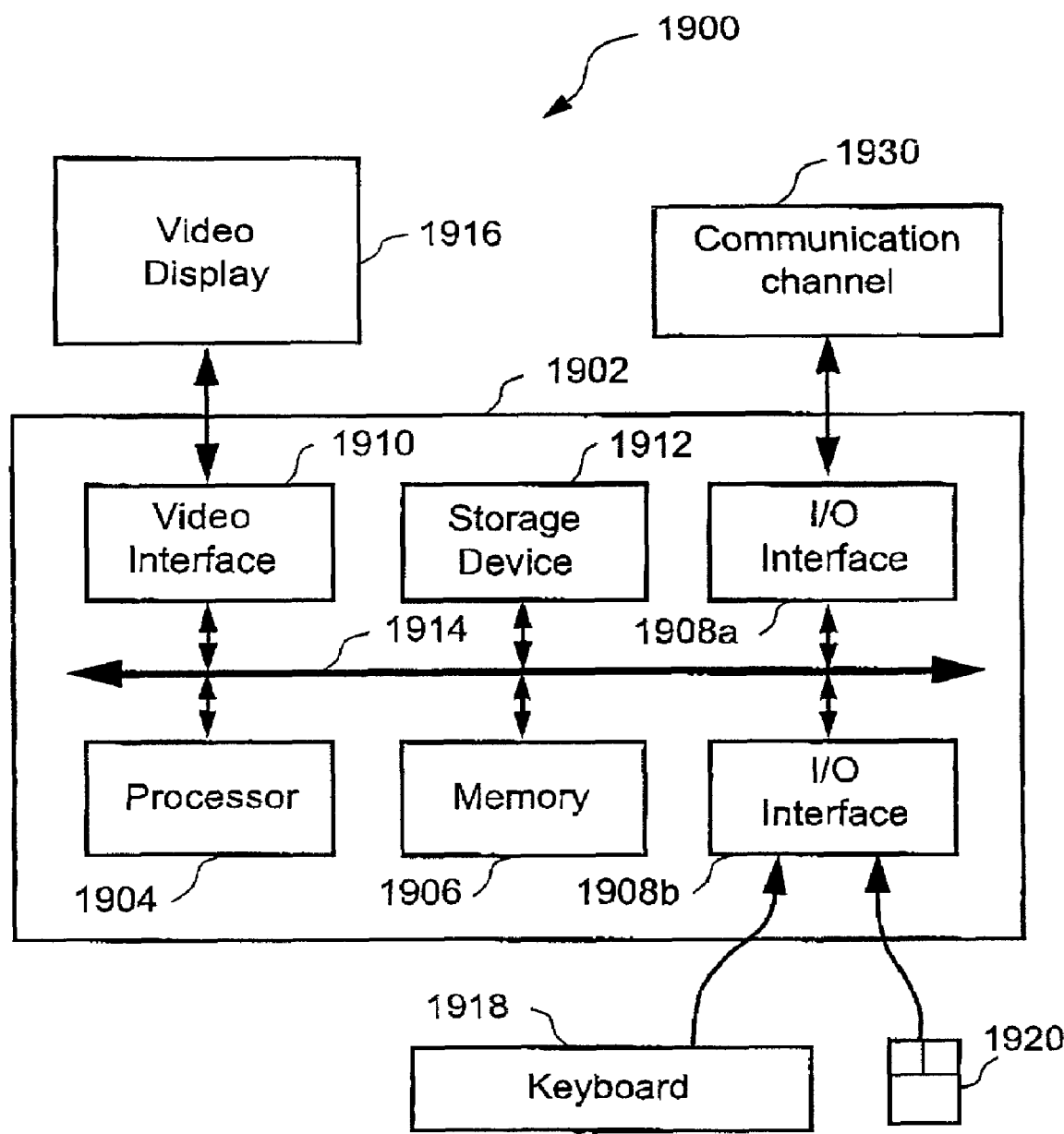
FIG. 19 is a block diagram of a general-purpose computer for implementing any one or more said methods.

The processes described in relation to FIGS. 1A to 15 can be practiced using a conventional general-purpose computer, such as the one shown in FIG. 19 wherein the is processes may be implemented as software executing on the computer. In particular, the method steps are effected by instructions in the software that are carried out by the computer. The software may be divided into two separate parts; one part for carrying out the processing steps; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus in accordance with the embodiments of the invention.

The computer system 1900 consists of the computer 1902, a video display 1916, and input devices 1918, 1920. In addition, the computer system 1900 can have any of a number of other output devices including line printers, laser printers, plotters, and other reproduction devices connected to the computer 1902. The computer system 1900 can be connected to one or more other computers via a communication interface 1908b using an appropriate communication channel 1930 such as a modem communications path, a computer network, or the like. The computer network may include a local area network (LAN), a wide area network (WAN), an Intranet, and/or the Internet The computer 1902 itself consists of a central processing unit(s) (simply referred to as a processor hereinafter) 1904, a memory 1906 which may include random access memory (RAM) and read-only memory (ROM), input/output (IO) interfaces 1908a, 1908b & 1908c, a video interface 1910, and one or more storage, devices generally represented by a block 1912 in FIG. 19. The storage device(s) 1912 can consist of one or more of the following: a floppy disc, a hard disc drive, a magneto-optical disc drive, CD-ROM, magnetic tape or any other of a number of non-volatile storage devices well known to those skilled in the art. Each of the components 1904 to 1912 is typically connected to one or more of the other devices via a bus 1914 that in turn can consist of data, address, and control buses.

The video interface 1910 is connected to the video display 1916 and provides video signals from the computer 1902 for display on the video display 1916. User input to operate the computer 1902 can be provided by one or more input devices 1908b. For example, an operator can use the keyboard 1918 and/or a pointing device such as the mouse 1920 to provide input to the computer 1902.

The system 1900 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun Sparcstation™, or the like. The foregoing are merely exemplary of the types of computers with which the embodiments of the invention may be practiced. Typically, the processed of the embodiments, described hereinafter, are resident as software or a program recorded on a hard disk drive (generally depicted as block 1912 in FIG. 19) as the computer readable medium, and read and controlled using the processor 1904. Intermediate storage of the program and pixel data and any data fetched from the network may be accomplished using the semiconductor memory 1906, possibly in concert with the hard disk drive 1912.

In some instances, the program may be supplied to the user encoded on a CD-ROM or a floppy disk (both generally depicted by block 1912), or alternatively could be read by the user from the network via a modem device connected to the computer, for example. Still further, the software can also be loaded into the computer system 1900 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The methods of the invention may alternatively be implemented in dedicated hardware such as one or more integrated circuits performing the functions or sub functions of methods of the invention. Such dedicated hardware may include graphic processors, digital signal processors, or one or more microprocessors and associated memories

13. Second Embodiment of Apparatus—Digital Video Browser System

A Digital Video Browser System in accordance with a second embodiment of the apparatus is described in this section. The functionality of the Digital Video Browser System is enabled by the descriptions of digital video that are automatically generated using a description scheme, designed for digital video resources, such as that included in Appendix D.

The Digital Video Browser System allows a user to browse the digital video in a non-linear manner, manually annotate the digital video to provide additional descriptive information that was not able to be automatically generated, and to search for the presence of various descriptors in a description. It should be clear to the reader that all this functionality is enabled by an interaction of the user with the description scheme and the individual descriptions of the digital video resources and that the browser that is described in the following section can in essence be applied to any other electronically-accessible resource.

Figure 16:
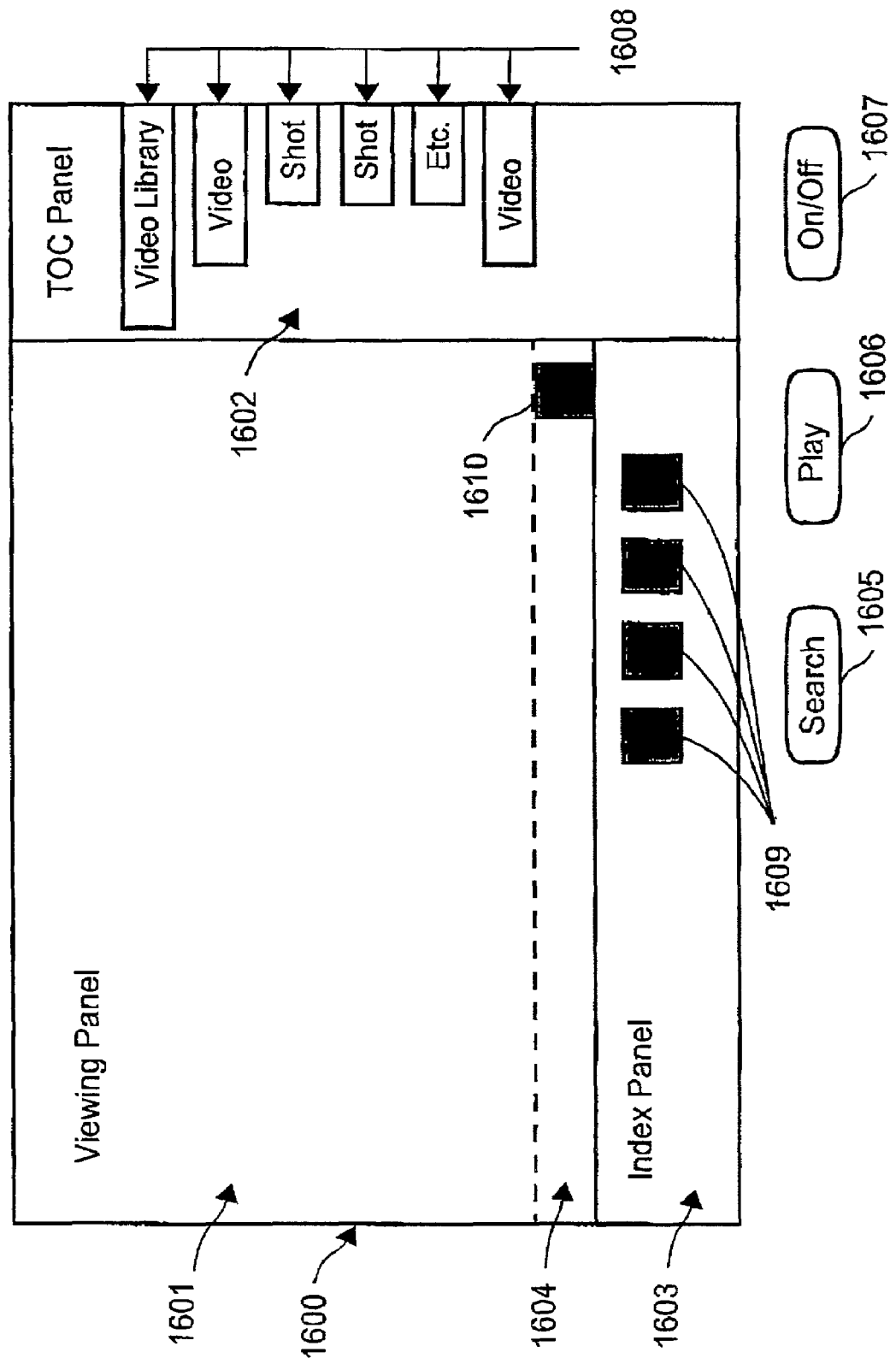
FIG. 16 shows a schematic diagram Digital Video Browser System in accordance with another embodiment.

An example of such a Digital Video Browser System is shown in FIG. 16. The system contains a Video Browser Panel 1600 which consists of a Viewing Panel 1601, a Table-of-Contents (or TOC) Panel 1602, and an Index Panel 1603. Outside of the Video Browser Panel 1600 but within the system are three buttons required for user interaction; a Search button 1605, a Play button 1606, and an On/Off button 1607.

User interaction with the panels of the Digital Video Browser System call be mediated by a touch-sensitive Video Browser Panel, however this feature is not necessary for the operation of the system. The operation of the Digital Video Browser System will now be discussed in the terms of FIG. 16.

When a new digital video resource is added to the Digital Video Browser System a predetermined description scheme is applied to the digital video resource resulting in the content creation methods of the relevant descriptor handlers in the description schemes being initiated. Other implementations might provide more than one description scheme which can be applied to the digital video resources. For example, a Digital Video Browser System might provide the description schemes contained in Appendices B and D. In such an embodiment the user would require a means to select the description scheme that he/she would like to apply to each new digital video resource. So, for example, if he/she was adding a new digital video resource containing the footage from a football match then he/she would most likely use the description scheme in Appendix B, however if the digital video resource contained some footage of a recent holiday, then it's likely that the description scheme contained in Appendix D would be more appropriate.

If more than one description scheme is available then the selection of the most appropriate description scheme to use could also be automated to some extent. The resource to be described could be analysed to see if it contained key features that typically indicate the use of a particular description scheme. For example, the sound track of a digital video resource could be analysed for repetitive whistle sounds arising from a referee's whistle. If detected, such sounds could provide evidence for the use of a particular description scheme (eg., the description scheme shown in Appendix B).

In a simple description scheme such as that included in Appendix B there is a single descriptor handler specified for the description (which is also a descriptor), which generates the entire content for the description.

In other description schemes, more than one descriptor may have an associated descriptor handler which is responsible for automatically generating the content of just that descriptor. For example, consider the description scheme shown in Appendix D. The VideoDescription descriptor D1 has an associated descriptor handler D2 which provides a method to automatically segment the digital video resource into a series of individual shots. The Shot descriptor D3 has an associated descriptor handler D4 which provides a method to automatically select a key frame from a specific shot and then generate a series of semantic labels which provide some information about the content of the particular shot (eg., whether or not the shot contained people, was an indoors or outdoors shot, etc.). These descriptor handler methods are executed on the creation of a descriptor in the description being generated. Therefore the description can be progressively constructed using the description scheme (effectively as a template) and the set of descriptor handlers that provide the methods for automatically generating the content for their relevant descriptors. An example of such a generated description is provided in Appendix E.

In the case of the Digital Video Browser System depicted in FIG. 16, the descriptors able to be accessed in the Index Panel, rather than the TOC Panel are classified as Index Descriptors. The classification of descriptors as Index or TOC descriptors is achieved using presentation rules (see Section 8. Method of Presenting Descriptions of Resources), with each description scheme being used by the Digital Video Browser System having a corresponding presentation rule set. For example, a presentation rule could be applied to each of the descriptor definitions in the description scheme to add an attribute definition to the descriptor's definition for the purposes of this classification. The added attribute definition could have a attribute default of #FIXED "Index" or #FIXED "TOC" to classify an Index and TOC descriptor, respectively. [Note: The use of the #FIXED keyword in the default value means that changing the value of the classifier from its default value results in an invalid XML construct and hence an invalid description.]

Selecting which descriptors are to be used as Index descriptors is similar to selecting which key words or phrases you would include in the index of a book. In other words, it is an authoring task that results in presentation rules. In general, a descriptor that is classified as a TOC descriptor represents a structural element of the resource (ie., a component that would normally appear in the TOC of a book). So, for example, a Shot descriptor is a TOC descriptor. An Index descriptor typically represents a property of a TOC descriptor (eg., a Shot descriptor could contain people scenes, be an indoor or outdoor scene, etc.).

The Index descriptors are the leaf nodes of the internal tree structure used to represent the description [The internal representation of descriptions is discussed in detail in Section 2.3 Description Object Model (DesOM)]. In the absence of presentation rules, this property can also be used to implicitly differentiate between Index and TOC descriptors in an implemented Digital Video Browser System. In the Digital Video Browser System, explicit differentiation between Index and TOC Descriptors is achieved using presentation rules. A set of presentation rules applicable to the description scheme in Appendix D is shown in Appendix F.

The Digital Video Browser System has access to a collection of digital video resources, which is hereinafter referred to a Digital Video Library. A newly described digital video resource can be simply appended to an existing collection of described digital video resources. Alternatively (see Section 11. Remote Digital Video Browser Devices), the user can insert a new item at the desired location using a drag and drop means. The Digital Video Library is itself a resource able to be described. Therefore, on initialising the Digital Video Browser System a description scheme for a Digital Video Library is used to automatically generate a description for the Digital Video Library.

The description of the Digital Video Library can be very simple containing just a hierarchical representation of the individual descriptions of digital video resources described in the library. In other words, the description need not know about the location of the digital video resources described in the library. It is merely a catalogue of the descriptions of the digital video resources stored in the library. Each individual description has a reference to its corresponding digital video resource.

An example of a description scheme for a Digital Video Library is included in Appendix G. The Digital Video Library's description can contain zero or more Section elements or zero or more Item elements, where each Item element refers to an individual description in the Digital Video Library (ie., an XML document). A description of a Digital Video Library conforming to the description scheme included in Appendix G is shown in Appendix H.

During browsing the user can select sections of Digital Video Library by selecting the relevant descriptors in the TOC Panel 1602 in the Video Browser Panel 1600. This selection method provides non-linear access to the digital video resource(s). Typically these selections are highlighted in the TOC panel to indicate which are currently selected. The user can choose to play all the highlighted selections by pressing the "Play" button 1606.

Alternatively the user can search for sections, items or parts of items of the Digital Video Library by selecting relevant Index descriptors in the Index Panel 1603. In a simple Digital Video Browser System implementation, the Index descriptors might imply simple boolean presence of a specified feature. For example, the PeopleScene Index descriptor (see D5 in Appendix D) could indicate whether people are either present or absent from the shot. In a more sophisticated Digital Video Browser System the Index descriptors might require some representative value. For example, a "Date" Index descriptor would require a specified value before a search could be performed.

Searches can be performed within a TOC context in the Digital Video Library. For example, if a user wanted to search for PeopleScene descriptors within a specific digital video resource, the user could select the TOC descriptor for that particular resource in the TOC Panel 1602 and then select the desired Index descriptor in the Index panel 1603 and press the "Search" button 1605 in the Digital Video Browser System. The search process would then result in all TOC descriptors that satisfied the search criteria becoming selected (eg., highlighted) in the TOC Panel 1602. The user could then select to play all the selected sections of the digital video resource by pressing the "Play" button 1606.

Searches can be implemented in the Digital Video Browser System using selection rules (see Section 10. Method of Selecting Resource Descriptions). The TOC context is automatically inserted as part of the pattern of the selection rule. The search process applies the selection rule pattern to each relevant description and updates a selection attribute that has been added for all selectable attributes using a presentation rule. Selectable attributes will vary between description scheme and application. In the case of the description scheme included in Appendix D the only descriptors that might be classified as selectable would be the VideoDescription and Shot descriptors (see the presentation rules in Appendix F).

The Digital Video Browser System also provides functionality for manual annotation, in conformance with the description scheme, of a digital video resource. If a particular TOC descriptor is selected, then the relevant Index descriptors 1609 can be displayed in the Index Panel 1603. The Index descriptors are preferably represented by icons (which in preferably are specified by presentation rules targeted at the descriptor definitions). The selected TOC descriptor can be viewed (played) and then manually annotated by dragging icons representing the Index descriptors (eg., 1610) into an Annotation Region 1604 of the Viewing Panel 1601. Annotations created in this fashion are then added to the description of the resource and are available for subsequent browsing.

Annotations in the form of titling various TOC Descriptors could also be possible in some implementations of a Digital Video Browser System. For example, in a Digital Video Browser System implemented in software on a regular personal computer, the screen representation of the Descriptor could be selected and then the title for the descriptor could be entered using the computer's keyboard. In alternative embodiments, in which access to the Video Browser Panel 1600 is provided via a touch-sensitive display, user entry of textual titles could be mediated by a pen interface or via a method whereby a particular descriptor is selected by touch, and the title communicated by the user speaking the title words and a speech-to-text module in the Video Browser System converting the spoken words to text and displaying the result where a title is expected on the display.

Whenever new descriptions are retrieved for browsing the description is processed into a DesOM, Before the description is actually presented in the Video Browser System, any inference or equivalence rules (see Section 8. Method of Extending Descriptions of Resources) that are associated with the description's description scheme are processed. This processing involves iterating through the defined inference rules until no more changes can be made to the description. Clearly, this rule processing requires that there are no circular dependencies in the rule set. The inference and/or equivalence rules will result in the creation of new descriptors which have been inferred from those that were part of the serialised description. Preferably, any new descriptors created by this process will have been defined as part of the relevant description scheme (and as such will have been classified as an Index or TOC descriptor). The inference rules will need to be reprocessed in the event of any annotations being created.

14. Third and Fourth Embodiment of Apparatus—Remote Digital Video Browser Devices The Digital Video Browser System described in the previous section can also be implemented as a dedicated remote device. In this section two possible remote device embodiments of the Digital Video Browser System are described with respect to FIG. 17 and FIG. 18.

Figure 17:
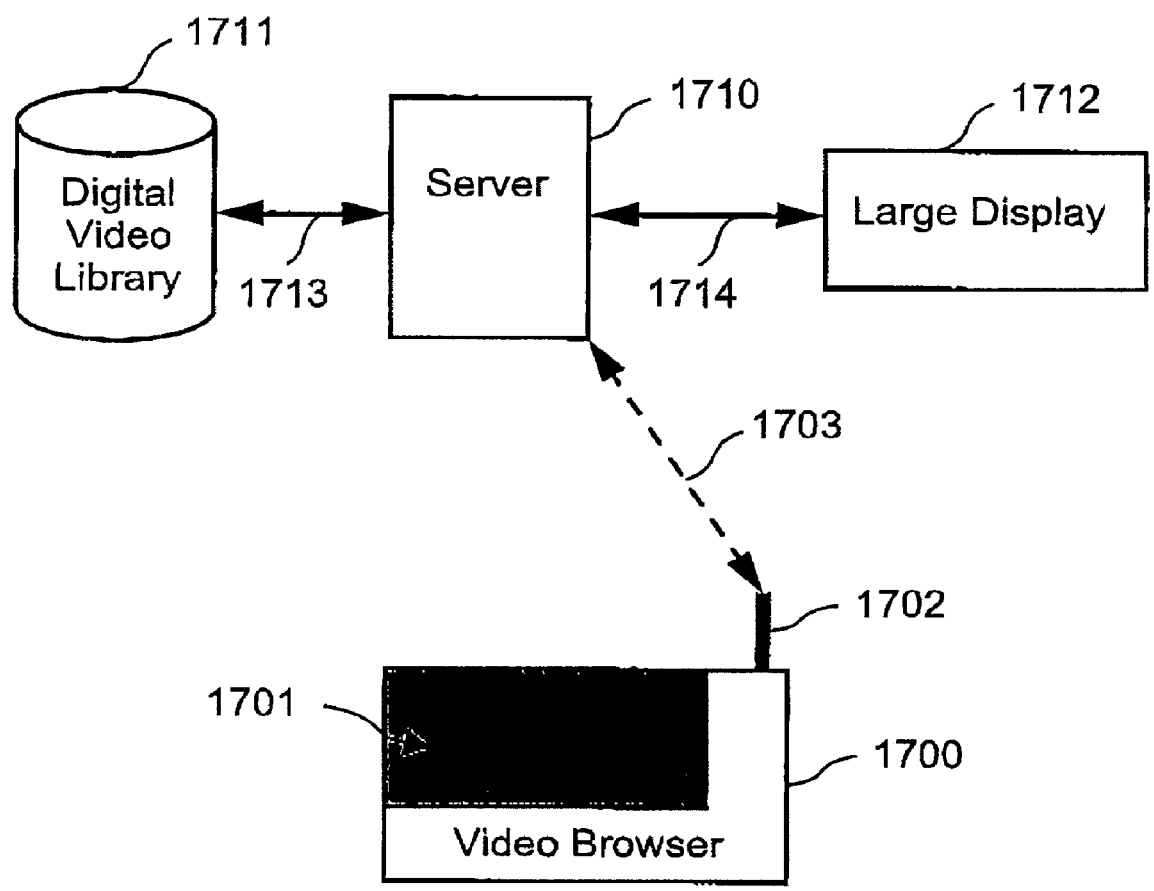
FIG. 17 shows an implementation of the Digital Video Browser System in a remote handheld device in accordance with another embodiment.

The first remote device of the Digital Video Browser System is shown in FIG. 17. In this embodiment the Video Browser 1700, contains no storage for the Digital Video Library. The Video Browser 1700 communicates with a Server 1710 using a wireless transmitter/receiver 1702 and a wireless connection 1703. The Server 1710 has a connection 1717 with a storage device that contains the Digital Video Library 1711. All the digital video resources that can be browsed by the Video Browser are stored in this Digital Video Library. Preferably, in this remote device all the descriptions of the digital video resources are also stored in this library 1711. The Server 1710 also has a connection 1714 to a large display 1712 that can be used for public viewing of the digital video resources. Preferably, the connections between the Server 1710 and the Digital Video Library 1711 and between the Server 1710 and the large display 1712 are wired connections.

New digital video resources can be added to the Digital Video Library 1711 which is directly connected to the Server 1710 independently of the Video Browser device 1700. As the resources are added to the Digital Video Library 1711 (from, for example, a digital video camera), descriptions for the digital video resources are automatically generated using the description scheme. Also at this time, usually after the description has been generated, the user could optionally title sections of the digital video resource. These titles would then be visible when browsing using the Digital Video Browser device.

On power-up the Video Browser device connects to the Server 1710 using the wireless connection 1703. The Server 1710 communicates to the Digital Video Browser device a description of the Digital Video Library. This description, like descriptions of the digital video resources, conforms to a description scheme (in this case for a Digital Video Library), and is serialised in an XML document. An example of a description of a Digital Video Library is shown in Appendix H.

The remote Digital Video Browser device 1700 can either store the relevant description schemes permanently, or download these description schemes at the time of making its connection with the Server 1710. The latter method of obtaining the description schemes is preferred. The description of the Digital Video Library and the relevant description schemes contain all the information required to display an Index and TOC panel on the Digital Video Browser device 1700. The user can then use the Digital Video Browser device to navigate through the Digital Video Library, selecting or searching for video resources to view Preferably, the navigation through the TOC and Index panels is enabled via a touch-sensitive screen. Other methods of navigation (eg., a pen or simple keyboard) could also be used.

Only when a Digital Video Browser user selects to "Play" a particular selection of digital video resources, is it necessary to transmit the required digital video resources from the Digital Video Library 1711 to the remote Digital Video Browser device 1700. Preferably the digital video resources are stored and transmitted in compressed form (eg., MPEG-1 or MPEG-2) therefore minimising the bandwidth of the required wireless connection 1703 between the Server 1710 and the remote Digital Video Browser device 1700.

The remote Digital Video Browser device can optionally have an additional button (to those shown in FIG. 16), which can be used to direct the Viewing Panel 1701 of the remote Digital Video Browser device to a large display 1712 connected to the Server 1710. This redirection can be achieved by transmitting a description of the required presentation (ie., an XML document) from the remote Digital Video Browser device 1700 to the Server 1710. This description would conform to a Video Presentation Description Scheme (eg Appendix I) that could be as simple as just a list of all the selected sections of the selected digital video resources. An example description of a video presentation is shown in Appendix J.

The video browser system generates a description of a video presentation by first reading the description scheme for the presentation (eg Appendix I). This description scheme contains definitions of descriptors required for the video presentation (eg VideoDescription Reference, Shot Reference descriptor definitions in Appendix I). The video browser system then generates the description of the presentation using the description scheme read by the browser and information about the resources that have been selected for presentation. The result of this step is a description such as shown by way of example in Appendix I. This description can then be directed to an output device 1712 for rendering.

Preferably, this description is interpreted by the Server 1710 and the corresponding sections of the selected digital video resources would be rendered to the large display 1712. The rendering is performed by the Server 1710 and pixel data would be transmitted over the connection 1714, however if the large display 1712 had the processing ability to decode the compressed digital video resource, then the compressed resource could be transmitted over the connection 1714 and then decoded and rendered in the large display 1712.

Clearly, presentation rules could be applied to the presentation of the selected items in the same way as presentation rules are applied to a description of a digital video resource. Some presentation rules that could be applicable to the presentation of digital video resources include rules that specify the type of transitions to be inserted between shots of a particular digital video clip (eg., fades, cuts, wipes, etc.) and whether clip titles are to be rendered over the presented video and the style of title rendering to be used. These rules could be collected in a presentation rule set that is linked with the Video Presentation Description Scheme in the same way that sets of presentation rules could be linked to the Digital Video Resource Description Scheme (see Appendix D).

Alternative Digital Video Browser implementations could allow users to specify additional presentation rules for the presentation of selected digital video resources. For example, an implementation could allow a user to specify whether a particular selection was to be played at recorded, slow or fast speed. Altering the speed of video playing can provide interesting presentation effects. Similarly, the Digital Video Browser user might also be able to specify the types of transitions to use on a one-off presentation basis rather than a default basis as provided by rules linked to the Video Presentation Description Scheme. These one-off presentation rules can be combined into a single rule set which is referenced by the Description element of the presentation description that is communicated to the Server 1710 when the user chooses to play the selected digital video resources (whether on the Digital Video Browser device itself or, more likely, when the presentation has been re-directed to the large display 1712).

An example of a Video Presentation Description Scheme, which could be used with the Video Description Scheme shown in Appendix D, is shown in Appendix I. In this description scheme, a standard set of presentation rules is provided as part of the description scheme. These rules have been collected into a rule set and stored in the XML document which, in the case of the example is called "VideoPresentationRules.xml". The rule set has then been referenced by the description scheme by specifying an ENTITY for the ruleSets attribute I1 of the VideoPresentationDescription element. The attribute userPresentationRules I2 has been added to the VideoPresentationDescription subclass of the Description element to be able to contain an ENTITY that specifies an xml document that contains any presentation-specific rules.

An example of a video presentation description that conforms to the Video Presentation Description Scheme, which is included in Appendix I, is shown in Appendix J. A set of presentation-specific rules has been specified for the particular presentation using the userPresentationRules attribute of the VideoPresentationDescription element (see J1). Clearly the example description scheme and presentation description included in Appendices I and J pertain to the Video Description Scheme included in Appendix D since they refer to particular descriptors in that description scheme. For example, the VideoDescriptionReference element contains zero or more references to Shot elements in the referenced video descriptions. In particular the shotIDRef element J2 specifies a particular shot descriptor in the description contained VideoEgl.xml, by using a reference to the ID of that descriptor in the description. It is not necessary to use a Video Presentation Description Scheme that is directed so specifically at a particular description scheme. For example, if a Digital Video Browser System was implemented with more than one description scheme, then a more general Video Presentation Description Scheme can be used.

The ability to be able to re-direct the Viewing Panel 1701 to a large display 1712 connected to the Server 1710 is a useful feature as the user can select the sections of his/her Digital Video Library that he/she wishes to share with an audience using the remote Digital Video Browser device. That selection can then simply be played to the large display 1712.

Figure 18:
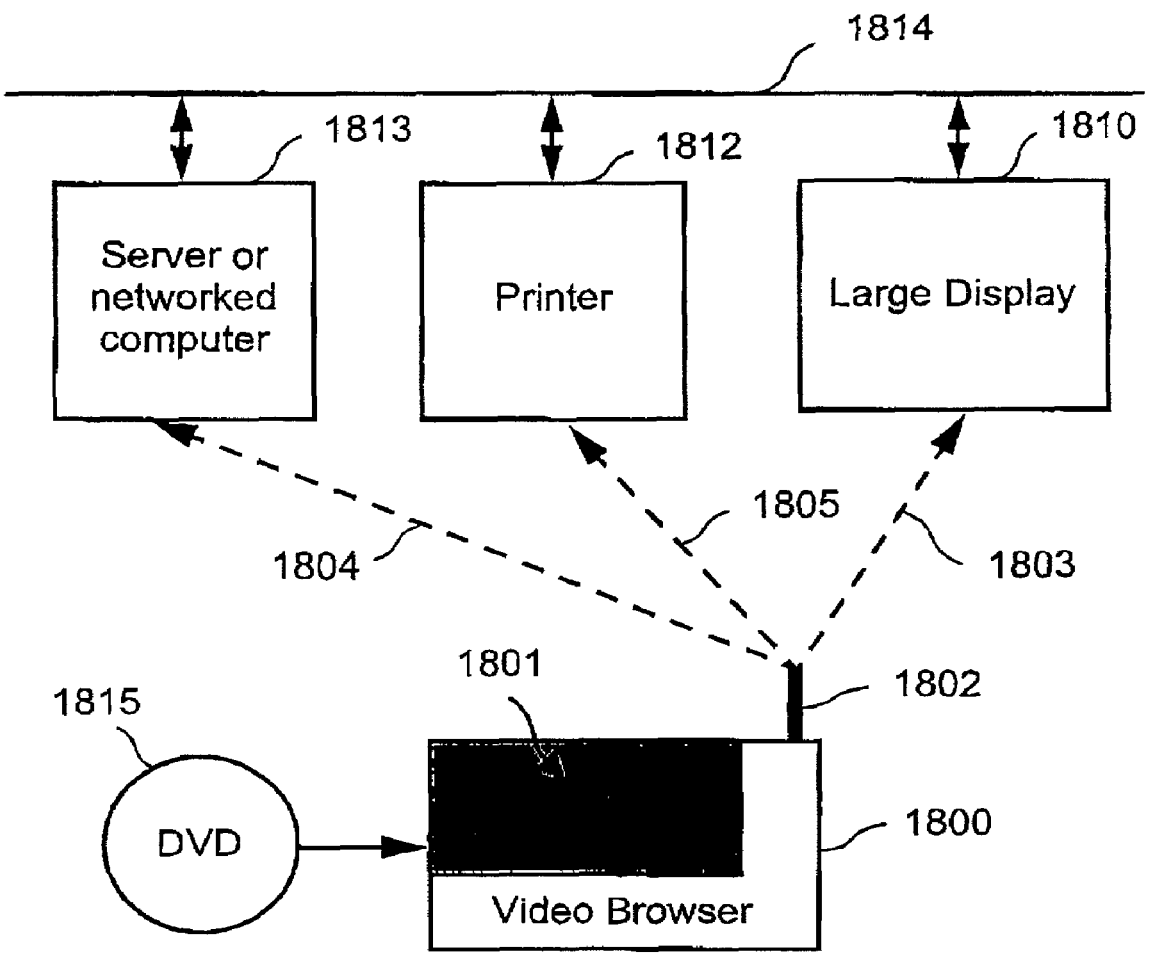
FIG. 18 shows an alternative implementation of the Digital Video Browser System in a remote handheld device in accordance with another embodiment.

A second remote device implementation of the Digital Video Browser System is shown in FIG. 18. In this implementation the Digital Video Browser 1800 is implemented as a remote device that has a capability to read Digital Video Disks (DVDs). Typically each DVD is treated like an independent Digital Video Library and consequently each DVD has its own description of the Digital Video Library contained on the DVD. When the DVD 1815 is inserted into the remote Digital Video Browser device 1800 the Video Browser 1800 reads the description of the Digital Video Library contained on the DVD. In this device the description scheme required to interpret the Digital Video Library would preferably reside in the remote Digital Video Browser device, however it is conceivable that the description scheme could also be located on each DVD. Similarly the description schemes required to interpret the descriptions of the digital video resources could either be located on the DVD or in the remote Digital Video Browser device. In the preferred implementation of this device, all the required description schemes are located in the remote Digital Video Browser device 1800. New description schemes for digital video resources can be downloaded via the wireless transmitter/receiver 1802 and wireless connection 1804 to a server or computer 1813 connected to a network 1814. Alternatively, the remote Digital Video Browser can be docked at a server or networked computer for the download of new description schemes.

Once the description of a Digital Video Library has been read from the DVD 1815 then the user can navigate through this Digital Video Library as described previously. Sections of described digital video resources can be selected and played on the remote device. The device is in many respects very similar to the device depicted in FIG. 17, with the exception that it does not require a Server to store the digital video resources and descriptions.

Sections of the selected digital video resources can be selected for viewing on a large display 1810 that has a wireless connection 1803 with the remote Digital Video Browser device. This large display 1810 must either contain, or be directly connected to, a processor able to decode and render the compressed digital video resource that is transmitted via the wireless connection 1803. As with the remote device depicted in FIG. 17, a description of the required presentation is communicated to the large display 1810. In addition, any digital video resources required for the presentation description to be rendered must also be communicated. These resources are typically communicated in compressed (encoded) form (eg., MPEG-1 or MPEG-2). The processor either contained in, or directly connected to, the large display 1810 renders the presentation using the presentation description and its associated digital video resources. The rendering process can typically adapt to the resolution of the large display 1810, which is usually greater than that of the handheld device.

In the preferred implementation of this device 1800, if the description of the required presentation requires that only particular sections of a selected digital video resources be presented, then these required sections can be isolated from the original digital video resource, recorded if necessary in the handheld device, and then communicated to the large display 1810. This approach reduces the communication bandwidth of the wireless connection 1803. Alternatively, the entire digital video resource can be communicated and the processor that renders the presentation will need to extract the relevant sections of the digital video resource(s). The latter implementation is more costly in bandwidth but does not involve recording of digital video resources in the remote device.

In order to facilitate resource discovery on different DVDs, this remote Digital Video Browser device can also have an ability to generate printed DVD covers that display the contents of the DVD in a graphically pleasing manner. This printed presentation can be achieved in substantially the same manner as described for a vide presentation. This facility can be achieved using a wireless connection 1805 to either a printer with some processing ability 1812, or to a computer directly connected to a printer (not shown in FIG. 18). Typically the Digital Video Browser device would send to the printing device (1812 or the computer directly connected to a printer), a description of the (printed) presentation that is to be the printed DVD cover.

Description schemes for this presentation could be designed just as they can be designed for video presentations (eg., see Appendix I). For example, at the simplest level the Digital Video Library description could form the basis of the printed presentation. Presentation rules could then be used to specify the spatial layout and colour arrangement of the printed presentation, and also the association of icons or key frames to particular descriptors in the description. The presence of visual reminders of the content of the DVD, such as icons or key frames, are important for purposes of identification and retrieval.

A processor, which is located either in the printer 1812 or it a computer connected to the printer could then use the description of the required printed presentation and any provided presentation rule sets to render a DVD cover for the particular DVD using the provided key frames. This processor would need to be able to interpret the description of the printed presentation.

15. Fifth Embodiment of Apparatus—Media Browser System

Browsing of electronically-accessible resources other than digital video can also be enabled by descriptions that conform to identified description schemes. In an alternative embodiment, a Media Browser System can enable the description-based browsing of any electronically-accessible resource. Although the description schemes used to describe these different resources might be significantly different, a common browsing framework, called here a Media Browsing System, can be used. The Video Browser System described in Section 13 is a more specific embodiment of the Media Browser System described in this Section. However, many aspects of the Video Browser System can also be implemented in the Media Browser System.

The browsing method requires that each resource is consistently described (eg., using the DDF) according to a description scheme and the resulting description contains a link to the resource or sections of the resource. Preferably, the DDF (see Section 2) is used to provide a consistent method of describing resources, however alternative methods of describing resources could also be used. For example, other schema languages such as XML-Schema of the W3C could also be used. In the case of XML-Schema, core descriptor elements can be defined in substantially the same way as described for the DDF in section 3.1.2.

In addition, in the embodiment described here, descriptor components of description schemes are further classified using predetermined classifications that provide axes of access to the resources. The preferred axes of access used in this embodiment are the structural access (Table of Contents (TOC) access) and the index access. These axes have been used because humans are familiar with their use in, for example, reference books. Whereas the TOC-axis of access provides access to resources on the basis of context (ie., where a resource or section of a resource exists in relation to other resources or sections of resources), the index-axis effectively provides context-free access to resources (just as an index in a reference book). It should be clear to those skilled in the art of browsing technologies that the value of this classification of descriptor components into TOC and index axes of access is that a Media Browser System can act both as a browser (in the sense of current web-browsing technology) and a search engine in one.

It is possible to use different axes of access and the number of axes is not limited to two. For example, the Media Browser System could use an interface similar to that shown in FIG. 16 for the Digital Video Browser System, but having a further axis of access on the left hand side of the viewing panel to provide access to the digital video via audio events. Another variation is one where more than one TOC axis can be used to allow more than one structural view to browsable content. For example, one TOC might provide browsing access using content category (eg. birthday images) and another axis might provide access by date of creation.

The predetermined classification of descriptor components into axes of access can be achieved using the methods described for the Digital Video System (see Section 13). Any electronically-accessible resource can be accessed by the Media Browser System using a description of the resource as long as the Media Browser System call access the description scheme to which the description conforms and a processor for the class of resource. For example, a digital video resource might require a MPEG-1 or MPEG-2 processor (player) to be present, an image might require a JPEG viewer and an audio object might require an MP3 audio processor. These processors are preferably stored with the browser and new processors are able to be downloaded when required by a resource. The Media Browser using the DDF, identifies the processor required by the resource by the relevant NOTATION declaration in the description scheme (see Section 3.1.2.2).

The resources can be an electronic document or other resources available over the web. The resource can also be an electronic device. The description that appears in the TOC axis can also be located at different sites on the web. In this sense, the TOC axis can be compared to a set of description bookmarks. A TOC item may contain links to other descriptions, to individual resources or sections of resources (eg. a spatio temporal extent in a digital video).

It should be clear to someone skilled in the art that if resource library providers on the web described their resources using a consistent method such as the DDF, a TOC axis could be made to extend over all resource libraries of interest to a particular user. In other words, the TOC could represent an information landscape over which a user could browse and search for resources. This has the advantage of the user not having to visit each digital resource library site in turn in order to search for desired resources.

The media can be browsed, annotated and searched in the same way as that described for digital video resources (see Section 13). Clearly, the descriptors that appear in the different axes during browsing will vary depending on the description schemes that are relevant with regard to the browsing context at any particular instance. For example, if more than one description is currently in context and these descriptions conform to different description schemes then an index panel will reflect all the descriptor components which have been classified as index descriptors ink the relevant description schemes. In other words, the set of index descriptors that are shown at any time in the Media Browsing System represents the union of the sets of index descriptors tat arise from all the description schemes that are relevant to the descriptions that are currently in context. In other embodiments, it would be possible to show only those index descriptors that represent the intersection of the sets of index descriptors that arise from the relevant description schemes. In this case, an index descriptor would need to exist in each of the relevant description schemes before it could be provided by the Media Browsing System as an index for browsing.

The selection of a TOC context for searching using the index panel is implemented in the Media Browser System using the method that is described for the Digital Video Browser System (see Section 13)

Links between descriptor components of descriptions and spatially and/or temporally localised sections of the resources can be represented in the descriptions using locators and extents (see Section 3.1.4 for how these constructs are used in the context of the DDF). Preferably, the navigation of these links is performed automatically by the Media Browser when the user selects to play/view the selected resource(s). The Media Browser identifies the spatial and/or temporal extent(s) that are linked to a selected descriptor and plays/views the section(s) of the resource which contain the extent(s).

For example, a descriptor could refer to a spatially and temporally localised object in a digital video. This object can be represented spatially by a rectangular bounding box and temporally by a range of image frames. If a user selected the object's descriptor and chose to play the selections, the Media Browser would automatically identify the frames which contained the object and play that section of the video only.

The Media Browsing System differs from existing HTML browsers in that the entities mediating the browsing [eg., the (DDF) descriptions] contain only descriptions of the resources to be browsed. In the case of the HTML browse, the HTML documents represent the resource, control the presentation of the resource and also contain some description of the resource (the META tag). The browser typically does not use the descriptive information. In contrast, the entities mediating the browsing in the Media Browser System are ONLY descriptions of resources. These descriptions contain links to the relevant resources or sections of the resource to be viewed or played. The key and most obvious advantage obtained by browsing using descriptions of resources is browsing access to non-textual resources (eg., digital signals) However, the Media Browser style of browsing also uses the descriptive information available about resources to provide a richer browser interface that can include annotation and searching. This richer interface is also available to textual documents (eg., XML and HTML documents).

Figure 20:
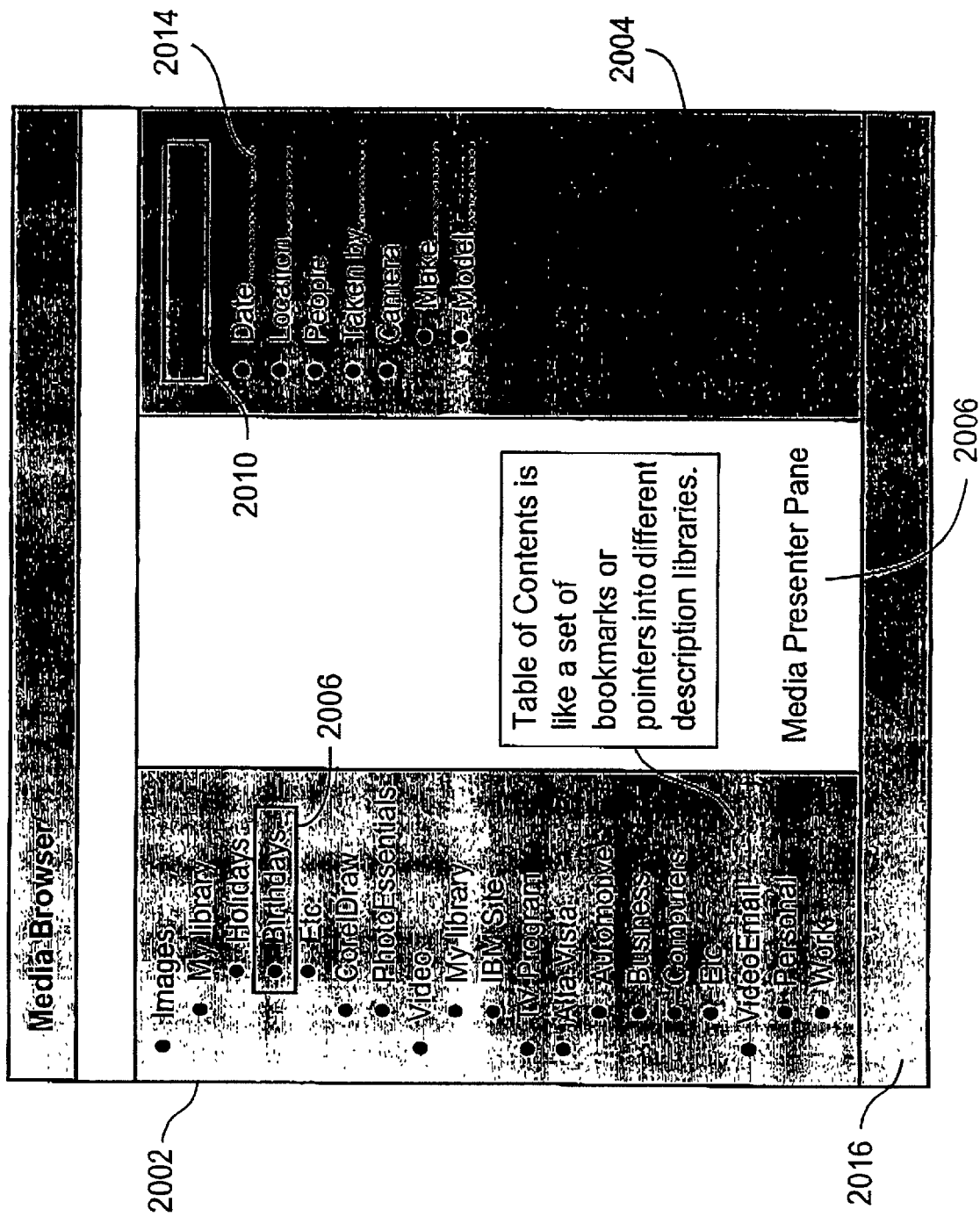
FIG. 20 shows a schematic diagram of an Media Browser System in accordance with another embodiment.

FIG. 20 shows an example of the Media Browsing System in accordance with the fifth embodiment. The Media Browser system 2000 contains a viewing pane 2006, a Table of Contents (or TOC) panel 2002 and an Index panel 2004 The TOC panel 2002 displays a Table of Contents of all resources and resource libraries that are of interest to a user. The TOC effectively represents a personal library where individual items are typically distributed across the web. It is like a set of bookmarks or pointers into different description libraries or single descriptions.

The TOC axis provides an information landscape for the user to browse. Individual items of TOC can be:

(i) expanded to show contained items or collapsed to hide contained items;

(ii) selected to play/view;

(iii) selected for the current context (eg. to search).

Preferably, these browsing functions are enabled in the following way. Each TOC item consists of a node symbol (eg. a large bullet symbol) and a node content (which is defined by the corresponding descriptor in the description). The node content can be an image (such as a key frame as is preferably used to represent a section of video) or some text which can describe the personal item (whether it represents a section in the personal library or information landscape, or a resource).

TOC items are expanded and collapsed by checking on the node symbol (ie. the node symbol acts as a toggle). It is preferable for the node symbol to indicate whether an item can be expanded. For example, the node symbol can be displayed as an open bullet symbol if it has contained items (ie. can be expanded) and a filled bullet symbol if it cannot be expanded).

TOC items can be selected for viewing/playing by clicking on the node content. Preferably, a single click indicates that an item should be queued to be viewed/played. A double click action results in immediate viewing/playing of an item. Items that are queued for viewing/playing are only played when the user selects to present the media. A Media Presenter tool is described later in this Section. Preferably, a button appears in the control region 2016 to initiate presentation. Pressing this button involves the current presentation tool which is a plug-in tool of the user's preference. It should be clear that many such plug-in tools could be used. If a user was only interested in images then only an image plug-in tool would be required. If a user was browsing a range of content then a more sophisticated plug-in tool would be required. This tool would need to be able invoke more specific tools for the playing/viewing of different type of resources.

Preferably, items that have been selected are differentiated from unselected items by highlighting the node content (eg displaying a node content's text in bold or highlighting the frame of an image or visual icon). Selection of an item that contains other items automatically selects the contained items.

TOC items can also be selected for context. Preferably, context selection is achieved by right clicking the node symbol. This action results in a coloured frame being displayed around both node symbol and the node content. Any context can be removed simply by right-clicking on the node symbol (ie. right-clicking on the node symbol acts as a toggle for select for context, just as left click on the node symbol acts as a toggle for expand/collapse. Right clicking of the node content of an item can be used to display properties of the corresponding item. Preferably, these properties contain the index descriptors that pertain to that node item.

It should be clear to those skilled in the art that the browsing functions of the TOC axis can be implemented in many different ways without departing from the spirit and scope of the invention.

Preferably each axis of the Media Browser System can be scrolled. This means that a section of the TOC can be retained in an expanded form and a further section scrolled into view. The properties can be displayed in a small panel (like a callout) adjacent to the node content.

Initially, the Index panel 2004 displays all index items associated with all the table of contents items. In the present example, it can be seen that the item "Images—Birthdays" 2008 of the Table of Contents has been currently selected for context by the user. The Media Browser System 2000 then displays in the index panel 2004 a list of indices determined by the description schemes that correspond to the currently selected item of the Table of Contents (eg. in this case birthday images).

The Media Browser System also allows the user to further describe or annotate TOC items. Annotation can be achieved by allowing the user to drag a displayed index item onto displayed TOC items. An annotation of this form is only allowed if the dragged index item is a valid descriptor for the corresponding TOC descriptor. For example, a user would be allowed to drag a "People" index item onto a particular birthday image if the corresponding "People" descriptor was a valid descriptor for the image descriptor. The "People" descriptor is an example of a descriptor not having a representative value, ie. it acts like a boolean indicator of the presence of a person in, in this case, an image. Many index descriptors require representative values to be specified as part of the annotation process. In these cases, as the required index item is dragged onto the TOC item, if the corresponding descriptor is allowed for that TOC item, a field or edit box is displayed for the user to enter the required representative value. Preferably, the Media Browser System ensures that the entered representative value is in the required form for the descriptor eg. dates may be specified to conform to a particular ISO standard. Datatyping of representative values is discussed in Section 2.

Index descriptors that have been added to TOC items can be viewed by selecting to view the properties of the TOC items. Preferably, properties of TOC items can be displayed by right clicking the node content.

Preferably, all descriptors are viewed as being annotable. In the event a description's origin is a remote database which is not available for update, the annotations are stored locally as a copy of the updated description having a link to the remote description. The link for the relevant TOC item is updated to point to the updated local copy of the description. In a subsequent browsing session, the local copy of the description is read and the description which is used by the browser is constructed by obtaining the remote description and then modifying this description according to the local copy. This method ensures that changes in the remote description are available to the user (ie. the local copy does not simply overwrite the original description). An alternative way of achieving this is to only store locally annotations in a partial description form. The form of these annotations could be defined by a special description scheme.

Another variation of the annotation procedure would be to allow read-only descriptors. For example, the core description element (as defined in Section 2) could be amended to include a read-only attribute. If a description was classified as a read-only item then a user would not be permitted to annotate TOC items corresponding to that description.

Preferably, the index panel 2004 contains an input box 2014 associated with each index item for user entry of a query. In this way, a user may for example enter a date query (eg. July 1999) in the input box associated with date index. The Media Browser will then highlight in the TOC any TOC items, that satisfy the query (ie. have a date value of July 1999) and are contained in the currently selected context of the TOC (ie. birthday images).

Preferably, the index panel 2004 also contains a input box 2010 for a user entry of a free query. This input box 2010 is used as the input interface for a searching engine across all description schemes. Preferably, the free query is entered as natural language then subsequent processed into a structured query which uses index descriptors that correspond to the TOC context.

Alternatively, searching functionality can be provided by a plug-in tool that uses the Media presentation pane 2006 to help the user construct a query using the index panel 2004. This plug-in tool can be invoked by a user pressing a search button that can be located in the control region 2016 at the bottom of the screen. The search tool can allow a user to construct a query by dragging index items (which correspond to index descriptors) from the index panel 2004 to the Media presentation pane 2006. The plug-in tool can also allow a user to combine various descriptors using the logical connectors typically used with search engines (eg. AND, OR, NOT etc), and allow a user to formulate a free text query. Clearly any free text queries, whether entered using the search plug-in tool or the input box 2010 would need to formulated in terms of descriptor components. Inferencing techniques (as employed in some expert systems) can be used for this purpose. The separate search plug-in tool could also optionally display the results of the search in the Media presentation pane 2006 and allow the user to select and play particular items returned by the search.

Other plug-in tools can provide additional functions to be applied to selected content. Each of these tools could be invoked in the manner described above for the search tool. Alternatively, these tools could be invoked by a pull down menu option. These additional functions could include emailing selected items to selected people (using, for example, addresses from an address book of a commonly used email tool), or generating an automatic presentation based on the selected content. The latter example could use stylised templates that make presentation decisions based on the descriptor components of selected resources.

The foregoing description of the Media Browser System assumes that descriptors are classified according to their axis of access either by attributes which are part of the description schemes or by using a set of rules for adding the attributes to the description schemes. In the latter case the rules may be associated only with the Media Browser application or can be more widely used in, for example, other applications.

In the event that the classifications cannot be achieved with one of the foregoing methods, axes of access classifications for individual descriptors can be inferred by the Media Browser System. This inferred classification can use information about the base elements defined using the DDF. For example, a descriptor could be classified as a TOC descriptor if it is directly associated with either a resource or a section of the resource. If descriptions are generated according to the DDF then any descriptor which is a specialisation of a description element will have an associated resource through its definition (see Section 3.1.2.2) and any descriptor that contains a linking element to a section of a resource (see Section 3.1.4) will have an associated resource through the target of it link. These descriptors could be inferred to be TOC descriptors. All remaining descriptors could be treated as index descriptors. Although this method of classifying descriptors might not be ideal (eg., all non-TOC descriptors might not appear to be sensible index descriptors), it does enable the Media Browser System to present descriptions not having sufficient presentation rules.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

Appendix A: Core DDF Element Definitions

Core.ddf

```
<!----------------------------------------------------------------
Core.ddf: Contains the definitions of core DDL elements
---------------------------------------------------------------->

<!NOTATION JavaClass SYSTEM "java">
<!ENTITY % DataTypes "(Int | Float | Double | String | Date | Time | ID | IDREF | IDREFS | ENTITY | ENTITIES)">

<!----------------------------------------------------------------
Definition of core elements
---------------------------------------------------------------->

<!ELEMENT Descriptor (ANY)>
<!ATTLIST Descriptor
        id              ID              #IMPLIED
        xml:lang        CDATA           "en"
        dataType        %DataTypes;     "String"
        superElement    NMTOKEN         #IMPLIED
        handler         ENTITY          #IMPLIED
>
<!ELEMENT Description (Descriptor+)>
<!ATTLIST Description
        superElement            NMTOKEN         #FIXED "Descriptor"
        resource                ENTITY          #REQUIRED
        dateResourceLastModified CDATA          #IMPLIED
        ruleSets                ENTITIES        #IMPLIED
>
```

```
<!----------------------------------------------------------------
Definition of selected relationship elements
---------------------------------------------------------------->

<!ELEMENT ParallelSequence (Descriptor+)>
<!ATTLIST ParallelSequence
        superElement         NMTOKEN          #FIXED "Descriptor"
>
<!ELEMENT SerialSequence (Descriptor+)>
<!ATTLIST SerialSequence
        superElement         NMTOKEN          #FIXED "Descriptor"
>
<!ELEMENT Neighbours (#PCDATA)>
<!ATTLIST Neighbours
        superElement         NMTOKEN          #FIXED "Descriptor"
        dataType             %DataTypes;      #FIXED "IDREFS"
>
<!ELEMENT Before (#PCDATA)>
<!ATTLIST Before
        superElement         NMTOKEN          #FIXED "Descriptor"
        dataType             %DataTypes;      #FIXED "IDREFS"
>
<!ELEMENT After (#PCDATA)>
<!ATTLIST After
        superElement         NMTOKEN          #FIXED "Descriptor"
        dataType             %DataTypes;      #FIXED "IDREFS"
>
```

```
<!ELEMENT InFrontOf (#PCDATA)>
<!ATTLIST InFrontOf
        superElement         NMTOKEN        #FIXED "Descriptor"
        dataType             %DataTypes;    #FIXED "IDREFS"
>
<!ELEMENT Behind (#PCDATA)>
<!ATTLIST Behind
        superElement         NMTOKEN        #FIXED "Descriptor"
        dataType             %DataTypes;    #FIXED "IDREFS"
>

<!----------------------------------------------------------------
Definition of link elements
---------------------------------------------------------------->

<!ELEMENT CLink (#PCDATA)>
<!ATTLIST CLink
        superElement         NMTOKEN        #FIXED "Descriptor"
        dataType             %DataTypes;    #FIXED "IDREF"
>
<!ELEMENT ILink (#PCDATA)>
<!ATTLIST ILink
        superElement         NMTOKEN        #FIXED "Descriptor"
        dataType             %DataTypes;    #FIXED "IDREFS"
>
```

```
<!----------------------------------------------------------------
Definition of locator and extent elements
---------------------------------------------------------------->

<!ELEMENT Locator (Extent+)>
<!ATTLIST Locator
        superElement        NMTOKEN         #FIXED "Descriptor"
        resource            ENTITY          #REQUIRED
>
<!ELEMENT Extent (Descriptor+)>
<!ATTLIST Extent
        superElement        NMTOKEN         #FIXED "Descriptor"
>
<!ELEMENT ImageExtent (Descriptor+)>
<!ATTLIST ImageExtent
        superElement        NMTOKEN         #FIXED "Extent"
>
<!ELEMENT RectImageExtent (RectImageExtentX0, RectImageExtentY0,
RectImageExtentHeight, RectImageExtentWidth)>
<!ATTLIST RectImageExtent
        superElement        NMTOKEN         #FIXED "ImageExtent"
>
<!ELEMENT RectImageExtentX0 (#PCDATA)>
<!ATTLIST RectImageExtentX0
        superElement        NMTOKEN         #FIXED "Descriptor"
        dataType            %DataTypes;     #FIXED "Int"
>
<!ELEMENT RectImageExtentY0 (#PCDATA)>
<!ATTLIST RectImageExtentY0
        superElement        NMTOKEN         #FIXED "Descriptor"
        dataType            %DataTypes;     #FIXED "Int"
>
```

```
<!ELEMENT RectImageExtentHeight (#PCDATA)>
<!ATTLIST RectImageExtentHeight
        superElement            NMTOKEN         #FIXED "Descriptor"
        dataType                %DataTypes;     #FIXED "Int"
>
<!ELEMENT RectImageExtentWidth (#PCDATA)>
<!ATTLIST RectImageExtentWidth
        superElement            NMTOKEN         #FIXED "Descriptor"
        dataType                %DataTypes;     #FIXED "Int"
>

<!ELEMENT VideoExtent (VideoExtentStart, VideoExtentEnd, ImageExtent?)>
<!ATTLIST VideoExtent
        superElement            NMTOKEN         #FIXED "Extent"
>
<!ELEMENT VideoExtentStart (#PCDATA)>
<!ATTLIST VideoExtentStart
        superElement            NMTOKEN         #FIXED "Descriptor"
        dataType                %DataTypes;     #FIXED "Int"
>
<!ELEMENT VideoExtentEnd (#PCDATA)>
<!ATTLIST VideoExtentEnd
        superElement            NMTOKEN         #FIXED "Descriptor"
        dataType                %DataTypes;     #FIXED "Int"
>
```

Appendix B: An Example Description Scheme for an Australian Football League Game Description Scheme (AFLGame.ddf)

```
<!-- Core.ddf included here -->
<!ENTITY % Core SYSTEM "Core.ddf">     ←—— B1
%Core;◄
         ◥—— B2
<!----------------------------------------------------
Scheme specific entities
---------------------------------------------------->

<!ENTITY AFLGameGen SYSTEM "AFLGameGen.class" NDATA
        JAVACLASS>
<!ENTITY % PlayType "(Mark | Kick | Handball | Tackle)" >
<!----------------------------------------------------
Element definitions          B3
                              ╱
---------------------------------------------------->

<!ELEMENT AFLGameDescription (Game, Locator*)>
<!ATTLIST AFLGameDescription
        superElement    NMTOKEN         #FIXED "Description"
        handler ◄———    ENTITY          #FIXED "AFLGameGen"
>                                        ——— B4
<!ELEMENT Game (Location, Date, TeamName*, Quarter*)>
<!ATTLIST Game
        superElement    NMTOKEN         #FIXED "Descriptor"
>
<!ELEMENT Location (#PCDATA)>
<!ATTLIST Location
        superElement    NMTOKEN         #FIXED "Descriptor"
>
<!ELEMENT Date (#PCDATA)>
```

```
<!ATTLIST Date
        superElement    NMTOKEN         #FIXED "Descriptor"
        dataType        %DataTypes;     #FIXED "Date"
>
<!ELEMENT TeamName (#PCDATA)>
<!ATTLIST TeamName
        superElement    NMTOKEN         #FIXED "Descriptor"
>
<!ELEMENT Quarter (Play*)>
<!ATTLIST Quarter
        superElement    NMTOKEN         #FIXED "Descriptor"
>
<!ELEMENT Play (PlayerNo, PlayType, Annotator, CLink*)>
<!ATTLIST Play
        superElement    NMTOKEN         #FIXED "Descriptor"
>
<!ELEMENT PlayerNo (#PCDATA)>
<!ATTLIST PlayerNo
        superElement    NMTOKEN         #FIXED "Descriptor"
        dataType        %DataTypes;     #FIXED "Int"
>
<!ELEMENT PlayType (EMPTY)>
<!ATTLIST PlayType
        superElement    NMTOKEN         #FIXED "Descriptor"
        value           %PlayType;      #REQUIRED
>
<!ELEMENT Annotator (#PCDATA)>
<!ATTLIST Annotator
        superElement    NMTOKEN         #FIXED "Descriptor"
>
```

Appendix C: An Example Description generated from the Description Scheme in Appendix B Example Description (AFLGameEg.xml)

```xml
<?xml version="1.0" standalone = "no" ?>
<!DOCTYPE AFLGameDescription SYSTEM "AFLGame.ddf" [
    <!ENTITY MatchVideo SYSTEM "MatchVideo.mpg" NDATA MPEG2>
]>
<AFLGameDescription resource = "MatchVideo">
    <!--A description of the game is contained in this section -->
    <Game>
        <!-- First some details of the game being player -->
        <Location>Sydney Cricket Ground</Location>
        <Date>1998-08-09</Date>
        <TeamName>Sydney Swans</TeamName>
        <TeamName>West Coast Eagles</TeamName>

<!-- Now add play information with links -->
        <Quarter id = "Q1">
            <Play id = "P1">
                <PlayerNo>23</PlayerNo>
                <PlayType value = "Mark"/>
                <Annotator>John Smith</Annotator>
                <CLink linkend = "L1"/>
            </Play>
            <Play id = "P2">
                <PlayerNo>5</PlayerNo>
                <PlayType value = "Kick"/>
                <Annotator>Joe Bloggs</Annotator>
                <CLink linkend = "L2"/>
            </Play>
```

```xml
</Quarter>
<Quarter id = "Q2"> ... </Quarter>
<Quarter id = "Q3"> ... </Quarter>
<Quarter id = "Q4"> ... </Quarter>
</Game>
<!-- This section now contains the linkends for the various plays -->
<Locator id = "L1" resource = "MatchVideo">
    <VideoExtent >
        <VideoExtentStart>0</VideoExtentStart>
        <VideoExtentEnd>10</VideoExtentEnd>
        <RectImageExtent>
            <RectImageExtentX0>50</RectImageExtentX0>
            <RectImageExtentY0>50</RectImageExtentY0>
            <RectImageExtentHeight>100</RectImageExtentHeight>
            <RectImageExtentWidth>40</RectImageExtentWidth>
        </RectImageExtent>
    </VideoExtent>
    <VideoExtent>
        <VideoExtentStart>11</VideoExtentStart>
        <VideoExtentEnd>32</VideoExtentEnd>
        <RectImageExtent>
            <RectImageExtentX0>80</RectImageExtentX0>
            <RectImageExtentY0>100</RectImageExtentY0>
            <RectImageExtentHeight>100</RectImageExtentHeight>
            <RectImageExtentWidth>40</RectImageExtentWidth>
        </RectImageExtent>
    </VideoExtent>
</Locator>
```

```xml
<Locator id = "L2" resource = "MatchVideo">
    <VideoExtent>
        <VideoExtentStart>0</VideoExtentStart>
        <VideoExtentEnd>25</VideoExtentEnd>
        <RectImageExtent>
            <RectImageExtentX0>200</RectImageExtentX0>
            <RectImageExtentY0>150</RectImageExtentY0>
            <RectImageExtentHeight>80</RectImageExtentHeight>
            <RectImageExtentWidth>30</RectImageExtentWidth>
        </RectImageExtent>
    </VideoExtent>
</Locator>
</ AFLGameDescription >
```

Appendix D: Digital Video Resource Description Scheme

Description Scheme (Video.ddf)

```
<!-- Core.ddf included here -->
<!ENTITY % Core SYSTEM "Core.ddf">
%Core;

<!----------------------------------------------------
Scheme specific entities
---------------------------------------------------->

<!ENTITY  VideoDescGen  SYSTEM  "VideoDescGen.class"  NDATA JAVACLASS>
<!ENTITY ShotAnalyser SYSTEM "ShotAnalyser.class" NDATA JAVACLASS>
<!ENTITY VideoPresRules SYSTEM "VideoPresentationRules.xml">

<!----------------------------------------------------
Video resource related element definitions
---------------------------------------------------->
                              D1
<!ELEMENT VideoDescription (Title, Shot*, Locator*)>
<!ATTLIST VideoDescription
        superElement      NMTOKEN     #FIXED "Description"
        handler           ENTITY      #FIXED "VideoDescGen"
        ruleSets          ENTITIES    #FIXED "VideoPresRules"
>                         D2
```

```
<!ELEMENT Title (#PCDATA)>
<!ATTLIST Title
        superElement    NMTOKEN    #FIXED "Descriptor"
>
<!ELEMENT Shot (Descriptor*)>                           D3
<!ATTLIST Shot
        superElement    NMTOKEN    #FIXED "Descriptor"
        handler         ENTITY     #FIXED "ShotAnalyser"
        keyFrame        ENTITY     #REQUIRED
        locator         IDREF      #REQUIRED
>                       D4
<!ELEMENT PeopleScene (EMPTY)>
<!ATTLIST PeopleScene         D5
        superElement    NMTOKEN    #FIXED "Descriptor"
>
<!ELEMENT CrowdScene (EMPTY)>
<!ATTLIST CrowdScene
        superElement    NMTOKEN    #FIXED "PeopleScene"
>
<!ELEMENT PortraitScene (EMPTY)>
<!ATTLIST PortraitScene
        superElement    NMTOKEN    #FIXED "PeopleScene"
>
<!ELEMENT IndoorScene (EMPTY)
<!ATTLIST IndoorScene
        superElement    NMTOKEN    #FIXED "Descriptor"
>
<!ELEMENT OutdoorScene (EMPTY)
<!ATTLIST OutdoorShot
        superElement    NMTOKEN    #FIXED "Descriptor"
>
```

Appendix E: An Example Description generated from the Video Description Scheme in Appendix D Example Description (VideoEg1.xml)

```
<?xml version="1.0" standalone = "no" ?>
<!DOCTYPE VideoDescription SYSTEM "Video.ddf" [
    <!ENTITY MyVideo SYSTEM "MyVideo.mpg" NDATA MPEG2>
    <!ENTITY KFrame1 SYSTEM "KFrame2.jpg" NDATA JPEG>
    <!ENTITY KFrame2 SYSTEM "KFrame2.jpg" NDATA JPEG>
    etc.
]>
<VideoDescription resource = "MyVideo">
    <Title>Video Clip Title</Title>
    <!-- Shots detected in the digital video resource -->
    <Shot id = "S1" keyFrame = "KFrame1" locator = "L1">
        <CrowdScene/>
        <OutdoorScene/>
    </Shot>
    <Shot id = "S2" keyFrame = "KFrame2" locator = "L2">
        <PortraitScene/>
        <OutdoorScene/>
    </Shot>

<!-- Locators in the digital video resource -->
    <Locator id = "L1" resource = "MyVideo">
        <VideoExtent >
            <VideoExtentStart>0</VideoExtentStart>
            <VideoExtentEnd>20</VideoExtentEnd>
        </VideoExtent>
    </Locator>
    <Locator id = "L2">
```

```
        <VideoExtent >
              <VideoExtentStart>21</VideoExtentStart>
              <VideoExtentEnd>50</VideoExtentEnd>
        </VideoExtent>
    </Locator>
</VideoDescription>
```

Appendix F: Presentation Rules for the Video Description Scheme in Appendix D

Example Description (VideoPresentationRules.xml)

```xml
<?xml version="1.0" standalone = "no" ?>
<!DOCTYPE PresentationRules SYSTEM "Rules.dtd" [
    <!ENTITY CrowdScene SYSTEM "CrowdSceneIcon.jpg" NDATA JPEG>
    <!ENTITY PortraitScene SYSTEM "PortraitSceneIcon.jpg" NDATA JPEG>
    <!ENTITY OutdoorScene SYSTEM "OutdoorSceneIcon.jpg" NDATA JPEG>
    <!ENTITY IndoorScene SYSTEM "IndoorSceneIcon.jpg" NDATA JPEG>
]>

<PresentationRules>
    <Rule target = ElementDefn pattern = "VideoDescription">
        <Action>
            <AddAttributeDef
                attName = "selected"
                attType = "CDATA"
                attDefault = "NO"/>
        </Action>
        <Action>
            <AddAttributeDef
                attName = "presentationType"
                attType = "(Index|TOC)"
                attDefault = #FIXED "TOC"/>
        </Action>
    </Rule>
    <Rule target = ElementDefn pattern = "VideoDescription/Shot">
        <Action>
            <AddAttributeDef
                attName = "selected"
```

```
                    attType = "CDATA"
                    attDefault = "NO"/>
        </Action>
        <Action>
            <AddAttributeDef
                    attName = "presentationType"
                    attType = "(Index|TOC)"
                    attDefault = #FIXED "TOC"/>
        </Action>
</Rule>
<Rule target = ElementDefn pattern ="VideoDescription/Shot/CrowdScene">
    <Action>
        <AddAttributeDef
                attName = "presentationType"
                attType = "(Index|TOC)"
                attDefault = #FIXED "Index"/>
    </Action>
    <Action>
        <AddAttributeDef
                attName = "icon"
                attType = "ENTITY"
                attDefault = #FIXED "CrowdScene"/>
    </Action>
</Rule>
```

```
<Rule target= ElementDefn pattern ="VideoDescription/Shot/PortraitScene">
        <Action>
                <AddAttributeDef
                        attName = "presentationType"
                        attType = "(Index|TOC)"
                        attDefault = #FIXED "Index"/>
        </Action>
        <Action>
                <AddAttributeDef
                        attName = "icon"
                        attType = "ENTITY"
                        attDefault = #FIXED "PortraitScene"/>
        </Action>
    </Rule>
    <Rule target = ElementDefn pattern =
"VideoDescription/Shot/IndoorScene">
        <Action>
                <AddAttributeDef
                        attName = "presentationType"
                        attType = "(Index|TOC)"
                        attDefault = #FIXED "Index"/>
        </Action>
        <Action>
                <AddAttributeDef
                        attName = "icon"
                        attType = "ENTITY"
                        attDefault = #FIXED "IndoorScene"/>
        </Action>
    </Rule>
```

```
        <Rule target=ElementDefn pattern
="VideoDescription/Shot/OutdoorScene">
        <Action>
            <AddAttributeDef
                attName = "presentationType"
                attType = "(Index|TOC)"
                attDefault = #FIXED "Index"/>
        </Action>
            <Action>
            <AddAttributeDef
                attName = "icon"
                attType = "ENTITY"
                attDefault = #FIXED "OutdoorScene"/>
        </Action>
    </Rule>
</PresentationRules>
```

Appendix G: Digital Video Library Description Scheme

Description Scheme (DigitalVideoLibrary.ddf)

```
<!-- Core.ddf included here -->
<!ENTITY % Core SYSTEM "Core.ddf">
%Core;

<!----------------------------------------------------------------
Scheme specific entities
----------------------------------------------------------------->

<!ENTITY VideoLibraryGen SYSTEM "VideoLibraryGen.class"
        NDATA JAVACLASS>
<!--------------------------------------------------------------
Digital Video Library related element definitions
--------------------------------------------------------------->

<!ELEMENT DigitalVideoLibraryDescription (Section* | Item*)>
<!ATTLIST DigitalVideoLibraryDescription
        superElement    NMTOKEN    #FIXED "Description"
        handler         ENTITY     #FIXED "VideoLibraryGen"
        title           CDATA      #IMPLIED
>
<!ELEMENT Section (Section* | Item*)>
<!ATTLIST Section
        superElement    NMTOKEN    #FIXED "Descriptor"
        title           CDATA      #IMPLIED
>
```

```
<!ELEMENT Item (EMPTY)>
<!ATTLIST Item
      superElement      NMTOKEN      #FIXED "Descriptor"
      description       ENTITY       #REQUIRED
>
```

Appendix H: An Example Description generated from the Digital Video Library Description Scheme in Appendix G Example Description (VideoLibraryEg.xml)

```xml
<?xml version="1.0" standalone = "no" ?>
<!DOCTYPE DigitalVideoLibraryDescription SYSTEM "DigitalVideoLibrary.ddf" [
    <!ENTITY VideoEg1 SYSTEM "VideoEg1.xml">
    <!ENTITY VideoEg2 SYSTEM "VideoEg2.xml">
    <!ENTITY VideoEg3 SYSTEM "VideoEg3.xml">
    etc.
]>
<DigitalVideoLibraryDescription title = "My Personal Digital Video Library">
    <Section title = "Holiday Videos">
        <Item description = "VideoEg1"/>
        <Item description = "VideoEg2"/>
        etc.
    </Section>
    <Section title = "Birthday Videos">
        <Section title = "Mary's Birthdays">
            <Item description = "VideoEg3/>
            etc.
        </Section>
        <Section title = "John's Birthdays"> ... </Section>
    </Section>
</DigitalVideoLibraryDescription>
```

Appendix I: Video Presentation Description Scheme

Description Scheme (VideoPresentation.ddf)

```
<!-- Core.ddf included here -->
<!ENTITY % Core SYSTEM "Core.ddf">
%Core;

<!--------------------------------------------------------------
Scheme specific entities
-------------------------------------------------------------->

<!ENTITY VideoPresentationGen SYSTEM "VideoPresentation.class"
        NDATA JAVACLASS>
<!ENTITY VideoPresentationRules SYSTEM "VideoPresentionRules.xml">

<!--------------------------------------------------------------
Video Presentation related element definitions
-------------------------------------------------------------->

<!ELEMENT VideoPresentationDescription (VideoDescriptionReference*)>
<!ATTLIST VideoPresentationDescription
        superElement          NMTOKEN    #FIXED "Description"
        handler               ENTITY     #FIXED "VideoPresentationGen"
        title                 CDATA      #IMPLIED
        ruleSets              ENTITIES   #FIXED "VideoPresentationRules"
        userPresentationRules ENTITY     #IMPLIED
>
```
> I1 (ruleSets)
> I2 (userPresentationRules)

```
<!ELEMENT VideoDescriptionReference (ShotReference*)>
<!ATTLIST VideoDescriptionReference
        superElement     NMTOKEN    #FIXED "Descriptor"
        videoDescription ENTITY     #REQUIRED
>
```

```
<!ELEMENT ShotReference (EMPTY)
<!ATTLIST ShotReference
       superElement      NMTOKEN       #FIXED "Descriptor"
       shotIDRef         IDREF         #REQUIRED
>
```

Appendix J: An Example Description generated from the Video Presentation Description Scheme in Appendix I Example Description (VideoPresentationEg.xml)

```
<?xml version="1.0" standalone = "no" ?>
<!DOCTYPE VideoPresentationDescription SYSTEM "VideoPresentation.ddf" [
    <!ENTITY UserPresentationRules SYSTEM "UserPresentationRules.xml">
    <!ENTITY VideoEg1 SYSTEM "VideoEg1.xml">
    <!ENTITY VideoEg2 SYSTEM "VideoEg2.xml">
    etc.
]>
<VideoPresentationDescription userPresentationRules = "UserPresentationRules">
    <VideoDescriptionReference videoDescription = "VideoEg1">
        <ShotReference shotIDRef = "S1"/>            ← J2          J1
        <ShotReference shotIDRef = "S2"/>
    </ VideoDescriptionReference >

<VideoDescriptionReference description = "VideoEg2">
        <ShotReference shotIDRef = "S3"/>
        <ShotReference shotIDRef = "S4"/>
    </ VideoDescriptionReference > etc.
</VideoPresentationDescription>
```

Appendix K: DOM Element Nodes

Extract from DOM Version 1.0 obtained on the Website
HTTP://www.w3.org/TR/1998/REC-DOM-level-1-199810001

**Interface *Element***

By far the vast majority (apart from text) of node types that authors will generally encounter when traversing a document will be Element nodes. These objects represent both the element itself, as well as any contained notes. For example (in XML):

```
<elementExample id="demo">
    <subelement1/>
    <subelement2><subsubelement/></subelement2>
</elementExample>
```

When represented using DOM, the top node would be "elementExample", which contains two child Element nodes (and some space), one for "subelement1" and one for "subelement2". "subelement1" contains no child nodes of its own.

```
interface Element: Node {
    wstring        getTagName();
    NodeIterator   get Attributes();
    wstring        getAttribute (in name name);
    void           setAttribute (in string name, in string value);
    void           removeAttribute(in wstring name);
    Attribute      getAttributeNode(in name name);
    void           setAttributeNode(in Attribute newAttr);
    void           removeAttributeNode(in Attribute oldAttr);
    void           getElementsByTagName(in wstring tagname);
    void           normalize();
};
```

Method *getTagName()*

This method returns the string that is the element's name. For example, in:

```
<elementExample id="demo">
    ...
</elementExample>
```

This would have the value "elementExample". Note that this is case-preserving, as are all of the operations of the DOM. See Name case in the DOM for a description why the DOM preserves case.

Parameters

| This method has no parameters |
|---|

Return Values

| wstring | |
|---|---|

Exceptions

| This method throws no exceptions |
|---|

**Method *getAttributes()***

The attributes for this element. In the elementExample example above, the attributes list would consist of the id attribute, as well as any attributes which were defined by the document type definition for this element which have default values.

Parameters

| This method has no parameters |
|---|

Return Values

| NodeIterator | |
|---|---|

Exceptions

| This method throws no exceptions |
|---|

**Method *getAttribute()***

Retrieves an Attribute value by name from an Element. object.

Parameters

| name | The name of the attribute to retrieve |
|---|---|

Return Values

| wstring | |
|---|---|

Exceptions

| This method throws no exceptions |
|---|

Method *setAttribute()*

Adds a new attribute/value pair to an Element node object. If an attribute by that name is already present in the element, its value is changed to that of the value parameter.

Parameters

| name | |
|---|---|
| value | |

Return Values

| void | |
|---|---|

Exceptions

| This method throws no exceptions |
|---|

Method *removeAttribute()*

Removes the specified attribute from an Element node object.

Parameters

| name | |
|---|---|

Return Values

| void | |

Exceptions

| This method throws no exceptions |

Method *getAttributeNode()*

Retrieves an Attribute node by name from an Element object.

Parameters

| name | The name of the attribute to retrieve |

Return Values

| Attribute | |

Exceptions

| This method throws no exceptions |

Method *setAttributeNode()*

Adds a new attribute/value pair to an Element node object. If an attribute by that name is already present in the element, its value is changed to be that of the Attribute instance.

Parameters

| newAttr | |

Return Values

| void | |

Exceptions

| This method throws no exceptions |

Method *removeAttributeNode()*

Removes the specified attribute/value pair from an Element node object.

Parameters

| oldAttr | |
|---|---|

Return Values

| void | |
|---|---|

Exceptions

| This method throws no exceptions |
|---|

Method *getElementsByTagName()*

Returns an iterator through all subordinate elements with a given tag name.

Parameters

| tagname | |
|---|---|

Return Values

| void | |
|---|---|

Exceptions

| This method throws no exceptions |
|---|

Method *normalize()*

Puts all Tet nodes in the sub-tree underneath this Element into a "normal" form where only markup (eg tags, comment, PIs, CDATASections) and entity references separate Text nodes.

Parameters

| This method has no parameters |
|---|

Return Values

| void | |
|---|---|

Exceptions

| This method throws no exceptions |
|---|

**Attribute *data***

This holds the actual content of the text node. Text nodes contain just plain text, without markup and without entities, both of which are represented as separate objects in the DOM.

The invention claimed is:

1. A method of browsing electronically-accessible resources using descriptions of the resources, said method comprising the steps of:

generating descriptions of the electronically-accessible resources, the generated descriptions being separate from the content of the resources and comprising descriptor components classified as either table-of-contents descriptor components or index descriptor components, each said table-of-contents descriptor component having a link to a corresponding portion of the electronically-accessible resources;

displaying items for selection, each displayed item corresponding to a table-of-contents descriptor component of a generated description;

receiving a selection of one or more of said displayed items;

displaying further items for selection, the further items corresponding to index descriptor components that are associated with one or more table-of-contents descriptor components corresponding to the selected one or more of said displayed items;

receiving a selection of one of said displayed further items;

providing a representative value associated with said selected further item;

forming a query from the index descriptor component corresponding to said selected one of said displayed further items and said provided representative value;

searching said generated descriptions to return one or more table-of-contents descriptor components that satisfy said query and are contained in the one or more table-of-contents descriptor components corresponding to the selected one or more of said displayed items; and displaying for selection one or more still further items corresponding to said returned one or more table-of-contents descriptor components.

2. The method as claimed in claim 1, wherein each generated description is represented in a tree of descriptor components, and one or more of the descriptor components have descriptor components as descendants.

3. The method as claimed in claim 1, comprising the further step of viewing, in response to a selection of one of said still further displayed items, the portion of the electronically-accessible resources corresponding to a returned table-of-contents descriptor component linked to by the selected one of said still further displayed items.

4. The method as claimed in claim 1, wherein the descriptions of the electronically-accessible resources are generated using a description scheme as a template, and the description scheme uses a declarative description definition language which contains definitions for descriptor components of the generated descriptions of the electronically-accessible resources.

5. The method as claimed in claim 4, wherein the attributes of the descriptor components are defined in the description scheme.

6. The method as claimed in claim 4, wherein the attributes of the descriptor components are persistent items of the description scheme.

7. The method as claimed in claim 4, wherein the attributes of the descriptor components are instantiated by an application when required.

8. The method as claimed in claim 7, wherein the attributes of the descriptor components are instantiated using a rule that is associated with the description scheme.

9. The method as claimed in claim 1, wherein the electronically-accessible resources comprise digital audiovisual content.

10. The method as claimed in claim 1, wherein the electronically-accessible resources comprise an electronic document or resource available over the World Wide Web.

11. The method as claimed in claim 1, wherein the electronically-accessible resources comprise information about an electronic device.

12. The method as claimed in claim 1, wherein a descriptor component is classified to be a table-of-contents descriptor if the descriptor component contains a reference to a resource or a section of a resource.

13. The method as claimed in claim 12, wherein a descriptor component is classified to be an index descriptor if the descriptor component is not classified to be a table-of-contents descriptor.

14. The method as claimed in claim 1, wherein the corresponding portion of the electronically-accessible resources is a spatially localized extent of the resources.

15. The method as claimed in claim 1, wherein the corresponding portion of the electronically-accessible resources is a temporally localized extent of the resources.

16. An apparatus for browsing electronically-accessible resources using descriptions of the resources, said apparatus comprising:

a processor;

means for generating descriptions of the electronically-accessible resources, the generated descriptions being separate from the content of the resources and comprising descriptor components classified as either table-of-contents descriptor components or index descriptor components, each said table-of-contents descriptor component having a link to a corresponding portion of the electronically-accessible resources;

means for displaying items for selection, each displayed item corresponding to a table-of-contents descriptor component of a generated description;

means for receiving a selection of one or more of said displayed items;

means for displaying further items for selection, the further items corresponding to index descriptor components that are associated with the one or more table-of-contents descriptor components corresponding to the selected one or more of said displayed items;

means for receiving a selection of one of said displayed further items;

means for providing a representative value associated with said selected further item;

means for forming a query from the index descriptor component corresponding to said selected one of said displayed further items and said provided representative value;

means for searching said generated descriptions to return one or more table-of-contents descriptor components that satisfy said query and are contained in the one or more table-of-contents descriptor components corresponding to the selected one or more of said displayed items; and means for displaying for selection one or more still further items corresponding to said returned one or more table-of-contents descriptor components.

17. The apparatus as claimed in claim 16, wherein said means for generating the descriptions represents each description in a tree of descriptor components, and one or more of the descriptor components have descriptor components as descendants.

18. The apparatus as claimed in claim 16, further comprising viewing means for viewing, in response to a selection of one of said still further displayed items, the portion of the electronically-accessible resources corresponding to a returned table-of-contents descriptor component linked to by the selected one of said still further displayed item.

19. The apparatus as claimed in claim 16, wherein the descriptions of the electronically-accessible resources are provided using a description scheme as a template, and the description scheme uses a declarative description definition language which contains definitions for descriptor components of the descriptions of the resources.

20. The apparatus as claimed in claim 19, wherein the attributes of the descriptor components are defined in the description scheme.

21. The apparatus as claimed in claim 19, wherein the attributes of the descriptor components are persistent items of the description scheme.

22. The apparatus as claimed in claim 19, wherein the attributes of the descriptor components are instantiated by an application when required.

23. The apparatus as claimed in claim 22, wherein the attributes of the descriptor components are instantiated using a rule that is associated with the description scheme.

24. The apparatus as claimed in claim 16, wherein the electronically-accessible resources comprise digital audio-visual content.

25. The apparatus as claimed in claim 16, wherein the electronically-accessible resources comprise an electronic document or resource available over the World Wide Web.

26. The apparatus as claimed in claim 16, wherein the electronically-accessible resources comprise information about an electronic device.

27. The apparatus as claimed in claim 16, wherein a descriptor component is classified to be a table-of-contents descriptor if the descriptor component contains a reference to a resource or a section of a resource.

28. The apparatus as claimed in claim 27, wherein a descriptor component is classified to be an index descriptor if the descriptor component is not classified to be a table-of-contents descriptor.

29. A computer storage medium, having a computer program recorded thereon, where the program is executable to perform a procedure for browsing electronically-accessible resources using descriptions of the resources, said computer program comprising:

code for generating descriptions of the electronically-accessible resources, the generated descriptions being separate from the content of the resources and comprising descriptor components classified as either table-of-contents descriptor components or index descriptor components, each said table-of-contents descriptor component having a link to a corresponding portion of the electronically-accessible resources;

code for displaying items for selection, each displayed item corresponding to a table-of-contents descriptor component of a generated description;

code for receiving a selection of one or more of said displayed items;

code for displaying further items for selection, the further items corresponding to index descriptor components that are associated with the one or more table-of-contents descriptor components corresponding to the selected one or more of said displayed items;

code for receiving a selection of one of said displayed further items;

code for providing a representative value associated with said selected further item;

code for forming a query from the index descriptor component corresponding to said selected one of said displayed further items and said provided representative value;

code for searching said generated descriptions to return one or more table-of-contents descriptor components that satisfy said query and are contained in the one or more table-of-contents descriptor components corresponding to the selected one or more of said displayed items; and code for displaying for selection one or more still further items corresponding to said returned one or more table-of-contents descriptor components.

* * * * *

UNITED STATES PATENT AND TRADEMARK OFFICE
CERTIFICATE OF CORRECTION

| | | |
|---|---|---|
| PATENT NO. | : 7,287,018 B2 | |
| APPLICATION NO. | : 09/493220 | |
| DATED | : October 23, 2007 | |
| INVENTOR(S) | : Lennon | |

It is certified that error appears in the above-identified patent and that said Letters Patent is hereby corrected as shown below:

Title page item [57]

IN THE ABSTRACT:
Line 7, "are" should read -- is --.

DRAWINGS:
Sheet 11, FIG. 9, (four occurrences) "colour" should read -- color --; and
Sheet 13, FIG. 11(a) "standardised" should read -- standardized --.

COLUMN 1:
Line 30, "etc.)" should read -- etc.). --.

COLUMN 8:
Line 56, "show" should read -- shows --.

COLUMN 9:
Line 5, "accordance another" should read -- accordance with another --;
Line 8, "accordance another" should read -- accordance with another --; and
Line 43, "an" should read -- a --.

COLUMN 10:
Line 26, "1.16" should read -- 1.1.6 --;
Line 36, "Scrialisation" should read -- Serialization --;
Line 48, "3.12" should read -- 3.1.2 --;
Line 49, "3.1,2.1" should read -- 3.1.2.1 --; and
Line 56, "AtomioDescriptorValue" should read -- AtomicDescriptorValue --.

COLUMN 11:
Line 61, "herein" should read -- herein. --.

COLUMN 12:
Line 53, "type" should read -- type. --.

UNITED STATES PATENT AND TRADEMARK OFFICE
CERTIFICATE OF CORRECTION

PATENT NO. : 7,287,018 B2
APPLICATION NO. : 09/493220
DATED : October 23, 2007
INVENTOR(S) : Lennon It is certified that error appears in the above-identified patent and that said Letters Patent is hereby corrected as shown below:

COLUMN 13:
Line 21, "relationships," should read -- relationships, and --.

COLUMN 15:
Line 17, "tho" should read -- the --;
Line 21, "procedures" should read -- procedure --;
Line 36, "106d provided" should read -- 106 is provided --; and
Line 45, "DDE" should read -- DDF --.

COLUMN 16:
Line 13, "requirement;" should read -- requirement; and --.

COLUMN 17:
Line 11, "SAX)]." should read -- SAX).] --; and
Line 62, "are" should read -- is --.

COLUMN 18:
Line 2, "description" should read -- description. --; and
Line 40, "Handier" should read -- Handler --.

COLUMN 19:
Line 19, "ENTITY," should read -- ENTITY --.

COLUMN 20:
Line 3, "for," should read -- for --;
Line 20, "DDE" should read -- DDF --;
Line 23, "form" should read -- form. --; and
Line 52, "Section" should read -- Sections --.

UNITED STATES PATENT AND TRADEMARK OFFICE
CERTIFICATE OF CORRECTION

PATENT NO. : 7,287,018 B2
APPLICATION NO. : 09/493220
DATED : October 23, 2007
INVENTOR(S) : Lennon It is certified that error appears in the above-identified patent and that said Letters Patent is hereby corrected as shown below:

COLUMN 21:
Line 2, "an" should read -- a --;
Line 9, "FIG. 6)" should read -- FIG. 6). --;
Line 18, "to, provide" should read -- to provide --;
Line 26, "2);" should read -- 2); and --;
Line 28, "desctriptor;" should read -- descriptor. --;
Line 38, "is" should read -- are --; and
Line 49, "is" should read -- are --.

COLUMN 22:
Line 10, "addition element," should read -- addition, element --;
Line 28, "it" should read -- its --; and
Line 36, "definition" should read -- definitions --.

COLUMN 23:
Line 12, "semantics);" should read -- semantics); and --;
Line 34, "translations);" should read -- translations); and --.

COLUMN 24:
Line 26, "of 7]." should read -- of 7. --; and
Line 47, "are" should read -- be --.

COLUMN 25:
Line 50, "parser;" should read -- parser) --.

COLUMN 27:
Line 14, "element" should read -- element. --;
Line 32, "a" should read -- an --; and
Line 33, "Section 4 1.3" should read -- Section 4.1.3 --.

COLUMN 28:
Line 23, "MyDesoHandler" should read -- MyDescHandler --.

COLUMN 31:
Line 13, "NMTOIKEN" should read -- NMTOKEN --.

UNITED STATES PATENT AND TRADEMARK OFFICE
CERTIFICATE OF CORRECTION

PATENT NO. : 7,287,018 B2
APPLICATION NO. : 09/493220
DATED : October 23, 2007
INVENTOR(S) : Lennon It is certified that error appears in the above-identified patent and that said Letters Patent is hereby corrected as shown below:

COLUMN 32:
Line 26, "HTTP://www.www.w3.org/TR/1998/REC-DOM-level-1-" should read -- HTTP://www.w3.org/TR/1998/REC-DOM-level-1 – --.

COLUMN 34:
Line 11, "specifies" should read -- specified --; and
Line 55, "an" should read -- and --.

COLUMN 35:
Line 30, "value" should read -- value. --.

COLUMN 37:
Line 2, "his" should read -- this --;
Line 44, "step 704D," should read -- step 704B, --;
Line 47, "DFF" should read -- DDF --; and
Line 55, "can used" should read -- can be used --.

COLUMN 38:
Line 1, "computation" should read -- computation. --;
Line 27, "generate" should read -- generates --; and
Line 50, "Pavaotti's" should read -- Pavarotti's --.

COLUMN 39:
Line 27, "input" should read -- inputs --.

COLUMN 40:
Line 8, "check" should read -- checks --; and
Line 59, "make" should read -- makes --.

COLUMN 41:
Line 37, "gctParameterList( )" should read -- getParameterList( ) --; and
Line 60, "return" should read -- returns --.

UNITED STATES PATENT AND TRADEMARK OFFICE
CERTIFICATE OF CORRECTION

PATENT NO.        : 7,287,018 B2
APPLICATION NO.   : 09/493220
DATED             : October 23, 2007
INVENTOR(S)       : Lennon It is certified that error appears in the above-identified patent and that said Letters Patent is hereby corrected as shown below:

COLUMN 42:
Line 60, "ated real" should read -- ated in real --.

COLUMN 43:
Line 33, "descriptions," should read -- descriptions. --; and
Line 66, (close up space.).

COLUMN 45:
Line 38, "client A" should read -- client A. --.

COLUMN 48:
Line 12, "VidioClipDe-" should read -- VideoClipDe- --.

COLUMN 49:
Line 8, "firer" should read -- further --.

COLUMN 51:
Line 41, "These" should read -- This --; and
Line 45, "block 2106," should read -- block 1206, --.

COLUMN 53:
Line 11, "riles are" should read -- rules are --; and
Line 19, "definitions), and;" should read -- definitions); and --.

COLUMN 54:
Line 4, "it's" should read -- its --.

COLUMN 55:
Line 19, "true yes)" should read -- true (yes) --.

COLUMN 56:
Line 27, "is" should be deleted.

UNITED STATES PATENT AND TRADEMARK OFFICE
CERTIFICATE OF CORRECTION

PATENT NO. : 7,287,018 B2
APPLICATION NO. : 09/493220
DATED : October 23, 2007
INVENTOR(S) : Lennon It is certified that error appears in the above-identified patent and that said Letters Patent is hereby corrected as shown below:

COLUMN 57:
Line 19, "processed" should read -- processes --; and
Line 49, "memories" should read -- memories. --.

COLUMN 58:
Line 9, "interaction;" should read -- interaction: --.

COLUMN 60:
Line 60, "in" should be deleted.

COLUMN 61:
Line 18, "DesOm," should read -- DesOm. --.

COLUMN 62:
Line 23, "view" should read -- view. --.

COLUMN 65:
Line 17, "vide" should read -- video --; and
Line 36, "it" should read -- in --.

COLUMN 66:
Line 30, "section 13). Any" should read -- section 13). ¶ Any --; and
Line 33, "call" should read -- can --.

COLUMN 67:
Line 3, "ink" should read -- in --;
Line 6, "tat" should read -- that --;
Line 18, "Section 13)" should read -- Section 13). --;
Line 50, "signals)" should read -- signals). --; and
Line 59, "panel 2004" should read -- panel 2004. --.

COLUMN 68:
Line 3, "play/view;" should read -- play/view; and --.

UNITED STATES PATENT AND TRADEMARK OFFICE
CERTIFICATE OF CORRECTION

PATENT NO. : 7,287,018 B2
APPLICATION NO. : 09/493220
DATED : October 23, 2007
INVENTOR(S) : Lennon It is certified that error appears in the above-identified patent and that said Letters Patent is hereby corrected as shown below:

COLUMN 69:
Line 61, "a" should read -- an --; and
Line 65, "subsequent" should read -- subsequently --.

COLUMN 70:
Line 15, "formulated" should read -- be formulated --; and
Line 53, "it" should read -- its --.

COLUMN 107:
Line 36, "supcrElement" should read -- superElement --.

COLUMN 121:
Line 67, "Mcthod *getAttribute*" should read -- Method *getAttribute* --.

COLUMN 127:
Line 46, "Tet" should read -- Text --.

COLUMN 133:
Line 6, "item." should read -- items. --.

Signed and Sealed this

Twenty-eighth Day of October, 2008

JON W. DUDAS
*Director of the United States Patent and Trademark Office*